US010642547B2

(12) United States Patent
Sakawaki et al.

(10) Patent No.: US 10,642,547 B2
(45) Date of Patent: May 5, 2020

(54) INFORMATION PROCESSING SYSTEM AND INFORMATION PROCESSING METHOD FOR GENERATING AN APPLICATION PROVIDING SCREEN FOR DISPLAY AT A REQUESTING DEVICE

(71) Applicants: Yoshihiko Sakawaki, Kanagawa (JP); Tsuguhiro Satoh, Kanagawa (JP)

(72) Inventors: Yoshihiko Sakawaki, Kanagawa (JP); Tsuguhiro Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/648,600

(22) Filed: Jul. 13, 2017

(65) Prior Publication Data
US 2018/0024787 A1    Jan. 25, 2018

(30) Foreign Application Priority Data

Jul. 20, 2016 (JP) .................................. 2016-142262
Jan. 27, 2017 (JP) .................................. 2017-013448

(51) Int. Cl.
*G06F 9/445* (2018.01)
*G06F 3/12* (2006.01)
(Continued)

(52) U.S. Cl.
CPC .......... *G06F 3/1225* (2013.01); *G06F 3/1205* (2013.01); *G06F 3/1287* (2013.01); *H04N 1/00411* (2013.01)

(58) Field of Classification Search
CPC ..... H04W 4/025; H04W 12/08; G06F 21/123; G06F 21/51; G06F 3/61; G06F 3/048;
(Continued)

(56) References Cited

U.S. PATENT DOCUMENTS

2004/0148379 A1* 7/2004 Ogura .................... H04L 29/06
                                                                  709/223
2006/0290965 A1* 12/2006 Sugai .................... G06F 3/1225
                                                                  358/1.13
(Continued)

FOREIGN PATENT DOCUMENTS

JP         2010-182309        8/2010

*Primary Examiner* — Juan M Guillermety
(74) *Attorney, Agent, or Firm* — Oblon, McClelland, Maier & Neustadt, L.L.P.

(57) ABSTRACT

An information processing apparatus capable of communicating with one or more devices via a network, includes: a receiver to receive, from a first device of the devices, a screen request that requests an application providing screen, the screen request including shop information indicating a first shop that sells the first device; and circuitry to: obtain application correspondence information that associates shop information indicating the shop, application identification information for identifying one or more applications sold by the shop, and use promotion information indicating whether each application is a use-promoted application; and specify, from among one or more applications associated with the shop information indicating the first shop, a first application having first identification information that is associated with the use promotion information indicating the use-promoted application, using the application correspondence information; and a transmitter to transmit, to the first device, an application providing screen for display at the first device, the application providing screen including information regarding the first application identified with the first application identification information as a recommended application for the first device.

16 Claims, 43 Drawing Sheets

(51) Int. Cl.
*H04N 1/00* (2006.01)
*G06F 17/00* (2019.01)

(58) Field of Classification Search
CPC ... G06F 17/30598; G06F 8/61; H04L 63/107; H04L 51/24; H04L 67/34; H04N 1/00344; H04N 1/00066; H04N 2201/0094; H04N 2201/0039
See application file for complete search history.

(56) References Cited

U.S. PATENT DOCUMENTS

| | | | | |
|---|---|---|---|---|
| 2011/0239208 A1* | 9/2011 | Jung | ......................... | G06F 8/65 717/170 |
| 2012/0140255 A1* | 6/2012 | Tanaka | ............... | H04N 1/00424 358/1.13 |
| 2012/0245998 A1* | 9/2012 | Takami | .................. | G06Q 30/02 705/14.49 |
| 2013/0219261 A1 | 8/2013 | Han et al. | | |
| 2014/0052542 A1* | 2/2014 | Zhang | ................ | G06Q 30/0269 705/14.66 |
| 2014/0058897 A1* | 2/2014 | Yang | .................. | G06Q 30/0623 705/26.61 |
| 2014/0157387 A1* | 6/2014 | Lee | ......................... | G06F 21/30 726/7 |
| 2014/0281914 A1 | 9/2014 | Sakawaki et al. | | |
| 2014/0344107 A1* | 11/2014 | Nakamura | ......... | G06Q 30/0641 705/26.8 |
| 2014/0365944 A1* | 12/2014 | Moore | .................. | G06F 3/0484 715/772 |
| 2016/0162949 A1* | 6/2016 | Malca | ................ | G06Q 30/0262 705/14.59 |
| 2016/0337544 A1* | 11/2016 | Han | .................... | H04N 1/00244 |
| 2016/0371070 A1* | 12/2016 | Jimbo | .................. | G06F 3/0482 |
| 2017/0147322 A1* | 5/2017 | Vopni | ........................ | G06F 8/65 |
| 2017/0200169 A1* | 7/2017 | Yuki | ..................... | G06F 21/105 |
| 2017/0223500 A1* | 8/2017 | Saitoh | .................. | H04W 4/021 |

\* cited by examiner

FIG. 7

① SELECT REGION  ② SEE TERMS OF USE

Select the region

| REGION | Japan |

SHOP INFORMATION (OPTIONAL)

BACK    NEXT

FIG. 8

① SELECT REGION  ② SEE TERMS OF USE

TERMS OF USE OF THIS SERVICE

To use this service, please agree the terms of use.
Make sure to read the content of the terms of use, and check
"AGREE TERMS OF USE" to proceed to the next step.

☐ AGREE TERMS OF USE

TERMS OF USE

BACK    OK

FIG. 9

| DEVICE IDENTIFICATION INFORMATION | SHOP INFORMATION | REGION INFORMATION |
|---|---|---|
| 3F08-0005 | 11234516 | JP |

FIG. 10

```
GET /discov?service=appsdownload&device_id=3F08-00005&region_code=JP&dealer_code=11234516 HTTP/1.1
Host: www.example.com
```

FIG. 11

```
HTTP/1.1 200 OK
Content-Type: application/json; charset=UTF8

[
  "appsdownload" : "https://www.example.com/apps"
]
```

FIG. 12

```
https://hapi.start.***.com/v1/appsite/&device-id=3F08_00005&dealer=11234516
```

FIG. 13

```
HTTP/1.1 200 OK
Content-Type: application/json; charset=UTF-8
[
  {
    "appId": "S002",
    "appType": "install",
    "name": "OCR APPLICATION",
    "licenseKey": "",
    "description": "OCR PERFORMED ON TEXT DATA",
    "version": "1.1",
    "icon": "http://www.example.com/apps/S002/icon.png",
    "licenseInfo": "http://www.example.com/apps/S002/license.html"
  },
  {
    "appId": "S003",
    "appType": "install",
    "name": "TRANSLATION APPLICATION",
    "licenseKey": "S003-555-666",
    "description": "TRANSLATED INTO 5 LANGUAGES",
    "version": "2.2",
    "icon": "http://www.example.com/apps/S003/icon.png",
    "licenseInfo": "http://www.example.com/apps/S003/license.html"
  }
]
```

SCREEN INFORMATION FOR S002

SCREEN INFORMATION FOR S003

| DEVICE IDENTIFICATION INFORMATION | SHOP INFORMATION | REGION INFORMATION | URL |
|---|---|---|---|
| 3F08-00005 | 11234516 | JP | http://xxx.co.jp |
| 4G12-00011 | 23456722 | US | http://yyy.co.jp |
| ⋮ | ⋮ | ⋮ | ⋮ |

| SHOP INFORMATION | APPLICATION IDENTIFICATION INFORMATION | USE PROMOTION INFORMATION |
|---|---|---|
| Dealer001 | App0001 | False |
| | App0002 | False |
| | App0004 | True |
| | App0005 | True |
| Dealer002 | App0001 | False |
| | App0003 | False |

FIG. 24

| APPLICATION IDENTIFICATION INFORMATION | DISPLAY INFORMATION ||||
| --- | --- | --- | --- | --- |
| | LANGUAGE | DISPLAY NAME | MESSAGE | IMAGE |
| S001 | JAPANESE | Easy Copier (in Japanese) | You can copy easily (in Japanese) | |
| S001 | ENGLISH | Easy Copier | You can copy easily | |
| S002 | JAPANESE | OCR app | You can perform OCR on text document | |
| S002 | FRENCH | OCR app (in French) | Vous pouvez effectuer l'OCR pour les documents texte (in French) | |
| S003 | JAPANESE | Translation app (in Japanese) | You can translate into five languages (in Japanese) | |
| ... | ... | | | ... |

| APPLICATION IDENTIFICATION INFORMATION | NUMBER OF DOWNLOADS ACCORDING TO SHOP INFORMATION | |
|---|---|---|
| | Dealer001 | Dealer002 |
| App0001 | 10 | 15 |
| App0002 | 156 | 982 |
| App0003 | 6842 | 9432 |
| App0004 | 71 | 62 |
| App0005 | 8677 | 7841 |

| APPLICATION IDENTIFICATION INFORMATION | PRICE |
|---|---|
| App0001 | 100 YEN |
| App0002 | 300 YEN |
| App0003 | 5000 YEN |
| App0004 | 100 YEN |
| App0005 | 4500 YEN |

FIG. 36

| SHOP INFORMATION | APPLICATION IDENTIFICATION INFORMATION | USE PROMOTION INFORMATION | COMPETITIVE APPLICATION IDENTIFICATION INFORMATION |
|---|---|---|---|
| Dealer001 | App0001 | False | – |
| | App0002 | False | – |
| | App0004 | True | – |
| | App0005 | True | App0003 |
| Dealer002 | App0001 | False | – |
| | App0003 | False | – |

| APPLICATION IDENTIFICATION INFORMATION | TYPE-OF-BUSINESS IDENTIFICATION INFORMATION |
|---|---|
| App0001 | G0001 |
| App0002 | G0002 |
| App0003 | G0001 |
| App0004 | G0003 |
| App0005 | G0004 |

FIG. 51

① SELECT REGION   ② SEE TERMS OF USE

Select the region

| REGION | Japan |
|---|---|

SHOP INFORMATION (OPTIONAL)

BACK    NEXT

TYPE OF BUSINESS
- ☑ EDUCATION
- ☐ ADMINISTRATION
- ☐ MEDICAL SERVICE
- ☐ ARCHITECTURE

APPLICATION CATEGORY
- ☑ SCAN
- ☐ PRINT
- ☐ COPY
- ☑ FAX

SET EMAIL NOTIFICATION DESTINATION

| ADD | ADD FROM ADDRESS BOOK |

APPLICATION CHECK

| ✓ | EVERY DAY | 00:00:00 |
|---|---|---|
|   | EVERY MONDAY | 00:00:00 |

FIG. 52

| TYPE-OF-BUSINESS INFORMATION | TYPE OF BUSINESS |
|---|---|
| G0001 | EDUCATION |
| G0002 | ADMINISTRATION |
| G0003 | MEDICAL SERVICE |
| G0004 | ARCHITECTURE |
| ⋮ | ⋮ |

FIG. 53

| CATEGORY IDENTIFICATION INFORMATION | CATEGORY ITEM |
|---|---|
| K0001 | SCAN |
| K0002 | PRINT |
| K0003 | COPY |
| K0004 | FAX |
| ⋮ | ⋮ |

FIG. 54

| APPLICATION IDENTIFICATION INFORMATION | APPLICATION NAME | APPLICATION CATEGORY | TYPE-OF-BUSINESS ID | PRICE INFORMATION | DESCRIPTION INFORMATION |
|---|---|---|---|---|---|
| App0001 | APP A | SCAN | EDUCATION | 100 YEN | TAKE IMAGE EASILY |
| App0002 | APP B | PRINT | ADMINISTRATION | 300 YEN | PRINT EASILY |
| App0003 | APP C | COPY | EDUCATION | 5000 YEN | ... |
| App0004 | APP D | FAX | MEDICAL SERVICE | 100 YEN | ... |
| App0005 | APP E | COPY | ARCHITECTURE | 4500 YEN | ... |

FIG. 56

| APPLICATION IDENTIFICATION INFORMATION | APPLICATION NAME | CATEGORY IDENTIFICATION INFORMATION | TYPE-OF-BUSINESS IDENTIFICATION INFORMATION | PRICE INFORMATION | DESCRIPTION INFORMATION |
|---|---|---|---|---|---|
| App0001 | APP A | K0001 | G0001 | 100 YEN | TAKE IMAGE EASILY |
| App0002 | APP B | K0002 | G0002 | 300 YEN | PRINT EASILY |
| App0003 | APP C | K0003 | G0001 | 5000 YEN | ... |
| App0004 | APP D | K0004 | G0003 | 100 YEN | ... |
| App0005 | APP E | K0003 | G0004 | 4500 YEN | ... |

FIG. 57

| APPLICATION IDENTIFICATION INFORMATION | REGISTRATION DATE AND TIME INFORMATION | VERSION UP DATE AND TIME INFORMATION | NUMBER OF DOWNLOADS ACCORDING TO SHOP INFORMATION | |
|---|---|---|---|---|
| | | | Dealer001 | Dealer002 |
| App0001 | 2015/03/05 12:00:00 | 2016/01/05 12:00:00 | 10 | 15 |
| App0002 | 2015/05/15 12:00:00 | 2015/12/01 12:00:00 | 156 | 982 |
| App0003 | 2015/12/10 12:00:00 | 2016/03/07 12:00:00 | 6842 | 9432 |
| App0004 | 2016/03/05 12:00:00 | 2015/05/20 12:00:00 | 71 | 62 |
| App0005 | 2016/06/03 12:00:00 | — | 8677 | 7841 |

INFORMATION PROCESSING SYSTEM AND INFORMATION PROCESSING METHOD FOR GENERATING AN APPLICATION PROVIDING SCREEN FOR DISPLAY AT A REQUESTING DEVICE

CROSS-REFERENCE TO RELATED APPLICATIONS

This patent application is based on and claims priority pursuant to 35 U.S.C. § 119(a) to Japanese Patent Application No. 2016-142262, filed on Jul. 20, 2016, and Japanese Patent Application No. 2017-013448, filed on Jan. 27, 2017, in the Japan Patent Office, the entire disclosure of which is hereby incorporated by reference herein.

BACKGROUND

Technical Field

The present invention relates to an information processing system and an information processing method.

Description of the Related Art

In recent years, a variety of communication devices typified by mobile phones and mobile information terminals have been widely used, and accordingly, applications usable by communication devices have been actively developed.

For example, there is a technique for introducing an application from a server, so that the introduced application is selected on a device side, and the selected application is downloaded to the device.

However, in some cases, applications used by a device differ according to the shop that sells the device. Accordingly, an application that is not usable by a device might be introduced to the device. Therefore, there has been a problem in that an application that is appropriately usable by a device might not be introduced.

SUMMARY

Example embodiments of the present invention include an information processing apparatus capable of communicating with one or more devices via a network, which: receives, from a first device of the devices, a screen request that requests an application providing screen, the screen request including shop information indicating a first shop that sells the first device; obtain application correspondence information that associates shop information indicating the shop, application identification information for identifying one or more applications sold by the shop, and use promotion information indicating whether each application is a use-promoted application; specify, from among one or more applications associated with the shop information indicating the first shop, a first application having first identification information that is associated with the use promotion information indicating the use-promoted application, using the application correspondence information; and transmit, to the first device, an application providing screen for display at the first device, the application providing screen including information regarding the first application identified with the first application identification information as a recommended application for the first device.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is an illustration of an example of an input screen;

FIG. 8 is an illustration of an example of a confirmation screen;

FIG. 9 is an illustration of an example of information stored in a setting information memory;

FIG. 10 is an illustration of an example of a URL request;

FIG. 11 is an illustration of an example of a URL received in response to the URL request;

FIG. 12 is an illustration of an example of a screen request;

FIG. 13 is an illustration of an example of screen information;

FIG. 24 is an illustration of application detailed information;

FIG. 36 is an illustration of an example of application correspondence information according to a third modification example of the first embodiment;

FIG. 51 is an illustration of an example of an input screen according to the third embodiment;

FIG. 52 is an illustration of an example of type-of-business management information;

FIG. 53 is an illustration of an example of category management information;

FIG. 54 is an illustration of an example of first notification information;

FIG. 56 is an illustration of an example of first application management information;

FIG. 57 is an illustration of an example of second application management information;

Figure 1:
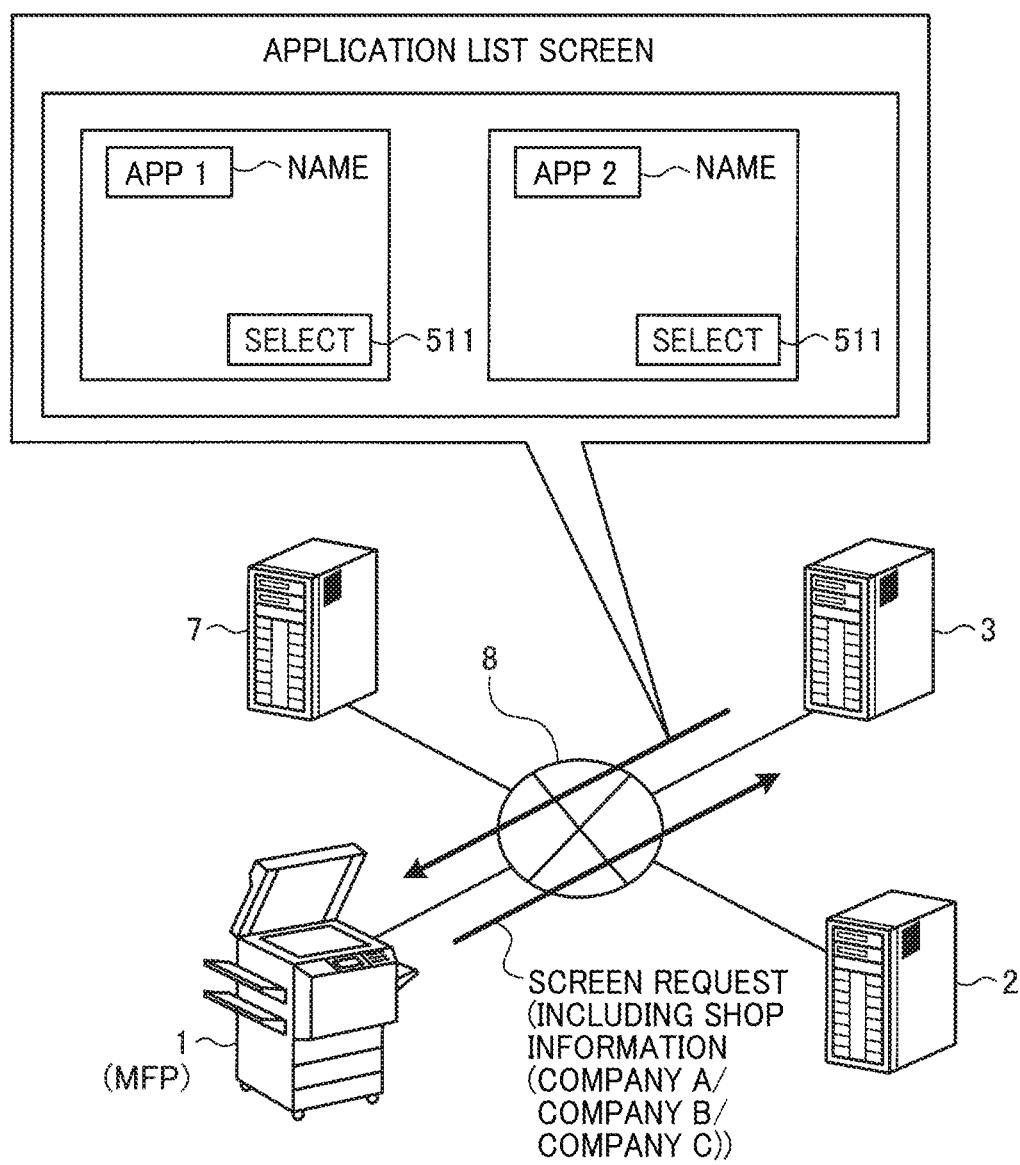
FIG. 1 is a schematic diagram illustrating an example of the configuration of an information processing system.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Now, an information processing system and an information processing method according to embodiments of the present invention will be described in detail below with reference to the accompanying drawings. In the following description, a multifunction peripheral (MFP), which is an embodiment of an image processing apparatus, is taken as an example of one or more devices connected to an information processing apparatus. However, the devices connected to the information processing apparatus are not limited to this. For example, examples of the devices include a camera, a projector, an interactive whiteboard (electronic blackboard), a teleconference/web conference system dedicated terminal, a digital signage, a production printer, a 3D printer, a facsimile, and the like. Note that the multifunction peripheral refers to an apparatus having a plurality of different functions such as a copier function, a scanner function, a printer function, and a fax function.

First Embodiment

FIG. 1 illustrates an example of a schematic configuration of an information processing system 100 according to this embodiment. As illustrated in FIG. 1, the information processing system 100 includes an MFP 1, a management server 2, an application market server 3, and an application server 7, which are connected to one another via a network 8.

The management server 2 manages a uniform resource locator (URL) for specifying the application market server 3 with which the MFP 1 performs communication. The management server 2 receives a URL request from the MFP 1 and transmits, as a response, a URL corresponding to the received URL request to the MFP 1. A specific configuration of the management server 2 will be described later. Note that the URL is taken here as an example of specification information for specifying the application market server 3. However, the specification information is not limited to this. For example, the specification information may be an internet protocol (IP) address, a domain name, or the like. The IP address is a number for identifying a device to and from which packets are transmitted and received on an IP. The domain name is a part of name for identifying an individual computer (device) on an IP network. Typically, the domain name is registered on a computer network together with the IP address. The specification information may be the IP address, the domain name, or a combination thereof. That is, the specification information may be at least one of the IP address and the domain name.

The application market server 3 is an example of an information processing apparatus and transmits, to the MFP 1, an application providing screen for providing an application to the MFP 1. Although a specific content will be described later, in response to a screen request that requests the application providing screen from the MFP 1, on the basis of shop information (information indicating a shop that sells the MFP 1) included in the received screen request, the application market server 3 specifies a use-recommended application (hereinafter also referred to as a "recommended app") whose use is recommended to the MFP 1 among applications sold by the shop indicated by the shop information. Then, in response to the screen request, the application providing screen for providing the "recommended app" is transmitted.

Note that in this example, software is installed in advance in the MFP 1, such as software (hereinafter also referred to as an "installer") that provides a function of performing control to install, in the MFP 1, an application (hereinafter also referred to as an "application market app") for acquiring a URL from the management server 2, for acquiring an application providing screen from the application market server 3 corresponding to the acquired URL, and for displaying the acquired application providing screen on the MFP 1 or an application selected by a user from among applications displayed on the application providing screen. In this example, the function of the application market app is implemented by using an application (hereinafter also referred to as a "browser app") for providing a function of a web browser. The browser app is also installed in advance in the MFP 1 in this example. The MFP 1 will be specifically described later.

The application server 7 stores a plurality of applications and, in response to a request from the MFP 1, transmits a target application to the MFP 1. Note that FIG. 1 illustrates only a single MFP 1 as a device included in the information processing system 100 for ease of description. However, the MFP 1 is not limited to this, and any number and any type of devices may be included in the information processing system 100. Likewise, any number of application market servers 3 may also be included in the information processing system 100, and for example, one or more application market servers 3 may be installed in each country or region.

Figure 2:
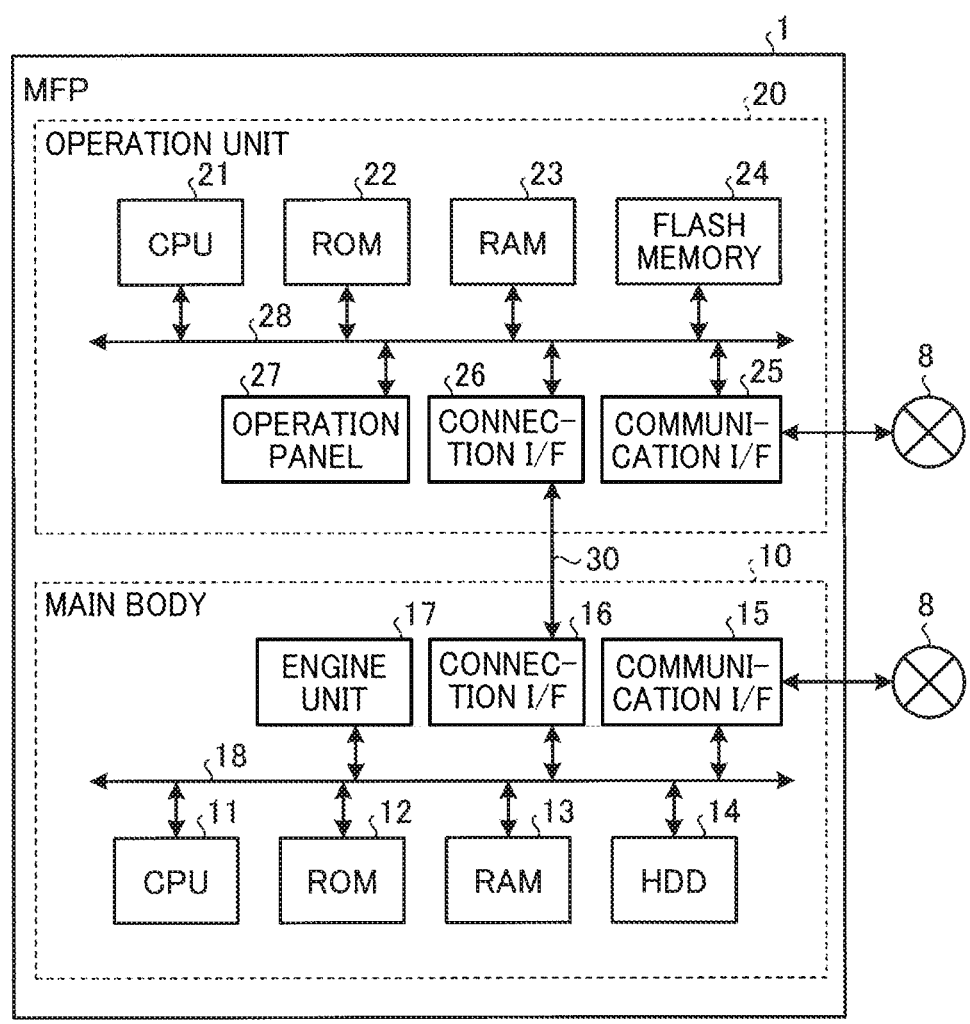
FIG. 2 is a schematic diagram illustrating an example of a hardware configuration of a multifunction peripheral (MFP)

Next, a hardware configuration of the MFP 1 will be described with reference to FIG. 2. As illustrated in FIG. 2, the MFP 1 includes a main body 10 that can implement a variety of functions such as a copier function, a scanner function, a fax function, and a printer function, and an operation unit (operation unit for operating the main body 10) 20 that receives a user operation. In this disclosure, reception of a user operation means reception of information (including a signal indicating a coordinate value on a screen and the like) that is input in accordance with a user operation. The main body 10 and the operation unit 20 are connected so as to perform communication with each other via a dedicated communication path 30. The communication path 30 may comply with, for example, the universal serial bus (USB) standard, but also may comply with any standard regardless of wired or wireless.

The main body 10 can operate in accordance with operations received by the operation unit 20. In addition, the main body 10 can also perform communication with an external apparatus, such as a client personal computer (PC), and can operate in accordance with instructions received from the external apparatus.

First, a hardware configuration of the main body 10 will be described. As illustrated in FIG. 2, the main body 10 includes a central processing unit (CPU) 11, a read only memory (ROM) 12, a random access memory (RAM) 13, a hard disk drive (HDD) 14, a communication interface (I/F) 15, a connection I/F 16, and an engine unit 17, which are connected to one another via a system bus 18.

The CPU 11 controls entire operation of the main body 10. By executing programs stored in the ROM 12, the HDD 14, or the like by using the RAM 13 as a work area, the CPU 11 controls the operations of the entire main body 10 and implements the above-described variety of functions, such as a copier function, a scanner function, a fax function, and a printer function.

The communication I/F 15 is an interface for connecting to the network 8. The connection I/F 16 is an interface for performing communication with the operation unit 20 via the communication path 30.

The engine unit 17 is a hardware component that perform is processing other than general information processing and communication for implementing a copier function, a scanner function, a fax function, and a printer function. For example, the engine unit 17 includes a scanner (image reading unit) that scans and reads a document image, a plotter (image forming unit) that performs printing on a sheet material such as a sheet of paper, a fax unit that performs facsimile communication, and the like. In addition, the engine unit 17 can also include specific optional components such as a finisher for assorting printed sheet materials or an auto document feeder (ADF) that automatically feeds documents.

Next, a hardware configuration of the operation unit 20 will be described. As illustrated in FIG. 2, the operation unit 20 includes a CPU 21, a ROM 22, a RAM 23, a flash memory 24, a communication I/F 25, a connection I/F 26, and an operation panel 27, which are connected to one another via a system bus 28.

The CPU 21 controls entire operation of the operation unit 20. By executing programs stored in the ROM 22, the flash memory 24, or the like by using the RAM 23 as a work area, the CPU 21 controls the operations of the entire operation unit 20 and implements a variety of functions such as information (image) display in accordance with an input received from a user, which will be described later.

The communication I/F 25 is an interface for connecting to the network 8. The connection I/F 26 is an interface for performing communication with the main body 10 via the communication path 30.

The operation panel 27 receives a variety of inputs in accordance with user operations and displays various kinds of information (e.g., information in accordance with received operations, information indicating operation conditions of the MFP 1, and information indicating setting statuses). In this example, the operation panel 27 is implemented by a liquid crystal display (LCD) equipped with a touch panel function. However, the operation panel 27 is not limited to this. For example, the operation panel 27 may be implemented by an organic electroluminescent (EL) display equipped with a touch panel function. In addition to or in place of it, an operation unit such as hardware keys or a display such as a lamp may be provided.

Figure 3:
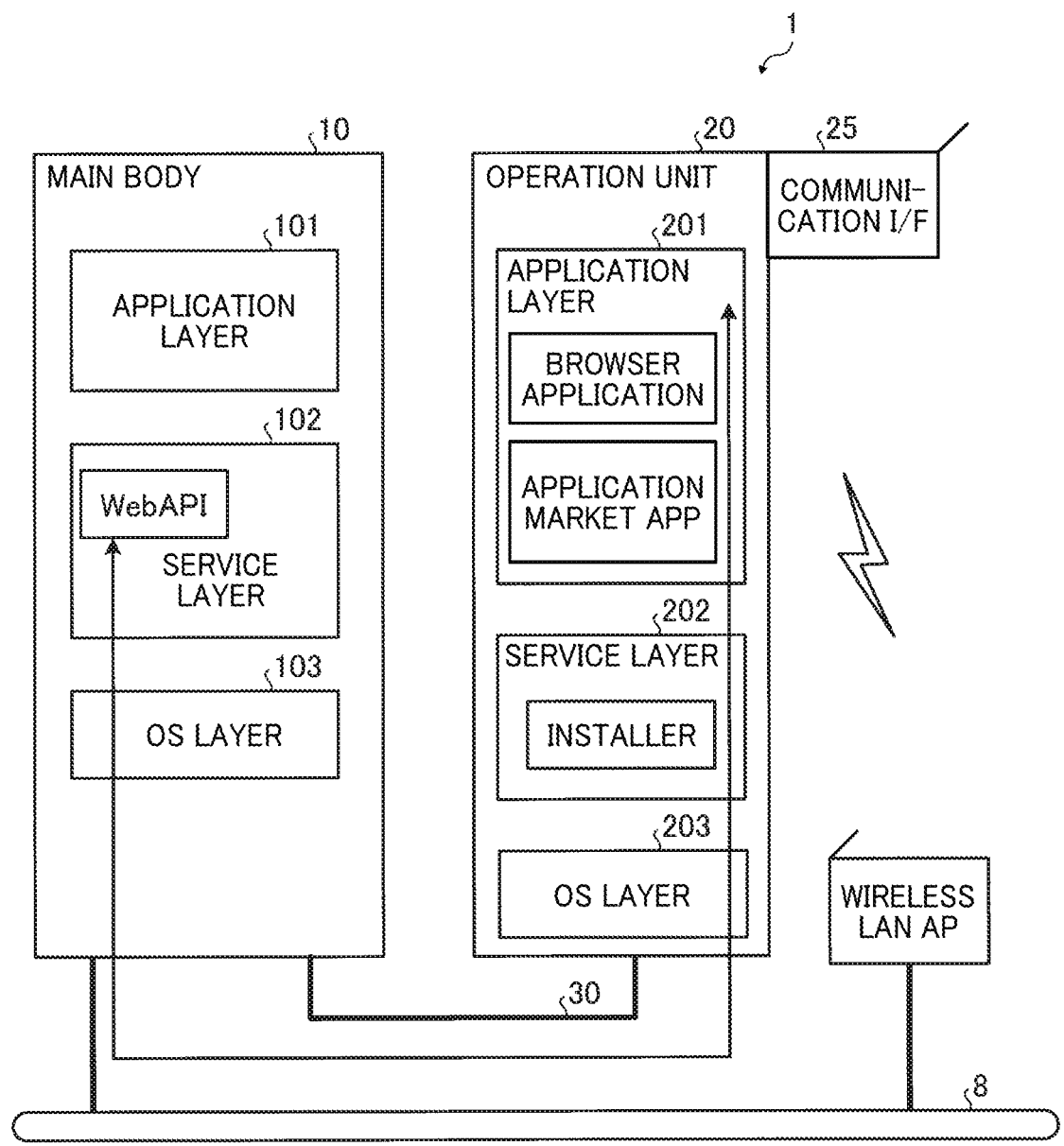
FIG. 3 is a schematic diagram illustrating an example of a software configuration of the MFP.

Next, a software configuration of the MFP 1 will be described. FIG. 3 schematically illustrates an example of the software configuration of the MFP 1. As illustrated in FIG. 3, the main body 10 includes an application layer 101, a service layer 102, and an operating system (OS) layer 103. The application layer 101, the service layer 102, and the OS layer 103 correspond to various kinds of software stored in the ROM 12, the HDD 14, and the like. The execution of such software by the CPU 11 provides a variety of functions.

Software of the application layer 101 is an application software (hereinafter also simply referred to as an "app") for operating a hardware resource to provide a predetermined function. Examples of the app include a copier app for providing a copier function, a scanner app for providing a scanner function, a fax app for providing a fax function, a printer app for providing a printer function, and the like.

Software of the service layer 102 is present between the application layer 101 and the OS layer 103 and provides an app with an interface for using a hardware resource included in the main body 10. More specifically, the software of the service layer 102 provides a function of receiving an operation request for a hardware resource and a function of mediating an operation request. An operation request received by the service layer 102 may be a request for reading with a scanner, printing with a plotter, or the like.

Note that the function of the interface implemented by the service layer 102 is provided not only to the application layer 101 of the main body 10 but also to an application layer 201 of the operation unit 20. That is, the application layer 201 (app) of the operation unit 20 can also implement a function using a hardware resource (e.g., the engine unit 17) of the main body 10 via the interface function of the service layer 102. For example, the interface function of the service layer 102 is provided by web application programming interface (WebAPI). The operation unit 20 and the main body 10 can perform communication with each other by using the communication path 30 as a network.

Software of the OS layer 103 is a basic software (operating system (OS)) for providing basic functions of controlling the hardware included in the main body 10. The software of the service layer 102 converts a request for using a hardware resource from a variety of applications into a command that can be interpreted by the OS layer 103 and transfers the command to the OS layer 103. Then, by executing the command by using the software of the OS layer 103, the hardware resource operates in accordance with the request from the applications.

As in the main body 10, the operation unit 20 includes the application layer 201, a service layer 202, and an OS layer 203. The hierarchical structure of the application layer 201, the service layer 202, and the OS layer 203 included in the operation unit 20 is the same as the hierarchical structure in the main body 10. However, functions provided by an app of the application layer 201 and the type of an operation request that can be received by the service layer 202 are different from those in the main body 10. In this embodiment, software of the service layer 202 includes an installer and the like. The app of the application layer 201 may be software for operating a hardware resource included in the operation unit 20 to provide a predetermined function, but is typically software for providing functions of a user interface (UI) for operation and display related to the functions (the copier function, the scanner function, the fax function, and the printer function) of the main body 10. The app of the application layer 201 includes the browser app, the application market app, and the like.

Note that in this embodiment, in order to retain the independence of functions, the software of the OS layer 103 of the main body 10 differs from software of the OS layer 203 of the operation unit 20. That is, the main body 10 and the operation unit 20 independently operate on different operating systems. For example, it is possible to use Net-BSD (registered trademark) as the software of the OS layer 103 of the main body 10 and to use Android (registered trademark) as the software of the OS layer 203 of the operation unit 20.

As described above, since the main body 10 and the operation unit 20 operate on different operating systems in the MFP 1 according to this embodiment, communication between the main body 10 and the operation unit 20 is performed as communication between different apparatuses, not as inter-process communication within a common apparatus. Such communication corresponds to an operation (command communication) for transmitting information (instruction from user) received by the operation unit 20 to the main body 10, an operation in which the main body 10 notifies the operation unit 20 of an event, or the like. Here, by the operation unit 20 performing command communication to the main body 10, the function of the main body 10 can be used. In addition, the event of which the main body 10 notifies the operation unit 20 includes the execution status of operation in the main body 10, the content that has been set in the main body 10, and the like.

In this embodiment, since power is supplied to the operation unit 20 from the main body 10 via the communication path 30, the power source of the operation unit 20 can be controlled differently from (independently of) the power source of the main body 10.

Figure 4:
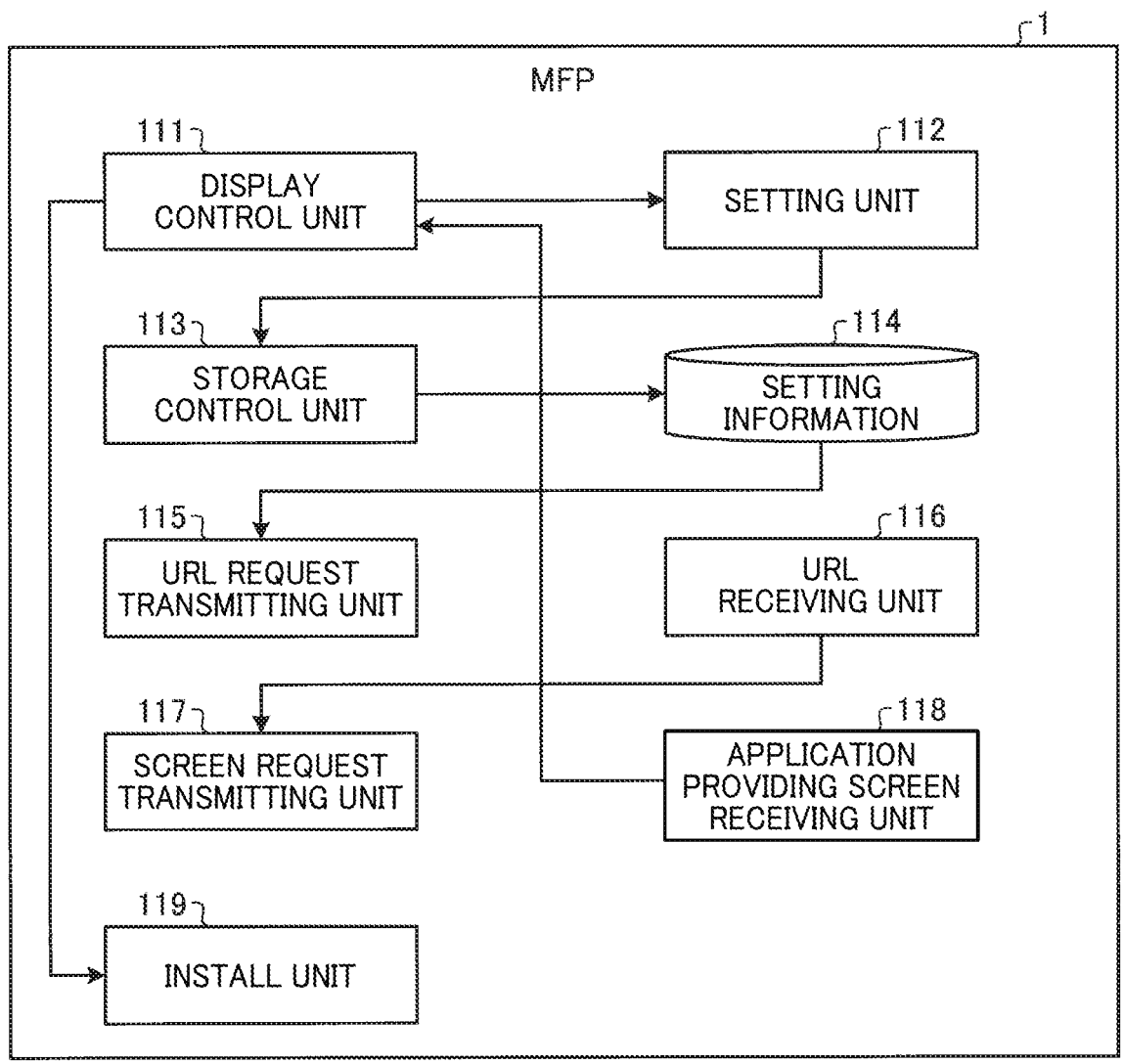
FIG. 4 is a schematic diagram illustrating an examples functional configuration of the MFP.

Next, functions of the MFP 1 will be described. FIG. 4 is a block diagram illustrating examples of functions of the MFP 1. As illustrated in FIG. 4, the MFP 1 includes a display control unit 111, a setting unit 112, a storage control unit 113, a setting information memory 114, a URL request transmitting unit 115, a URL receiving unit 116, a screen request transmitting unit 117, an application providing screen receiving unit 118, and an installing unit 119. FIG. 4 illustrates only the functions related to this embodiment for ease of description. However, the functions of the MFP 1 are not limited to these.

The display control unit 111 performs control to display a variety of screens on the operation panel 27 (display unit). The display control unit 111 according to this embodiment performs control to display an operation screen for performing a variety of operations on the operation panel 27. In addition, the display control unit 111 according to this embodiment also performs control to display the application providing screen on the operation panel 27. Specific examples of the application providing screen will be described later.

Figure 5:
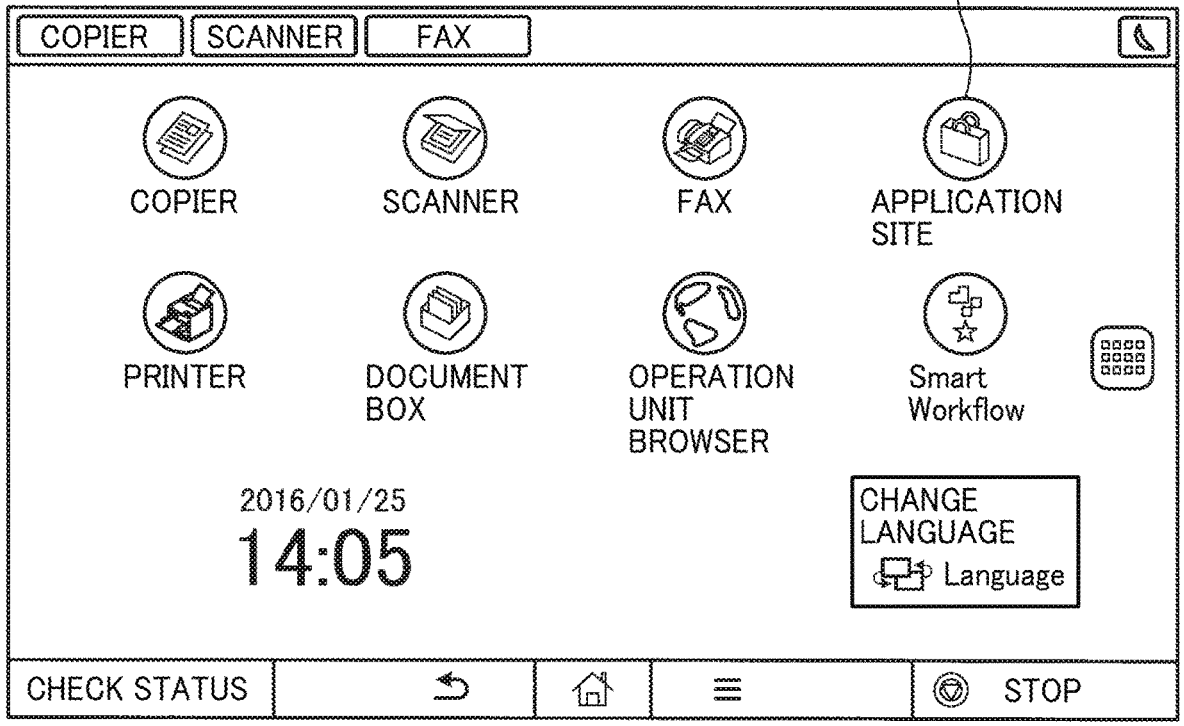
FIG. 5 is an illustration of an example of an operation screen.
Figure 6:
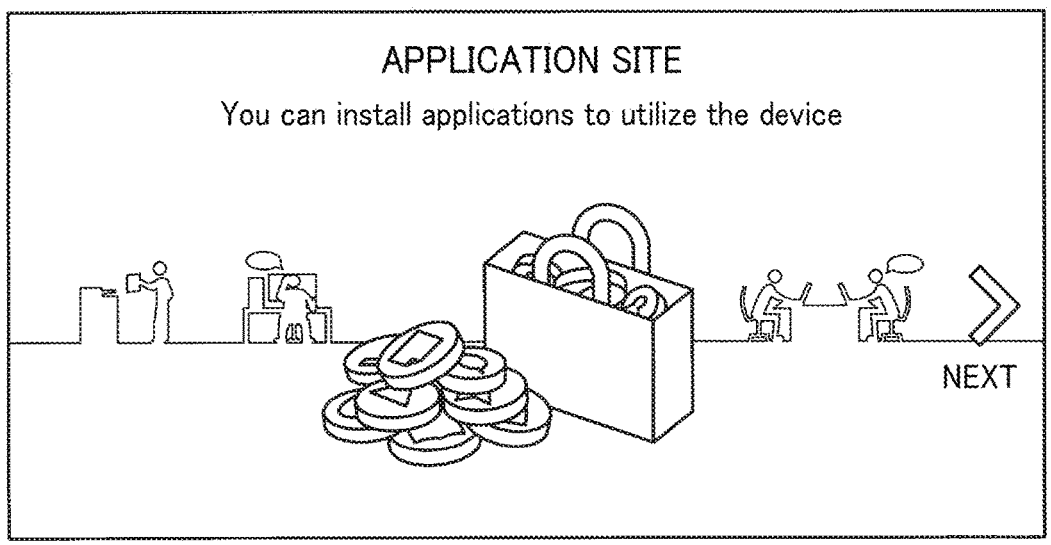
FIG. 6 is an illustration of an example of an initial screen.

FIG. 5 illustrates an example of the operation screen, and an icon 5 for starting the application market app is displayed on the operation screen. Now, an example operation performed when the application market app is started for the first time will be described. In this example, when the icon 5 is touched by a user, the application market app is started, and an initial screen such as a screen illustrated in FIG. 6 is displayed on the operation panel 27. In response to pressing of a display component (UI) representing an arrow right above "NEXT" on the initial screen, as illustrated in FIG. 7, an input screen is displayed on the operation panel 27. The input screen is for inputting region information indicating a region in which the MFP 1 is used ("selling" is assumed in this example; however, the use of the MFP 1 is not limited to this and may be lease, rental, or the like) and the shop information indicating the shop that sells the MFP 1. After settings in accordance with a variety of inputs have been stored, upon pressing of a display component (UI) representing an arrow right above "NEXT" on this input screen, as illustrated in FIG. 8, a confirmation screen for confirming terms of use (terms for being provided with screen information) is displayed on the operation panel 27. Upon selection of an item of "AGREE TERMS OF USE" on this confirmation screen, and upon pressing of a display component (UI) representing "OK", by using the stored settings, the application market app performs control to transmit a URL request, which will be described later, to the management server 2. The following operations will be described later. Note that at the time of starting the application market app for the second time and later, the screens illustrated in FIGS. 6 to 8 are not displayed, and by using the stored settings, the started application market app transmits a URL request, which will be described later, to the management server 2.

Referring back to FIG. 4, in accordance with an input for specifying the shop information indicating the shop that sells the MFP 1 or the region information indicating the region in which the MFP 1 is used, the setting unit 112 sets the shop information or the region information. In this example, in accordance with an input on the above-described input screen, the setting unit 112 can set the shop information or the region information.

The storage control unit 113 perform is control to store the shop information or region information that has been set by the setting unit 112. In this example, the storage control unit 113 performs control in such a manner that the shop information or region information that has been set by the setting unit 112 is stored as setting information in the setting information memory 114. Note that device identification information (device number) for uniquely identifying the MFP 1 may also be stored in the setting information memory 114. FIG. 9 illustrates an example of information (referred to as setting information) stored in the setting information memory 114. In this example, the setting information memory 114 stores the setting information including the device identification information, the shop information, and the region information. In addition, in this example, the device identification information is represented by nine numeric figures, in which the first four figures are a part for identifying a device type (device type information), and the last five figures are unique figures assigned to the device. The combination of these figures constitutes the information (device identification information) for uniquely identifying the device. In addition, in the example of FIG. 9, the shop information is represented by eight numeric figures, in which the first figure from the left represents the region. For example, "1" may correspond to "Japan", "2" may correspond to "USA", "3" may correspond to "Europe", and "4" may correspond to "Asia". In addition, the second to sixth figures from the left represent information for identifying the shop. The seventh and eighth figures from the left are numerals (checksum) for detecting an input error. Note that it is possible to employ a method for encrypting the entire information. The region information is information indicating the region in which the MFP 1 is used, and "JP" indicates "Japan".

The URL request transmitting unit 115 (specification information request transmitting unit) transmits, to the management server 2, a URL request (specification information request) that includes at least one of the shop information, the region information, and device information and that requests a URL (specification information) for specifying the application market server 3 with which communication is to be performed. In this example, the URL request transmitting unit 115 transmits, to the management server 2, a URL request that includes the device identification information (an example of the device information for specifying a device), the region information, and the shop information, which have been stored in the setting information memory 114, and that requests a URL of the application market server 3 with which communication is to be performed. However, the URL request is not limited to this. In accordance with connection correspondence information, which will be described later, managed by the management server 2, for example, the URL request may include any one or more of the shop information, the region information, and the device identification information. FIG. 10 illustrates an example of the URL request. In the URL request illustrated in FIG. 10, parameter "device_id" indicates the device identification information, parameter "region_code" indicates the region information, and parameter "dealer_code" indicates the shop information. Note that the description of "parameter name=value" connected with "&" following "?" is a standard notation called a Query parameter. In addition, "Host:www.example.com" is an example of a host name to be connected as a default, the host name being stored in a memory (e.g., the flash memory 24).

In response to the above-described URL request, the URL receiving unit 116 acquires the URL from the management server 2. FIG. 11 illustrates an example of the URL of the application market server 3 received in response to the URL request.

The screen request transmitting unit 117 transmits the screen request to the application market server 3. The screen request includes at least the above-described shop information and requests the application providing screen for providing an application. More specifically, the screen request transmitting unit 117 transmits the above-described screen request to the application market server 3 specified by the URL received by the URL receiving unit 116. For example, the screen request transmitting unit 117 can access the application market server 3 by HTTP redirect. That is, if the URL received by the URL receiving unit 116 is changed, the application market server 3 transmits, to the MFP 1, a response in which the URL after change is described, and the MFP 1 (the screen request transmitting unit 117) can access the application market server 3 by using the URL described in the response. In addition, in this example, the screen request further includes the device identification information (device number) for identifying the MFP 1. Here, the operation unit 20 (application market app) has a function of acquiring the device identification information (device number) from the main body 10 by using WebAPI of the main body. FIG. 12 illustrates an example of the screen request.

In response to the screen request, the application providing screen receiving unit 118 receives the application providing screen from the application market server 3. The display control unit 111 performs control to display, on the operation panel 27, the application providing screen received by the application providing screen receiving unit 118.

Note that the response to the screen request is not limited to this. For example, in response to the screen request, the application market server 3 may transmit, to the MFP 1, screen information (including application display information (including description information such as an introducing message), a variety of commands such as an install command, layout information indicating the layout of a variety of display components, and the like) from which the application providing screen is to be generated, and the MFP 1 may generate and display the application providing screen on the basis of the screen information received from the application market server 3. FIG. 13 illustrates an example of the screen information received by the application providing screen receiving unit 118 in this case. Here, the transmission of the screen information by the application market server 3 as described above is included in the concept of "transmitting the application providing screen".

Figure 14:
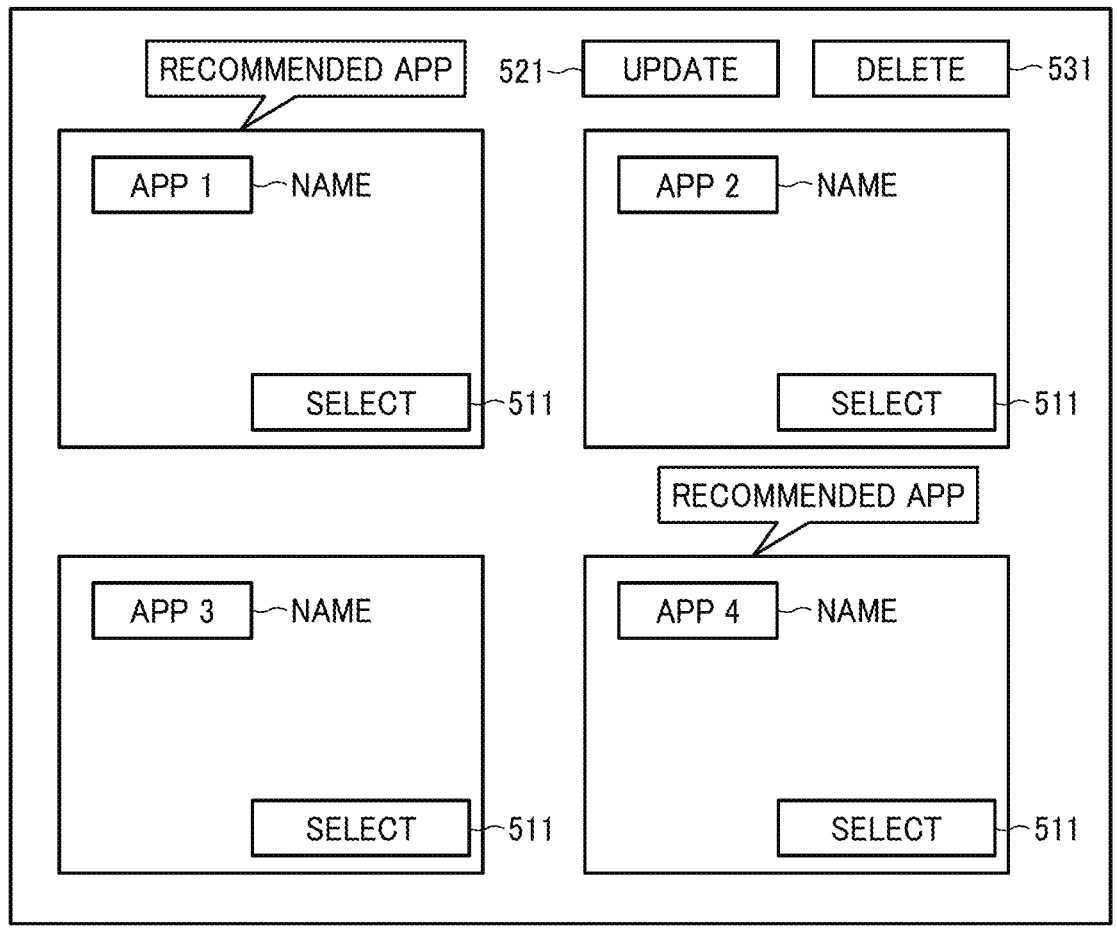
FIG. 14 is an illustration of an example of an application providing screen.

FIG. 14 illustrates an example of the application providing screen. In the example of FIG. 14, for each application that is usable by the MFP 1, the application providing screen displays at least the name of the application and an application selection button 511 for selecting the application. As will be specifically described later, an image (also referred to as a "budge image" in the following description) indicating that the application is a "recommended app" is added to a "recommended app" among the applications displayed on the application providing screen according to this embodiment. In addition, in the example of FIG. 14, the application providing screen also displays an update selection button 521 for selecting updating of an application, a delete selection button 531 for selecting deleting of an application, and the like.

Figure 15:
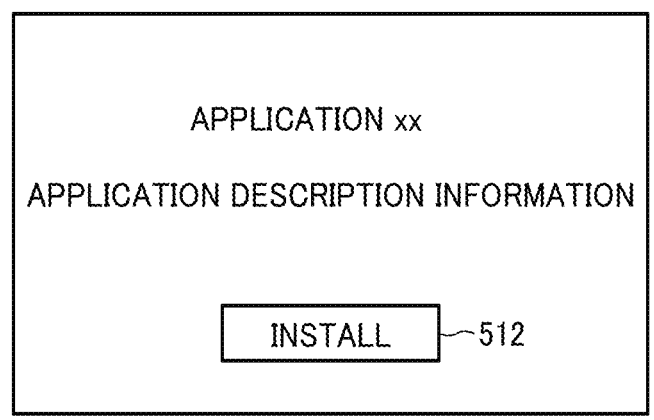
FIG. 15 is an illustration of an example of an install instruction screen.

Upon any one of the application selection buttons 511 being pressed, the display control unit 111 performs control to display, on the operation panel 27, an install instruction screen for displaying detailed contents of a corresponding application and for receiving an instruction for installing the application. FIG. 15 illustrates an example of the install instruction screen. In the example of FIG. 15, the install instruction screen displays application description information of the corresponding application and an install button 512 for an install instruction. In this example, the pressing of the install button 512 corresponds to the selection of an install command.

Figure 16:
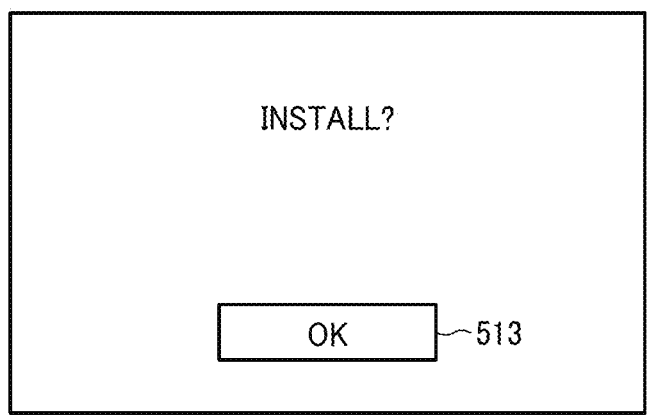
FIG. 16 is an illustration of an example of an install confirmation screen.

In this example, upon the install button 512 being pressed, the display control unit 111 performs control to display, on the operation panel 27, an install confirmation screen for final install confirmation. FIG. 16 illustrates an example of the install confirmation screen. In the example of FIG. 16, the install confirmation screen displays a confirmation button 513 for inputting a final consent of installment. In this example, an install command is pasted onto the confirmation button 513 in JavaScript (registered trademark). Upon the confirmation button 513 being pressed, the display control unit 111 notifies the installing unit 119 of the install command pasted onto the confirmation button 513 that has been pressed. Then, the installing unit 119 executes the install command. Specifically, the installing unit 119 transmits an application request to the application server 7. The application request includes application identification information for identifying an application and requests the application. Then, in response to the application request, the installing unit 119 receives (downloads) the application from the application server 7 and installs the received application in the MFP 1.

Note that the above-described functions of the units (the display control unit 111, the setting unit 112, the storage control unit 113, the URL request transmitting unit 115, the URL receiving unit 116, the screen request transmitting unit 117, the application providing screen receiving unit 118, and the installing unit 119) of the MFP 1 are implemented by the CPU (the CPU 11 or the CPU 21) executing programs stored in a memory (e.g., the ROM 12, the HDD 14, the ROM 22, and the flash memory 24). However, the implementation of the functions is not limited to the above example. For example, at least one of the above-described functions of the units of the MFP 1 may be implemented by a dedicated hardware circuit (e.g., a semiconductor integrated circuit). In addition, the above-described setting information memory 114 may be achieved by, for example, the HDD 14 of the main body 10, the flash memory 24 of the operation unit 20, or the like. Note that in this example, the above-described functions of the URL request transmitting unit 115, the URL receiving unit 116, the screen request transmitting unit 117, and the application providing screen receiving unit 118 are implemented by a combination of the CPU 21 and the communication I/F 25.

Figure 17:
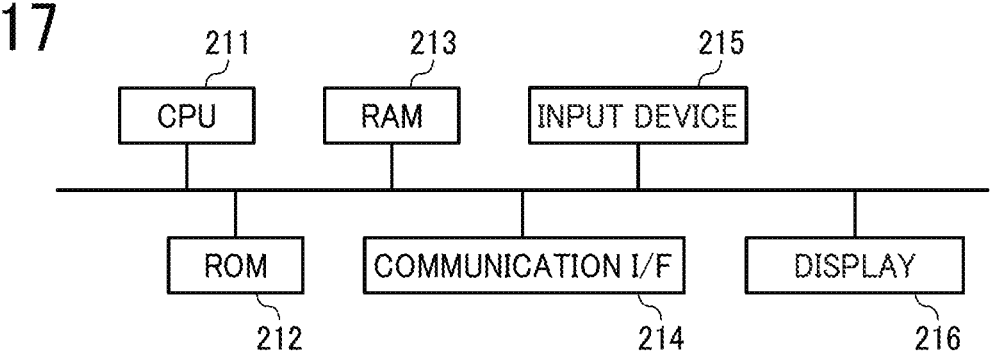
FIG. 17 is a schematic diagram illustrating an example of a hardware configuration of a management server.

Next, the configuration of the management server 2 will be described. FIG. 17 illustrates an example of a hardware configuration of the management server 2. As illustrated in FIG. 17, the management server 2 includes a CPU 211, a ROM 212, a RAM 213, a communication I/F 214, an input device 215, and a display 216. Note that the minimum configuration related to this embodiment is illustrated here as an example. However, the hardware configuration of the management server 2 is not limited to this configuration. The CPU 211 performs centralized control on the operations of the management server 2. The ROM 212 is a nonvolatile memory that stores various kinds of data such as programs. The RAM 213 is a volatile memory that functions as a work area of various kinds of processing performed by the CPU 211. The communication I/F 214 is an interface for performing communication with the network 8. The input device 215 is a device used for input operations performed by a user and is implemented by, for example, a mouse, a keyboard, and the like. The display 216 is a device that displays various kinds of information and is implemented by, for example, an LCD and the like.

Figure 18:
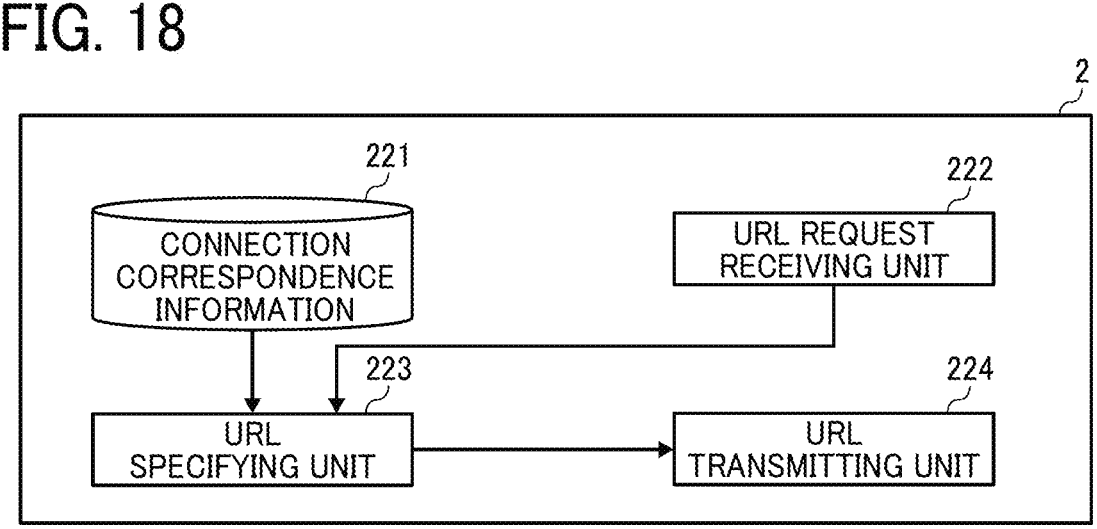
FIG. 18 is a schematic diagram illustrating an example functional configuration of the management server.

FIG. 18 illustrates examples of functions of the management server 2. As illustrated in FIG. 18, the management server 2 includes a connection correspondence information memory 221, a URL request receiving unit 222, a URL specifying unit 223, and a URL transmitting unit 224. Note that FIG. 18 illustrates only the functions related to this embodiment for ease of description. However, the functions of the management server 2 are not limited to these.

Figures 19, 20:
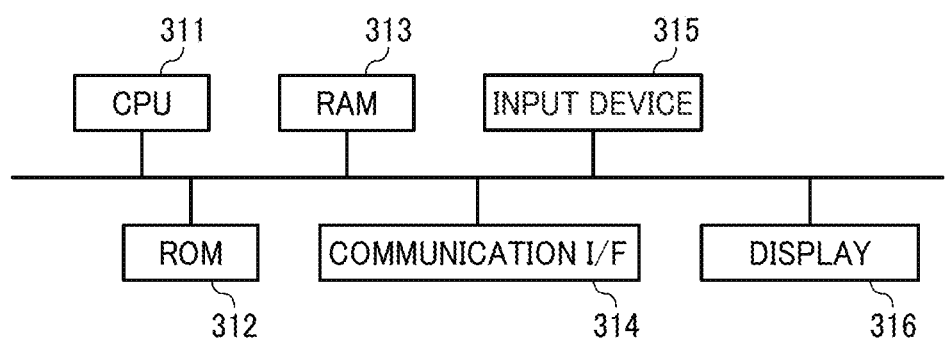
FIG. 19 is an illustration of an example of connection correspondence information.
FIG. 20 is a schematic diagram illustrating an example of a hardware configuration of an application market server.

The connection correspondence information memory 221 stores connection correspondence information that indicates the correspondence relationship between at least one of the shop information, the region information, and the device identification information and the URL for specifying the application market server 3 with which the MFP 1 performs communication. In this embodiment, the connection correspondence information memory 221 stores the connection correspondence information in which the URL (URL indicating the location of a corresponding application market server 3 on the network 8) is associated with each combination of the device identification information, the shop information, and the region information. FIG. 19 illustrates an example of the connection correspondence information according to this embodiment.

Referring back to FIG. 18, the URL request receiving unit 222 is an example of a "specification information receiving unit" and receives the above-described URL request from the MFP 1. The URL specifying unit 223 is an example of a "specification information specifying unit" and specifies, on the basis of the above-described connection correspondence information, the URL corresponding to the URL, request received by the URL request receiving unit 222. In this example, on the basis of the connection correspondence information stored in the connection correspondence information memory 221, the URL specifying unit 223 specifies the URL that is associated with a combination of the device identification information, the shop information, and the region information included in the URL request received by the URL request receiving unit 222.

The URL transmitting unit 224 is an example of a "specification information transmitting unit" and, in response to the URL request received by the URL request receiving unit 222, transmits the URL specified by the URL specifying unit 223 to the MFP 1.

The above-described functions of the units (the URL request receiving unit 222, the URL specifying unit 223, and the URL transmitting unit 224) of the management server 2 are implemented by the CPU 211 executing programs stored in the ROM 212 and the like. However, the implementation of the functions is not limited to the above example. For example, at least one of the above-described functions of the units of the management server 2 may be implemented by a dedicated hardware circuit (e.g., a semiconductor integrated circuit). In addition, the above-described connection correspondence information memory 221 may be realized by an auxiliary memory such as the ROM 212 or a HDD. Note that in this example, each function of the URL request receiving unit 222 and the URL transmitting unit 224 is implemented by a combination of the CPU 211 and the communication I/F 214.

In addition, for example, the above-described functions of the units of the management server 2 may be installed in a plurality of servers in a dispersed manner. That is, the management server 2 may be implemented by a plurality of servers (information processing apparatuses) including at least the above-described function of the URL request receiving unit 222, the above-described function of the URL specifying unit 223, and the above-described function of the URL transmitting unit 224.

In addition, for example, even if the application market server 3 for providing an application providing screen to any MFP 1 is changed to another application market server in accordance with a change in the number of application market servers 3, a change of the managed area, and the like, the management server 2 can hold the above-described connection correspondence information (information indicating the correspondence relationship between the region information and the URL) that reflects the change. Accordingly, without being influenced by the convenience of the provider of the application providing screen, the MFP 1 can acquire the URL for specifying the application server 7 with which the MFP 1 performs communication.

Next, the configuration of the application market server 3 will be described. FIG. 20 illustrates an example of a hardware configuration of the application market server 3. As illustrated in FIG. 20, the application market server 3 includes a CPU 311, a ROM 312, a RAM 313, a communication I/F 314, an input device 315, and a display 316. Note that the minimum configuration related to this embodiment is illustrated here as an example. However, the hardware configuration of the application market server 3 is not limited to this configuration. The CPU 311 performs centralized control on the operations of the application market server 3. The ROM 312 is a nonvolatile memory that stores various kinds of data such as programs. The RANI 313 is a volatile memory that functions as a work area of various kinds of processing performed by the CPU 311. The communication I/F 314 is an interface for performing communication with the network 8. The input device 315 is a device used for input operations performed by a user and is implemented by, for example, a mouse, a keyboard, and the like. The display 316 is a device that displays various kinds of information and is implemented by, for example, an LCD and the like.

Figures 21, 22:
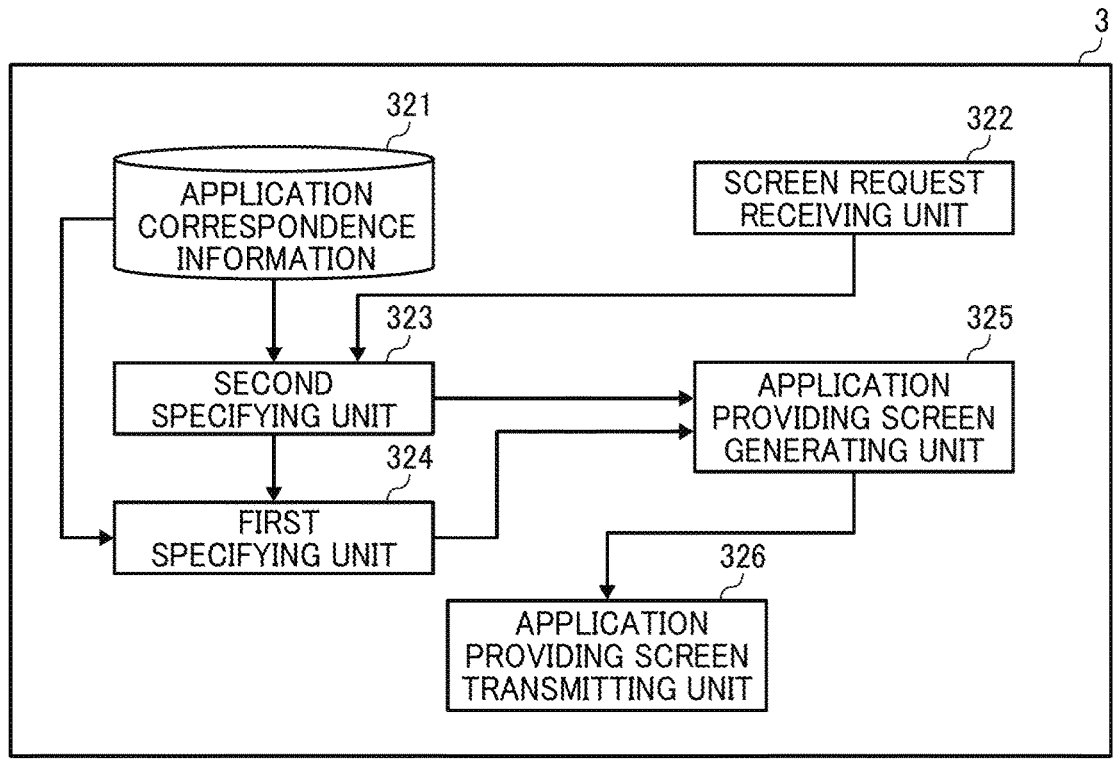
FIG. 21 a schematic diagram illustrating an example functional configuration of the application market server.
FIG. 22 is an illustration of an example of application correspondence information.

FIG. 21 illustrates examples of functions of the application market server 3. As illustrated in FIG. 21, the application market server 3 includes an application correspondence information memory 321, a screen request receiving unit 322, a second specifying unit 323, a first specifying unit 324, an application providing screen generating unit 325, and an application providing screen transmitting unit 326. FIG. 21 illustrates only the functions related to this embodiment for ease of description. However, the functions of the application market server 3 are not limited to these.

The application correspondence information memory 321 stores application correspondence information indicating the correspondence relationship between the shop information, the application identification information for identifying an application sold by the shop, and use promotion information indicating whether the application is a use-promoted application. FIG. 22 illustrates an example of the application correspondence information. In the example of FIG. 22, the use promotion information indicating "False" means that an application is not a use-promoted application, and the use promotion information indicating "True" means that an application is a use-promoted application.

The screen request receiving unit 322 receives the above-described screen request from the MFP 1. On the basis of the application correspondence information stored in the application correspondence information memory 321, the second specifying unit 323 specifies pieces of the application identification information that are associated with the shop information included in the screen request received by the screen request receiving unit 322. From among the pieces of the application identification information specified by the second specifying unit 323, the first specifying unit 324 specifies a piece of the application identification information that is associated with the use promotion information (in this example, the use promotion information indicating "True") indicating a use-promoted application. That is, it can be considered that, on the basis of the application correspondence information, from among the pieces of the application identification information that are associated with the shop information included in the screen request, the first specifying unit 324 specifies the piece of the application identification information that is associated with the use promotion information indicating a use-promoted application.

For example, a case is assumed in which the application correspondence information is as illustrated in FIG. 22 and in which the shop information included in the screen request received by the screen request receiving unit 322 is "Dealer001". In this case, the second specifying unit 323 specifies four pieces of the application identification information ("App0001", "App0002", "App0004", and "App0005" in the example of FIG. 22) that are associated with "Dealer001" in FIG. 22. Then, the first specifying unit 324 specifies, from among the four pieces of the application identification information specified by the second specifying unit 323, two pieces of the application identification information ("App0004" and "App0005" in the example of FIG. 22) that are associated with the use promotion information indicating "True".

The application providing screen generating unit 325 generates the application providing screen for providing an application identified by the piece of the application identification information specified by the first specifying unit 324 as the use-recommended application ("recommended app") whose use is recommended to the MFP 1. The application providing screen generating unit 325 according to this embodiment generates the application providing screen for providing the use-recommended application identified by the piece of the application identification information specified by the first specifying unit 324 and an application other than the use-recommended application from among applications identified by the pieces of the application identification information specified by the second specifying unit 323.

Furthermore, the application providing screen generating unit 325 according to this embodiment generates the application providing screen on which the use-recommended application is displayed to be more remarkable than the other application. In this example, the application providing screen generating unit 325 displays the "recommended app" to be more remarkable than the other application by adding, to the "recommended app", the image (budge image) indicating that the application is the "recommended app". However, the manner in which the "recommended app" is displayed is not limited to this. For example, the "recommended app" may be displayed to be more remarkable than the other application by being displayed in a higher position than the other application.

Now, a method for generating the application providing screen according to this embodiment will be specifically described. Each time one of the plurality of pieces of the application identification information specified by the second specifying unit 323 is selected, the application providing screen generating unit 325 according to this embodiment determines whether the selected piece of the application identification information is included in one or more pieces of the application identification information specified by the first specifying unit 324. If the determination result is positive, the application providing screen generating unit 325 according to this embodiment adds, to an application identified by the selected piece of the application identification information, first flag information indicating that the application is the "recommended app" and arranges the application at the end. If the determination result is negative, the application providing screen generating unit 325 according to this embodiment does not add the first flag information to the application identified by the selected piece of the application identification information and arranges the application at the end. Then, the application providing screen generating unit 325 adds the budge image indicating that the application is the "recommended app" to the application to which the first flag information has been added and generates the application providing screen.

Figure 23:
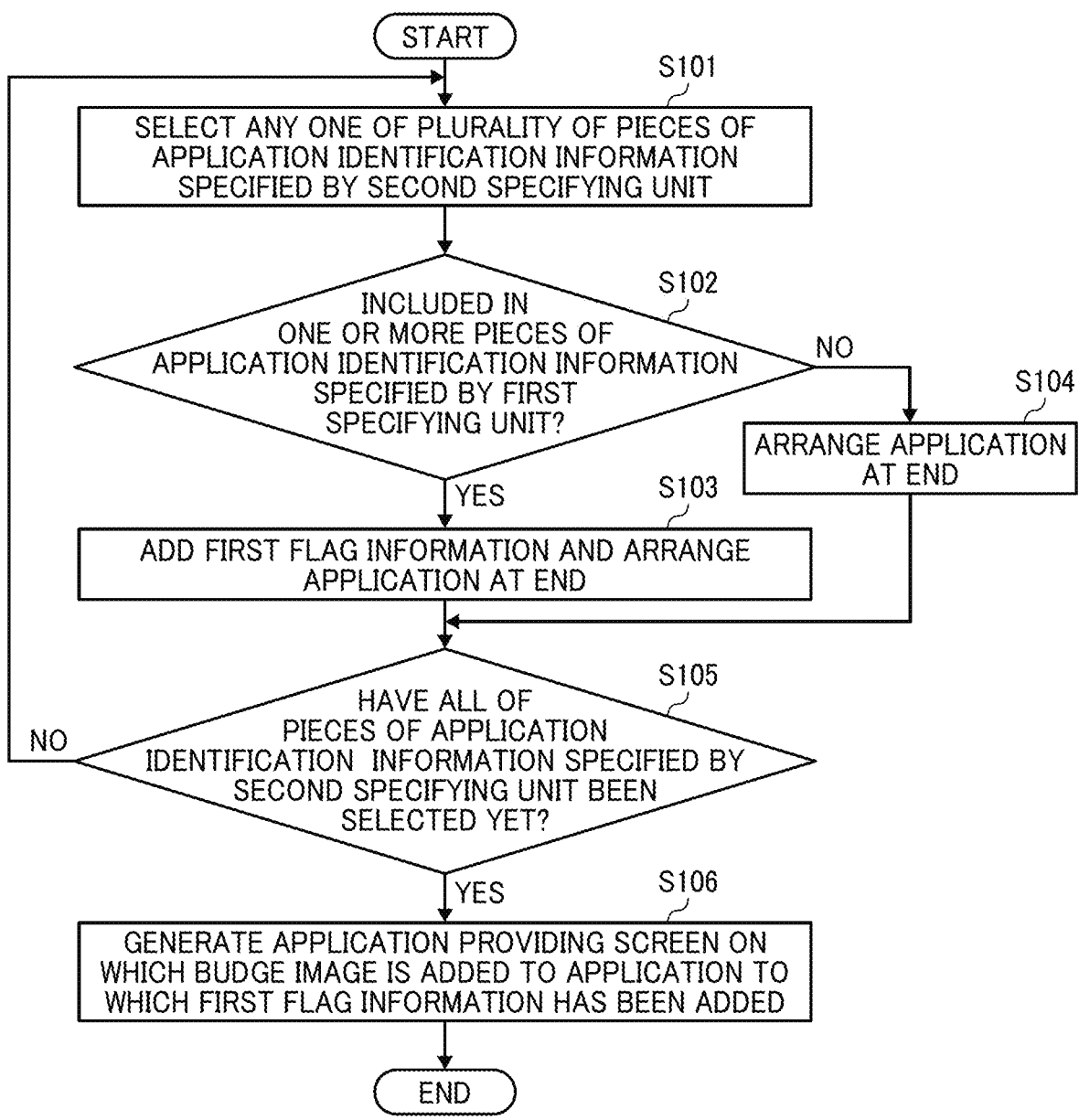
FIG. 23 is a flowchart illustrating an example operation of generating an application providing screen.

FIG. 23 is a flowchart illustrating an example operation of the application providing screen generating unit 325. Here, it is assumed that the application providing screen generating unit 325 has already acquired a group of pieces of the application identification information specified by the second specifying unit 323 and a group of pieces of the application identification information specified by the first specifying unit 324.

As illustrated in FIG. 23, the application providing screen generating unit 325 selects any (unselected) one of the plurality of pieces of the application identification information specified by the second specifying unit 323 (step S101). Then, the application providing screen generating unit 325 determines whether the piece of the application identification information selected in step S101 is included in the one or more pieces of the application identification information specified by the first specifying unit 324 (step S102).

If the result in step S102 is positive (step S102: YES), the application providing screen generating unit 325 adds the first flag information to an application identified by the piece of the application identification information selected in step S101 and arranges the application at the end (the end in the arrangement direction) (step S103). On the other hand, if the result in step S102 is negative (step S102: NO), the application providing screen generating unit 325 does not add the first flag information to the application identified by the piece of the application identification information selected in step S101 and arranges the application at the end (step S104).

After the above-described step S103 or S104, the application providing screen generating unit 325 determines whether all of the pieces of the application identification information specified by the second specifying unit 323 have already been selected (step S105). If the result in step S105 is negative (step S105: NO), the above-described processing in and after step S101 is repeated. On the other hand, if the result in step S105 is positive (step S105: YES), the application providing screen generating unit 325 generates the application providing screen, such as a screen illustrated in FIG. 14, on which the above-described budge image is added to the application to which the first flag information has been added among a plurality of applications that are sequentially arranged in the above manner (step S106).

For example, as illustrated in FIG. 24, the application market server 3 holds in advance application detailed information in which each piece of the application identification information is associated with display information including the language, a display name, an introducing message, a display image, and the like. The application market server 3 further holds in advance information that is used to generate the application providing screen including a variety of commands such as an install command, the above-described budge image, layout information indicating the layout of a variety of display components, and the like, and generates the application providing screen by using such information.

Referring back to FIG. 21, in response to the screen request received by the screen request receiving unit 322, the application providing screen transmitting unit 326 transmits the application providing screen generated by the application providing screen generating unit 325 to the MFP 1. That is, the application providing screen transmitting unit 326 transmits, to the MFP 1, the application providing screen for providing, as the "recommended app", the application identified by the piece of the application identification information specified by the first specifying unit 324.

The above-described functions of the units (the screen request receiving unit 322, the second specifying unit 323, the first specifying unit 324, the application providing screen generating unit 325, and the application providing screen transmitting unit 326) of the application market server 3 are implemented by the CPU 311 executing programs stored in the ROM 312 and the like. However, the implementation of the functions is not limited to the above example. For example, at least one of the above-described functions of the units of the application market server 3 may be implemented by a dedicated hardware circuit (e.g., a semiconductor integrated circuit). In addition, the above-described application correspondence information memory 321 may be implemented by the ROM 312 or the like. Note that in this example, each function of the screen request receiving unit 322 and the application providing screen transmitting unit 326 is implemented by a combination of the CPU 311 and the communication I/F 314.

In addition, for example, the above-described functions of the units of the application market server 3 may be installed in a plurality of servers in a dispersed manner. That is, the application market server 3 may be implemented by a plurality of servers (information processing apparatuses) including at least the above-described function of the screen request receiving unit 322, the above-described function of the second specifying unit 323, the above-described function of the first specifying unit 324, the above-described function of the application providing screen generating unit 325, and the above-described function of the application providing screen transmitting unit 326.

Figure 25:
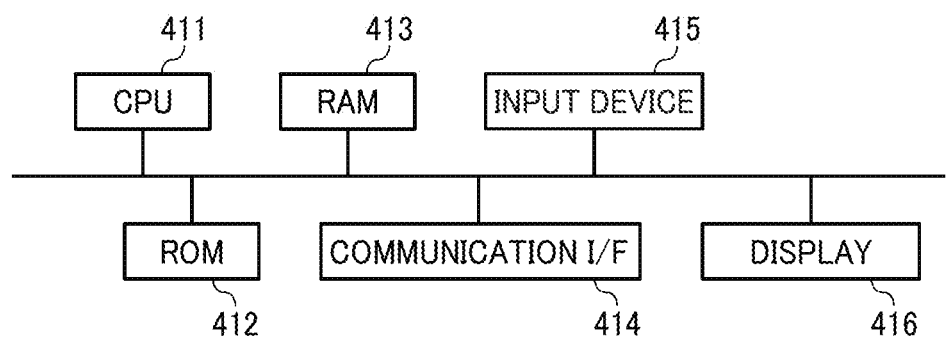
FIG. 25 is a schematic diagram illustrating an example of a hardware configuration of an application server.

Next, the configuration of the application server 7 will be described. FIG. 25 illustrates an example of a hardware configuration of the application server 7. As illustrated in FIG. 25, the application server 7 includes a CPU 411, a ROM 412, a RAM 413, a communication I/F 414, an input device 415, and a display 416. Note that the minimum configuration related to this embodiment is illustrated here as an example. However, the hardware configuration of the application server 7 is not limited to this configuration. The CPU 411 performs centralized control on the operations of the application server 7. The ROM 412 is a nonvolatile memory that stores various kinds of data such as programs. The RAM 413 is a volatile memory that functions as a work area of various kinds of processing performed by the CPU 411. The communication IX 414 is an interface for performing communication with the network 8. The input device 415 is a device used for input operations performed by a user and is implemented by, for example, a mouse, a keyboard, and the like. The display 416 is a device that displays various kinds of information and is implemented by, for example, an LCD and the like.

Figure 26:
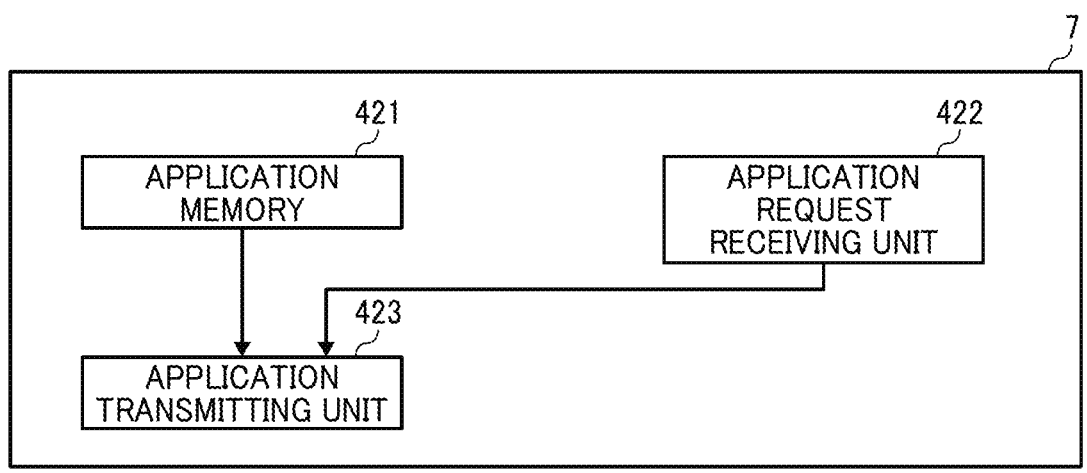
FIG. 26 is a schematic diagram illustrating an example functional configuration of the application server.

FIG. 26 illustrates examples of functions of the application server 7. As illustrated in FIG. 26, the application server 7 includes an application memory 421, an application request receiving unit 422, and an application transmitting unit 423. FIG. 26 illustrates only the functions related to this embodiment for ease of description. However, the functions of the application server 7 are not limited to these.

The application memory 421 stores a plurality of applications. The application request receiving unit 422 receives the above-described application request from the MFP 1. From among the plurality of applications stored in the application memory 421, the application transmitting unit 423 transmits an application that is requested by the application request received by the application request receiving unit 422, to the MFP 1 from which the application request has been sent.

The above-described functions of the units (the application request receiving unit 422 and the application transmitting unit 423) of the application server 7 are implemented by the CPU 411 executing programs stored in the ROM 412 and the like. However, the implementation of the functions is not limited to the above example. For example, at least one of the above-described functions of the units of the application server 7 may be implemented by a dedicated hardware circuit (e.g., a semiconductor integrated circuit). In addition, the above-described application memory 421 may be realized by an auxiliary memory such as the ROM 412 or a HDD. Note that in this example, each function of the application request receiving unit 422 and the application transmitting unit 423 is implemented by a combination of the CPU 411 and the communication I/F 414.

In addition, for example, the above-described functions of the units of the application server 7 may be installed in a plurality of servers in a dispersed manner. That is, the application server 7 may be implemented by a plurality of servers (information processing apparatuses) including at least the above-described function of the application request receiving unit 422 and the above-described function of the application transmitting unit 423. In addition, for example, the application server 7 and the application market server 3 may be implemented by a single server.

Figure 27:
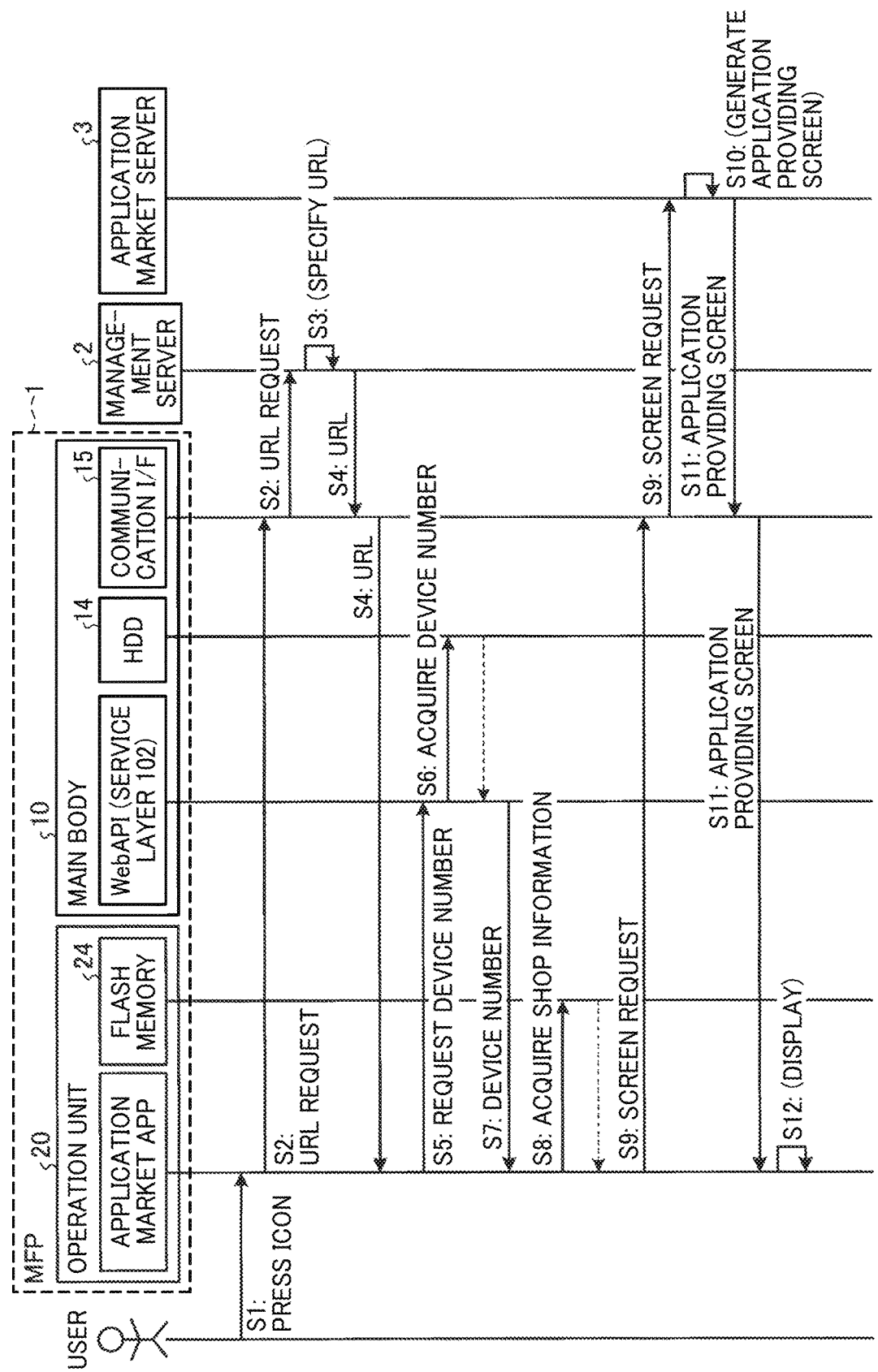
FIG. 27 is a sequence diagram illustrating an example operation of generating and transmitting an application providing screen, performed by the information processing system.

FIG. 27 is a sequence diagram illustrating an example of an operation procedure of the information processing system 100. Here, it is assumed that the application market app is started for the second time and later. In addition, here, it is assumed that the device number of the MFP 1 is stored in the HDD 14 of the main body 10 and that the shop information is stored in the flash memory 24 of the operation unit 20. However, the storage of such information may be any location and is not limited to these.

First, upon the icon 5 (see FIG. 5) on the operation screen being touched (step S1), the application market app is started. Then, the started application market app transmits the above-described URL request to the management server 2 via the communication I/F 15 of the main body 10 (step S2). Note that in this example, the MFP 1 performs communication with the management server 2 or the application market server 3 via the communication I/F 15 of the main body 10. However, the communication is not limited to this. For example, the MFP 1 may perform communication with the management server 2 or the application market server 3 via the communication I/F 25 of the operation unit 20.

Upon reception of the URL request, the management server 2 specifies the URL corresponding to the region information included in the received URL request (step S3). A specific content thereof is described above. Then, in response to the URL request, the management server 2 transmits the URL specified in step S3 (step S4).

Then, the application market app transmits a request for the device number of the MFP 1 to the service layer 102 of the main body 10 (step S5). Upon reception of this request, the service layer 102 acquires the device number from the HDD 14 (the storage of the device number is not limited to this) of the main body 10 (step S6) and transmits the device number to the application market app (step S7).

Then, the application market app acquires the shop information from the flash memory 24 of the operation unit 20 (step S8). Then, the application market app transmits the above-described screen request including the device number and the shop information to the application market server 3 via the communication I/F 15 of the main body 10 (step S9).

Upon reception of the screen request, on the basis of the shop information included in the received screen request, the application market server 3 specifies the "recommended app" and generates the application providing screen for providing the specified "recommended app" (step S10). A specific content thereof is described above. Then, in response to the screen request, the application market server 3 transmits the application providing screen generated in step S10 to the MFP 1 (step S11). Upon reception of the application providing screen in response to the screen request, the MFP 1 displays the received application providing screen on the operation panel 27 (step S12).

As described above, in this embodiment, the MFP 1 transmits the screen request to the application market server 3. The screen request includes the shop information indicating the shop that sells the MFP 1 and requests the application providing screen for providing an application. Using the application correspondence information indicating the correspondence relationship between the shop information, the application identification information for identifying an application sold by the shop, and the use promotion information indicating whether the application is a use-promoted application, from among the pieces of the application identification information that are associated with the shop information included in the screen request received from the MFP 1, the application market server 3 specifies a piece of the application identification information that is associated with the use promotion information indicating a use-promoted application. The application market server 3 transmits, to the MFP 1, the application providing screen for providing, as the "recommended app", an application identified by the specified piece of the application identification information. Thus, according to this embodiment, even if applications to be used by the MFP 1 differ according to the shop that sells the MFP 1, only an application that is appropriately usable by the MFP 1 can be displayed on the application providing screen on the operation panel 27 of the MFP 1. Accordingly, only an application that is appropriately usable by the MFP 1 can be introduced. Furthermore, among applications that are appropriately usable by the MFP 1, an application whose use is recommended to the MFP 1 can be introduced as the "recommended app". Thus, the user less tends to miss the "recommended app".

The above-described embodiment may be performed in various other ways, as described below referring to modified examples.

First Modified Example

In a first modified example, download information may be provided, in which the number of application downloads is associated with each combination of the shop information and the application identification information, for each of one or more pieces of the application identification information specified by the first specifying unit 324. The application providing screen generating unit 325 can specify the associated number of downloads and can generate an application providing screen on which one or more "recommended apps" (use-recommended applications) are arranged in descending order of the number of downloads, the "recommended apps" corresponding to the pieces of the application identification information specified by the first specifying unit 324, in a one-to-one relationship.

Figures 28, 29:
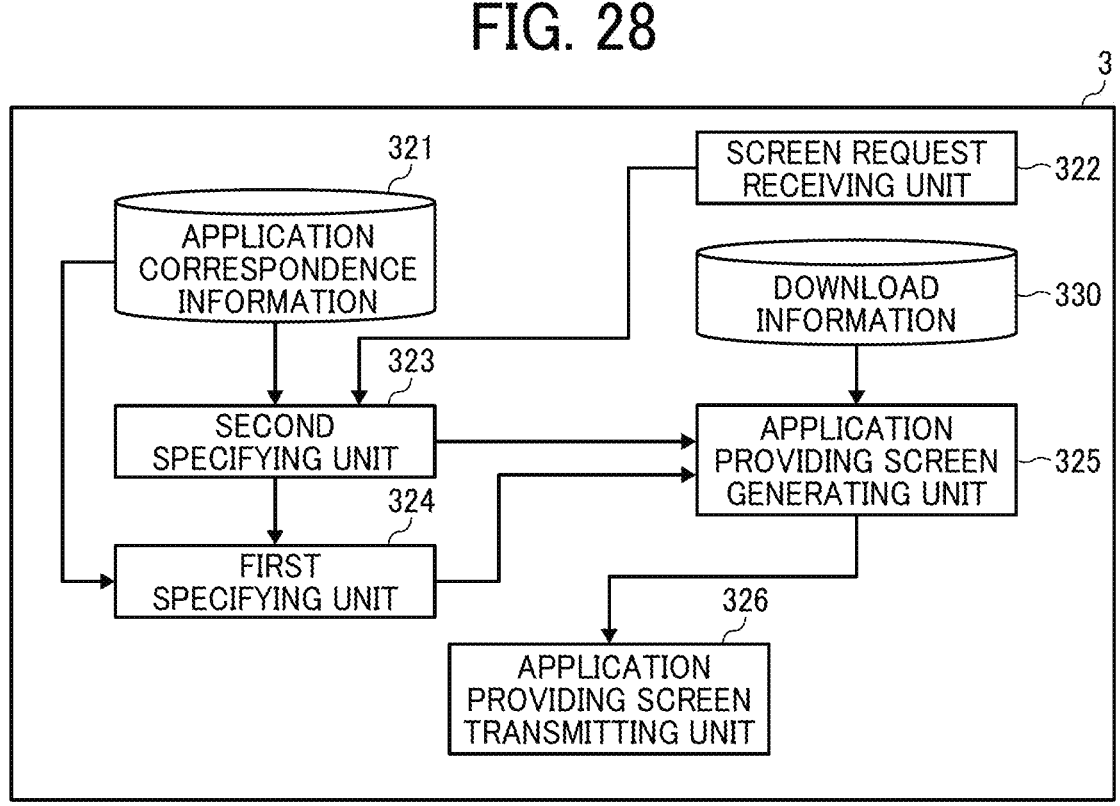
FIG. 28 is a schematic diagram illustrating an example functional configuration of an application market server according to a first modification example of a first embodiment.
FIG. 29 is an illustration of an example of download information.

FIG. 28 illustrates examples of functions of the application market server 3 according to this modification example. As illustrated in FIG. 28, the application market server 3 further includes a download information memory 330 that stores the above-described download information. FIG. 29 illustrates an example of the download information.

In this modification example, the application providing screen generating unit 325 generates an application providing screen including a first screen that displays the "recommended app" and a second screen that displays the other application. A method for generating the application providing screen in this modification example will be specifically described below. Each time one of a plurality of pieces of the application identification information specified by the second specifying unit 323 is selected, the application providing screen generating unit 325 according to this modification example determines whether the selected piece of the application identification information is included in the one or more pieces of the application identification information specified by the first specifying unit 324. If the determination result is positive, the application providing screen generating unit 325 arranges an application identified by the selected piece of the application identification information at the end of the arrangement direction on the first screen. If the determination result is negative, the application providing screen generating unit 325 arranges the application identified by the selected piece of the application identification information at the end of the arrangement direction on the second screen.

More specifically, each time it is determined that the selected piece of the application identification information is included in the one or more pieces of the application identification information specified by the first specifying unit 324, the application providing screen generating unit 325 associates display order information for determining a display order with an application ("recommended app") identified by the selected piece of the application identification information. On the basis of the display order information associated with each application, the application providing screen generating unit 325 rearranges one or more applications corresponding to the one or more pieces of the application identification information specified by the first specifying unit 324, in a one-to-one relationship, and generates the first screen.

Furthermore, if the selected piece of the application identification information is included in the one or more pieces of the application identification information specified by the first specifying unit 324, referring to the above-described download information, the application providing screen generating unit 325 specifies the number of downloads associated with the selected piece of the application identification information, and on the basis of the specified number of downloads as the display order information, the application providing screen generating unit 325 associates the specified number of downloads with an application identified by the selected piece of the application identification information.

Figure 30:
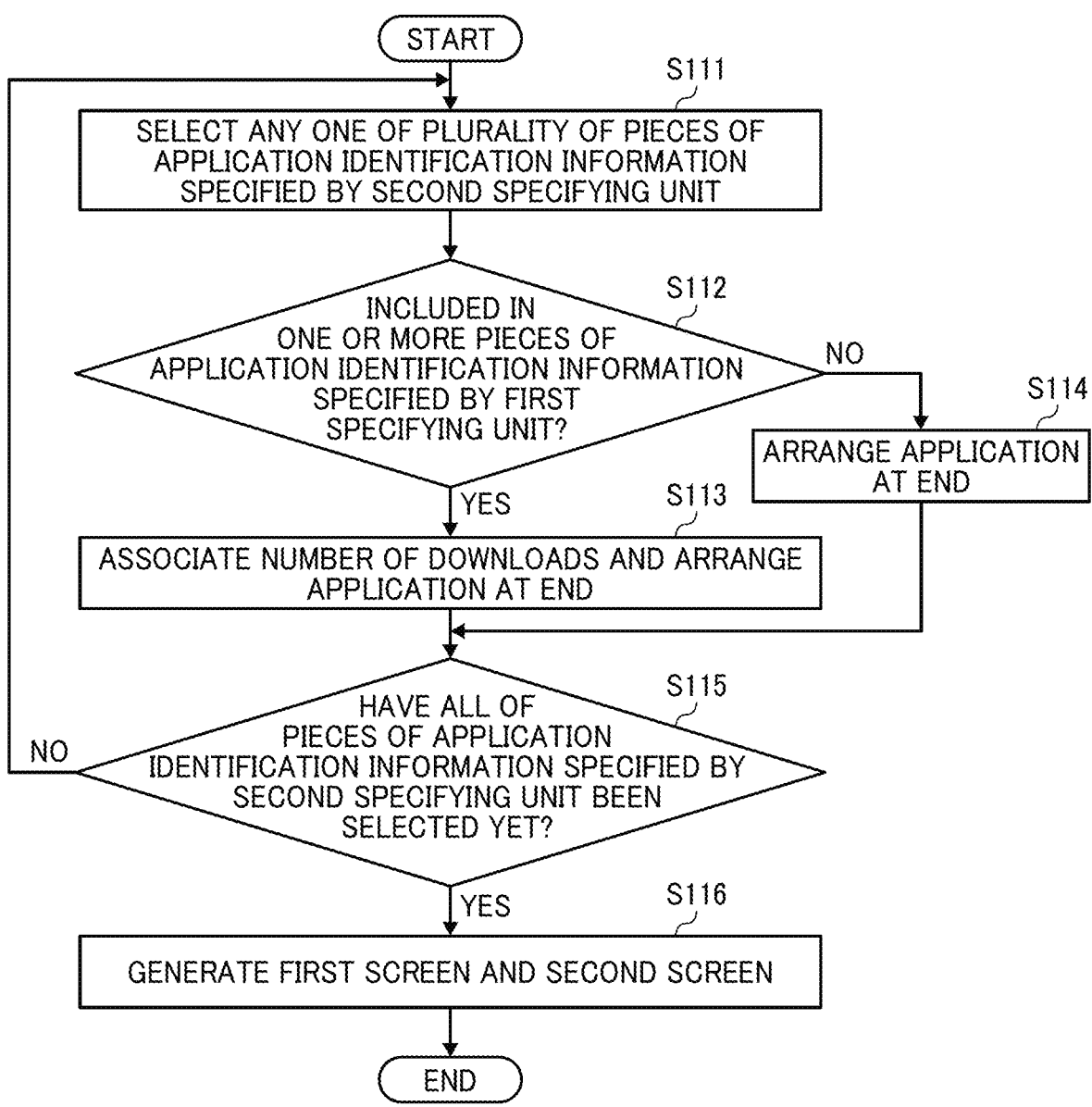
FIG. 30 is a flowchart illustrating an example operation of generating an application providing screen according to the first modification example of the first embodiment.

FIG. 30 is a flowchart illustrating an operation example of the application providing screen generating unit 325 according to this modification example. Here, it is assumed that the application providing screen generating unit 325 has already acquired a group of pieces of the application identification information specified by the second specifying unit 323 and a group of pieces of the application identification information specified by the first specifying unit 324.

As illustrated in FIG. 30, the application providing screen generating unit 325 selects any (unselected) one of the plurality of pieces of the application identification information specified by the second specifying unit 323 (step S111). Then, the application providing screen generating unit 325 determines whether the piece of the application identification information selected in step S111 is included in the one or more pieces of the application identification information specified by the first specifying unit 324 (step S112).

If the result in step S112 is positive (step S112: YES), referring to the above-described download information, the application providing screen generating unit 325 specifies the number of downloads associated with the combination of the piece of the application identification information selected in step S111 and the shop information included in the screen request received by the screen request receiving unit 322. Then, the application providing screen generating unit 325 associates an application identified by the piece of the application identification information selected in step S111 with the specified number of downloads and arranges the application at the end of the arrangement direction on the first screen (step S113). On the other hand, if the result in step S112 is negative (step S112: NO), the application providing screen generating unit 325 arranges the application identified by the piece of the application identification information selected in step S111 at the end of the arrangement direction on the second screen (step S114).

After the above-described step S113 or S114, the application providing screen generating unit 325 determines whether all of the pieces of the application identification information specified by the second specifying unit 323 have already been selected (step S115). If the result in step S115 is negative (step S115: NO), the above-described processing in and after step S111 is repeated. On the other hand, if the result in step S115 is positive (step S115: YES), the application providing screen generating unit 325 generates the first screen and the second screen (step S116). More specifically, the application providing screen generating unit 325 rearranges one or more applications ("recommended apps") that are determined as positive in step S112 in descending order of the number of downloads associated with each application and generates the first screen, and arranges one or more applications (applications other than the "recommended apps") that are determined as negative in step S112 sequentially in the above manner and generates the second screen.

Figure 31:
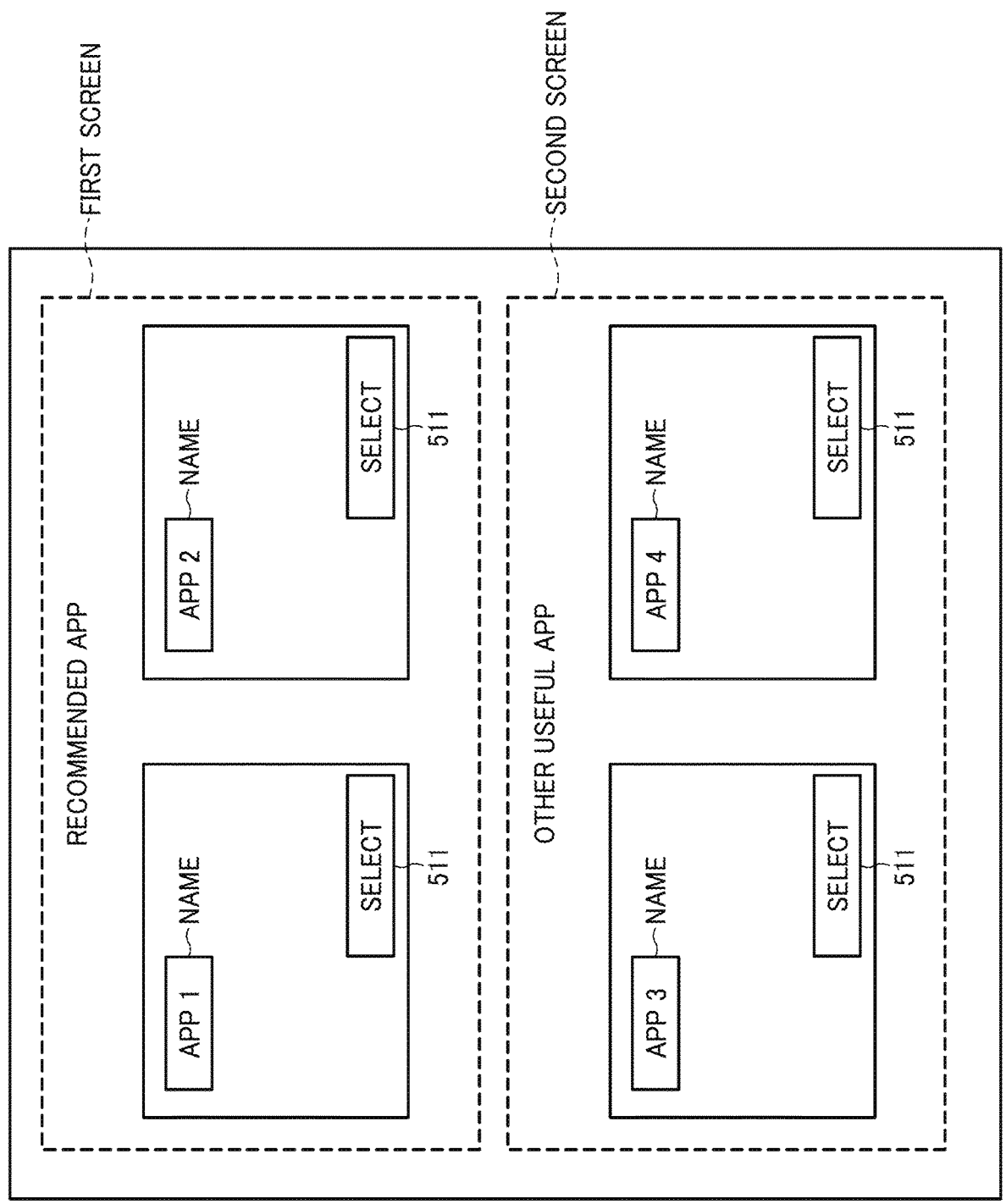
FIG. 31 is an illustration of an example of an application providing screen according to the first modification example of the first embodiment.
Figure 32:
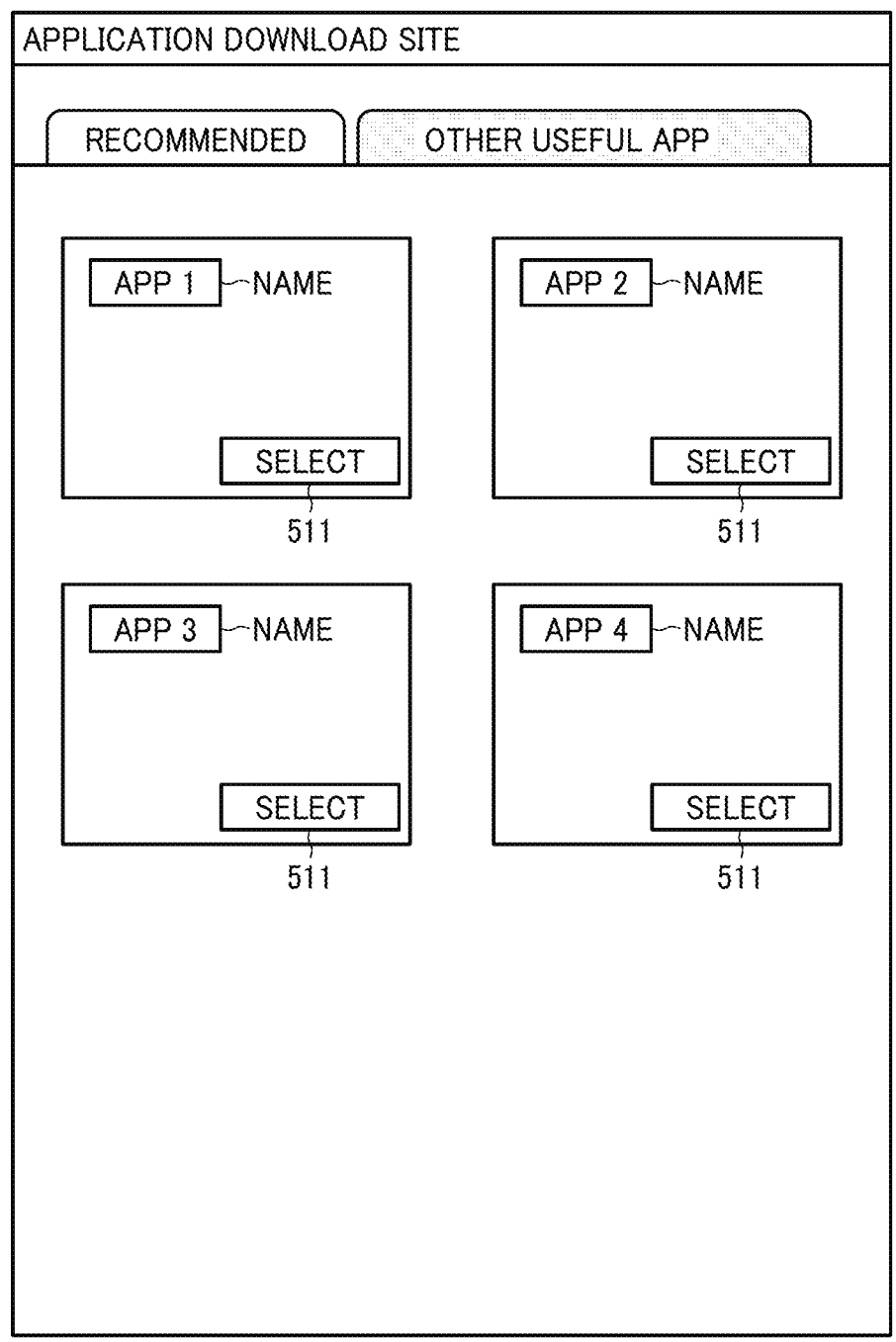
FIG. 32 is an illustration of another example of the application providing screen.

For example, as illustrated in FIG. 31, the application providing screen may be displayed in such a manner that the first screen and the second screen are displayed on the same screen. Alternatively, for example, as illustrated in FIG. 32, the application providing screen may be displayed in such a manner that the first screen and the second screen can be switched by using tabs. The same applies to the other examples.

Second Modified Example

In a second modified example, price information may be provided, in which the price of an application is associated with each piece of the application identification information, for each of one or more pieces of the application identification information specified by the first specifying unit 324. The application providing screen generating unit 325 specifies the price associated with the piece of the application identification information and generates an application providing screen on which one or more "recommended apps" are arranged in descending order of the price, the "recommended apps" corresponding to the pieces of the application identification information specified by the first specifying unit 324, in a one-to-one relationship.

Figures 33, 34:
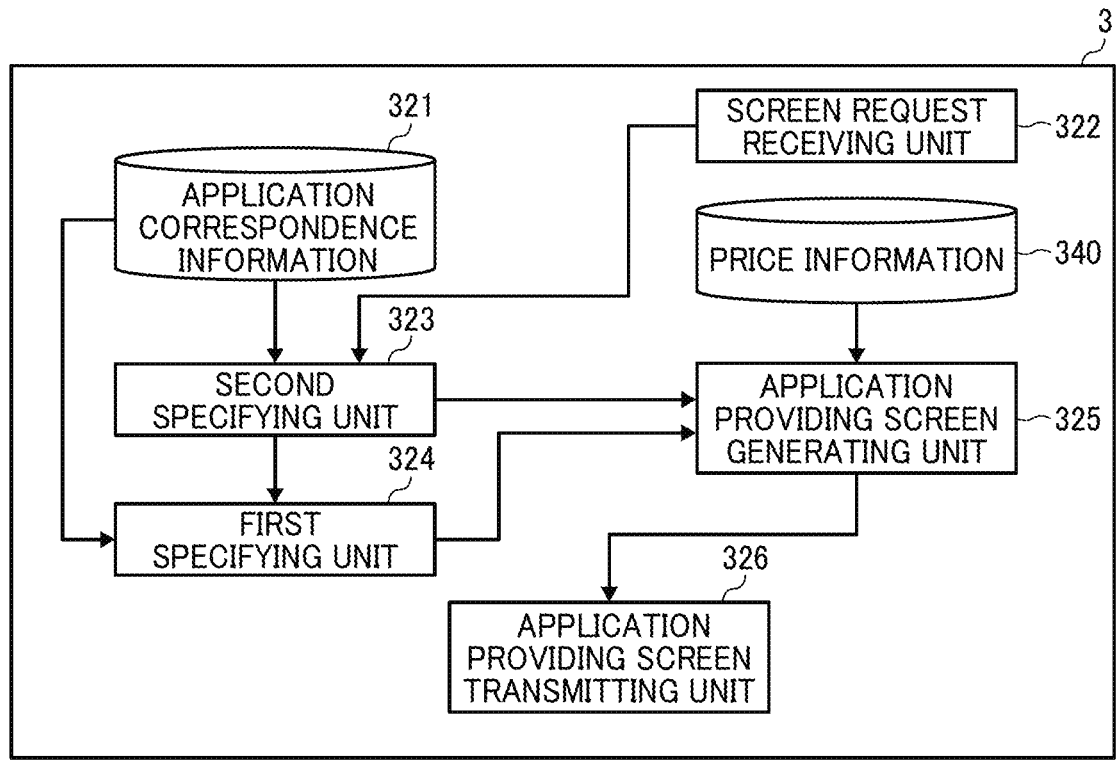
FIG. 33 is a schematic diagram illustrating an example functional configuration of an application market server according to a second modification example of the first embodiment.
FIG. 34 is an illustration of an example of price information.

FIG. 33 illustrates examples of functions of the application market server 3 according to this modification example. As illustrated in FIG. 33, the application market server 3 further includes a price information memory 340 that stores the above-described price information. FIG. 34 illustrates an example of the price information.

In this modification example, the application providing screen generating unit 325 generates an application providing screen including a first screen that displays the "recommended app" and a second screen that s the other application. A method for generating the application providing screen in this modification example will be specifically described below. Each time one of a plurality of pieces of the application identification information specified by the second specifying unit 323 is selected, the application providing screen generating unit 325 according to this modification example determines whether the selected piece of the application identification information is included in the one or more pieces of the application identification information specified by the first specifying unit 324. If the determination result is positive, the application providing screen generating unit 325 arranges an application ("recommended app") identified by the selected piece of the application identification information at the end of the arrangement direction on the first screen. If the determination result is negative, the application providing screen generating unit 325 arranges the application (other application) identified by the selected piece of the application identification information at the end of the arrangement direction on the second screen.

More specifically, each time it is determined that the selected piece of the application identification information is included in the one or more pieces of the application identification information specified by the first specifying unit 324, the application providing screen generating unit 325 associates the display order information for determining a display order with an application identified by the selected piece of the application identification information. On the basis of the display order information associated with each application, the application providing screen generating unit 325 rearranges one or more applications corresponding to the one or more pieces of the application identification information specified by the first specifying unit 324, in a one-to-one relationship, and generates the first screen.

Furthermore, if the selected piece of the application identification information is included in the one or more pieces of the application identification information specified by the first specifying unit 324, referring to the above-described price information, the application providing screen generating unit 325 specifies the price associated with the selected piece of the application identification information, and on the basis of the specified price as the display order information, the application providing screen generating unit 325 associates the specified price with an application identified by the selected piece of the application identification information.

Figure 35:
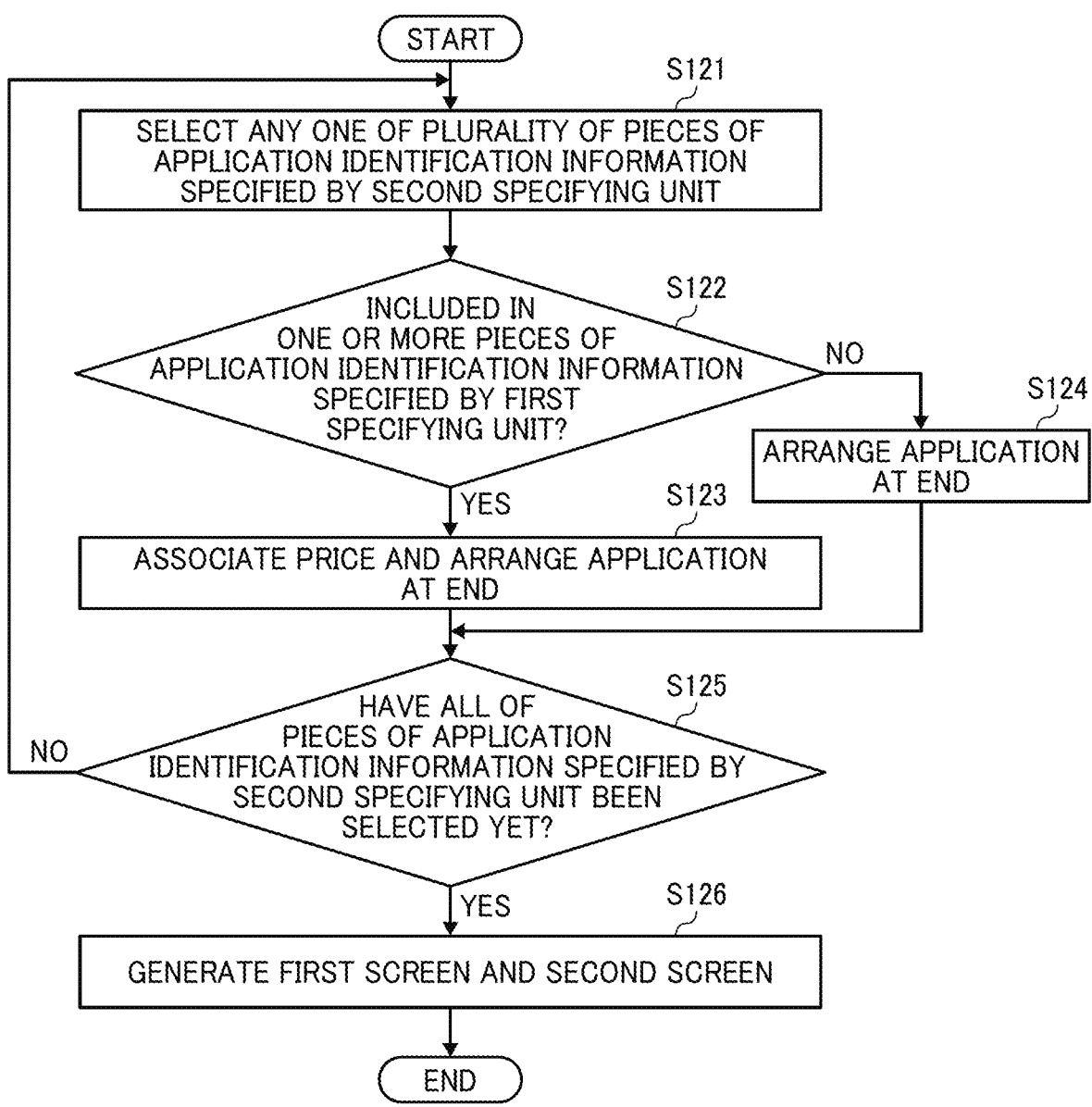
FIG. 35 is a flowchart illustrating an example operation example of generating an application providing screen according to the second modification example of the first embodiment.

FIG. 35 is a flowchart illustrating an operation example of the application providing screen generating unit 325 according to this modification example. Here, it is assumed that the application providing screen generating unit 325 has already acquired a group of pieces of the application identification information specified by the second specifying unit 323 and a group of pieces of the application identification information specified by the first specifying unit 324.

As illustrated in FIG. 35, the application providing screen generating unit 325 selects any (unselected) one of the plurality of pieces of the application identification information specified by the second specifying unit 323 (step S121). Then, the application providing screen generating unit 325 determines whether the piece of the application identification information selected in step S121 is included in the one or more pieces of the application identification information specified by the first specifying unit 324 (step S122).

If the result in step S122 is positive (step S122: YES), on the basis of the above-described price information, the application providing screen generating unit 325 specifies the price associated with the piece of the application identification information selected in step S121. Then, the application providing screen generating unit 325 associates an application identified by the piece of the application identification information selected in step S121 with the specified price and arranges the application at the end of the arrangement direction on the first screen (step S123). On the other hand, if the result in step S122 is negative (step S122: NO), the application providing screen generating unit 325 arranges the application identified by the piece of the application identification information selected in step S121 at the end of the arrangement direction on the second screen (step S124).

After the above-described step S123 or S124, the application providing screen generating unit 325 determines whether all of the pieces of the application identification information specified by the second specifying unit 323 have already been selected (step S125). If the result in step S125 is negative (step S125: NO), the above-described processing in and after step S121 is repeated. On the other hand, if the result in step S125 is positive (step S125: YES), the application providing screen generating unit 325 generates the first screen and the second screen (step S126). More specifically, the application providing screen generating unit 325 rearranges one or more applications ("recommended apps") that are determined as positive in step S122 in descending order of the price associated with each application and generates the first screen, and arranges one or more applications (applications other than the "recommended apps") that are determined as negative in step S122 sequentially in the above manner and generates the second screen.

Third Modified Example

In a third modified example, as illustrated in FIG. 36, the application correspondence information may be information indicating the correspondence relationship between the shop information, the application identification information, the use promotion information, and competitive application identification information for identifying an application that competes with the application identified by the application identification information.

In this modification example, if a piece of the application identification information specified by the first specifying unit 324 is associated with the competitive application identification information, the application providing screen generating unit 325 generates an application providing screen on which an application identified by the competitive application identification information is not displayed. For example, in the example of FIG. 36, a case is assumed in which a piece of the application identification information indicating "App0004" and a piece of the application identification information indicating "App0005" are specified by the first specifying unit 324. In this case, since the competitive application identification information indicating "App0003" is associated with the piece of the application identification information indicating "App0005", even if the piece of the application identification information indicating "App0003" is specified by the second specifying unit 323, the application providing screen generating unit 325 generates an application providing screen on which an application identified by the piece of the application identification information is not displayed. Note that in this example, from among pieces of the application identification information specified by the second specifying unit 323, at the time of specifying a piece of the application identification information that is associated with the use promotion information (use promotion information indicating "True") indicating a use-promoted application, the first specifying unit 324 can also specify the competitive application identification information that is associated with the specified piece of the application identification information.

In this modification example, as in the above-described first embodiment, the application providing screen generating unit 325 selects each one of the plurality of pieces of the application identification information specified by the second specifying unit 323 and determines whether the selected piece of the application identification information is included in one or more pieces of the application identification information specified by the first specifying unit 324. Then, if the selected piece of the application identification information is a non-display target, the application providing screen generating unit 325 adds second flag information indicating non-display to an application identified by the selected piece of the application identification information. In this example, if the selected piece of the application identification information is the same as the competitive application identification information that is associated with any one of the pieces of the application identification information specified by the first specifying unit 324, the application providing screen generating unit 325 determines that the selected piece of the application identification information is a non-display target. Then, the application providing screen generating unit 325 generates the application providing screen on which the application to which the second flag information has been added is not displayed.

Figure 37:
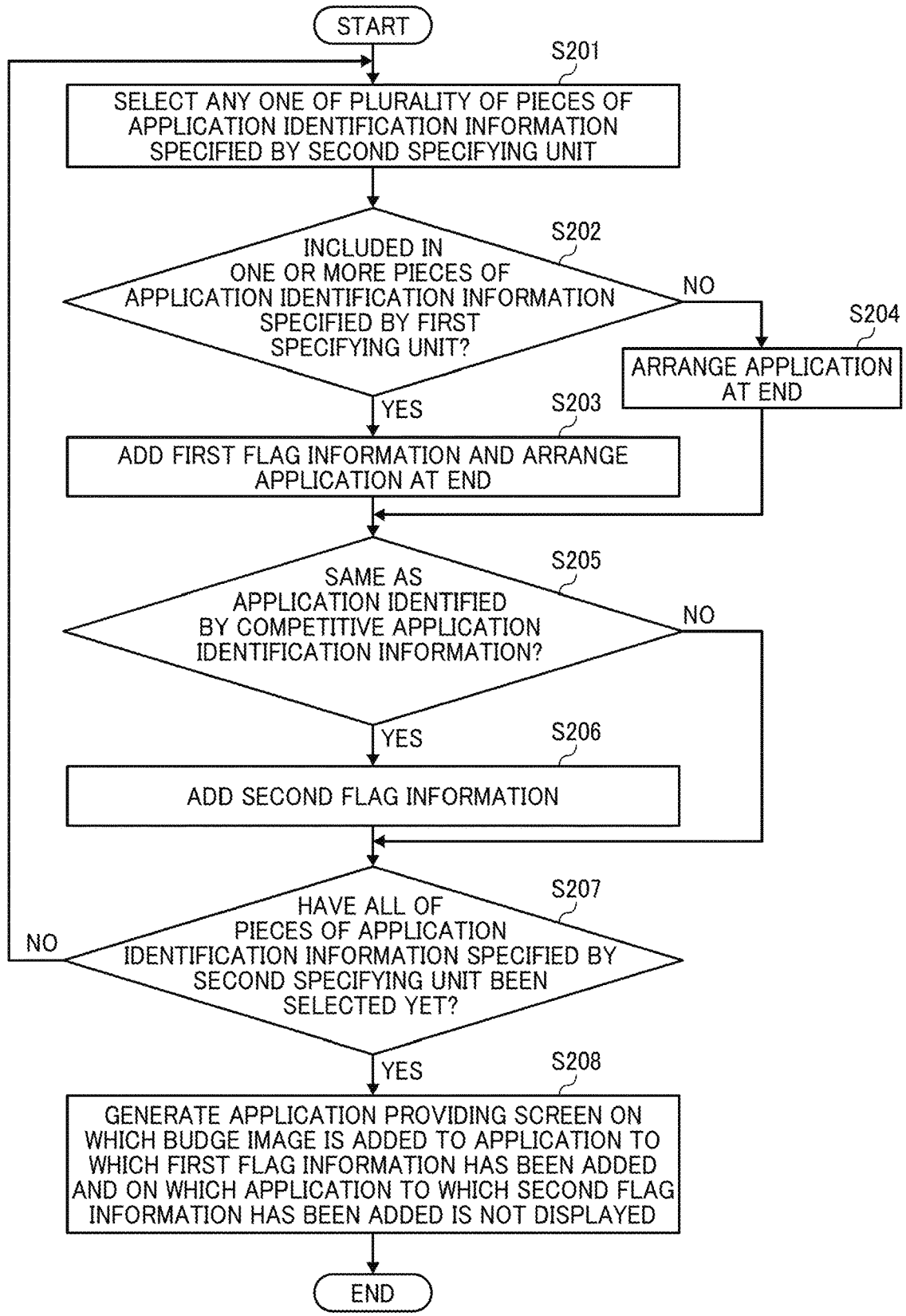
FIG. 37 is a flowchart illustrating an example operation of generating an application providing screen according to the third modification example of the first embodiment.

FIG. 37 is a flowchart illustrating an operation example of the application providing screen generating unit 325 according to this modification example. Here, it is assumed that the application providing screen generating unit 325 has already acquired a group of pieces of the application identification information specified by the second specifying unit 323, a group of pieces of the application identification information specified by the first specifying unit 324, and a group of competitive applications specified by the first specifying unit 324.

As illustrated in FIG. 37, the application providing screen generating unit 325 selects any (unselected) one of the plurality of pieces of the application identification information specified by the second specifying unit 323 (step S201). Then, the application providing screen generating unit 325 determines whether the piece of the application identification information selected in step S201 is included in the one or more pieces of the application identification information specified by the first specifying unit 324 (step S202).

If the result in step S202 is positive (step S202: YES), the application providing screen generating unit 325 adds the first flag information to an application identified by the piece of the application identification information selected in step S201 and arranges the application at the end (the end in the arrangement direction) (step S203). On the other hand, if the result in step S202 is negative (step S202: NO), the application providing screen generating unit 325 does not add the first flag information to the application identified by the piece of the application identification information selected in step S201 and arranges the application at the end (step S204).

After the above-described step S203 or S204, the application providing screen generating unit 325 determines whether the piece of the application identification information selected in step S201 is the same as the competitive application identification information that is associated with any one of the pieces of the application identification information specified by the first specifying unit 324 (step S205). If the result in step S205 is positive (step S205: YES), the application providing screen generating unit 325 adds the second flag information to an application identified by the piece of the application identification information selected in step S201 (step S206), and the process proceeds to step S207. On the other hand, if the result in step S205 is negative (step S205: NO), the process proceeds to step S207.

In step S207, the application providing screen generating unit 325 determines whether all of the pieces of the application identification information specified by the second specifying unit 323 have already been selected (step S207). If the result in step S207 is negative (step S207: NO), the above-described processing in and after step S201 is repeated. On the other hand, if the result in step S207 is positive (step S207: YES), the application providing screen generating unit 325 generates the application providing screen on which the above-described budge image is added to the application to which the first flag information has been added and on which the application to which the second flag information has been added is not displayed among a plurality of applications that are sequentially arranged in the above manner (step S208).

Note that the configuration of this modification example is also applicable to an implementation such as the above-described first or second modification example of the first embodiment in which the application providing screen including the first screen that displays the "recommended app" and the second screen that displays the other application is generated.

For example, a case is considered in which this modification example is applied to the above-described first modification example of the first embodiment. In this case, after step S113 or S114 and before step S115 illustrated in FIG. 30, processing corresponding to steps S205 and S206 illustrated in FIG. 37 is performed. Then, in step S116 illustrated in FIG. 30, the first screen and the second screen are generated so as not to display the application to which the second flag information has been added. A case in which this modification example is applied to the above-described second modification example of the first embodiment can be considered in the same manner.

Fourth Modified Example

In a fourth modified example, the above-described screen request may further include installed-application identification information for identifying an application that has already been installed in the MFP 1. The application providing screen generating unit 325 may generate an application providing screen for providing, as the "recommended app", from among applications identified by pieces of the application identification information specified by the first specifying unit 324, an application except for an application identified by the installed-application identification information included in the screen request.

In this modification example, as in the above-described first embodiment, the application providing screen generating unit 325 selects each one of a plurality of pieces of the application identification information specified by the second specifying unit 323 and determines whether the selected piece of the application identification information is included in the one or more pieces of the application identification information specified by the first specifying unit 324. Then, if the selected piece of the application identification information is a non-display target, the application providing screen generating unit 325 adds the second flag information indicating non-display to an application identified by the selected piece of the application identification information. In this example, if the selected piece of the application identification information is the same as the installed-application identification information included in the screen request, the application providing screen generating unit 325 determines that the selected piece of the application identification information is a non-display target. Then, the application providing screen generating unit 325 generates the application providing screen on which the application to which the second flag information has been added is not displayed.

Figure 38:
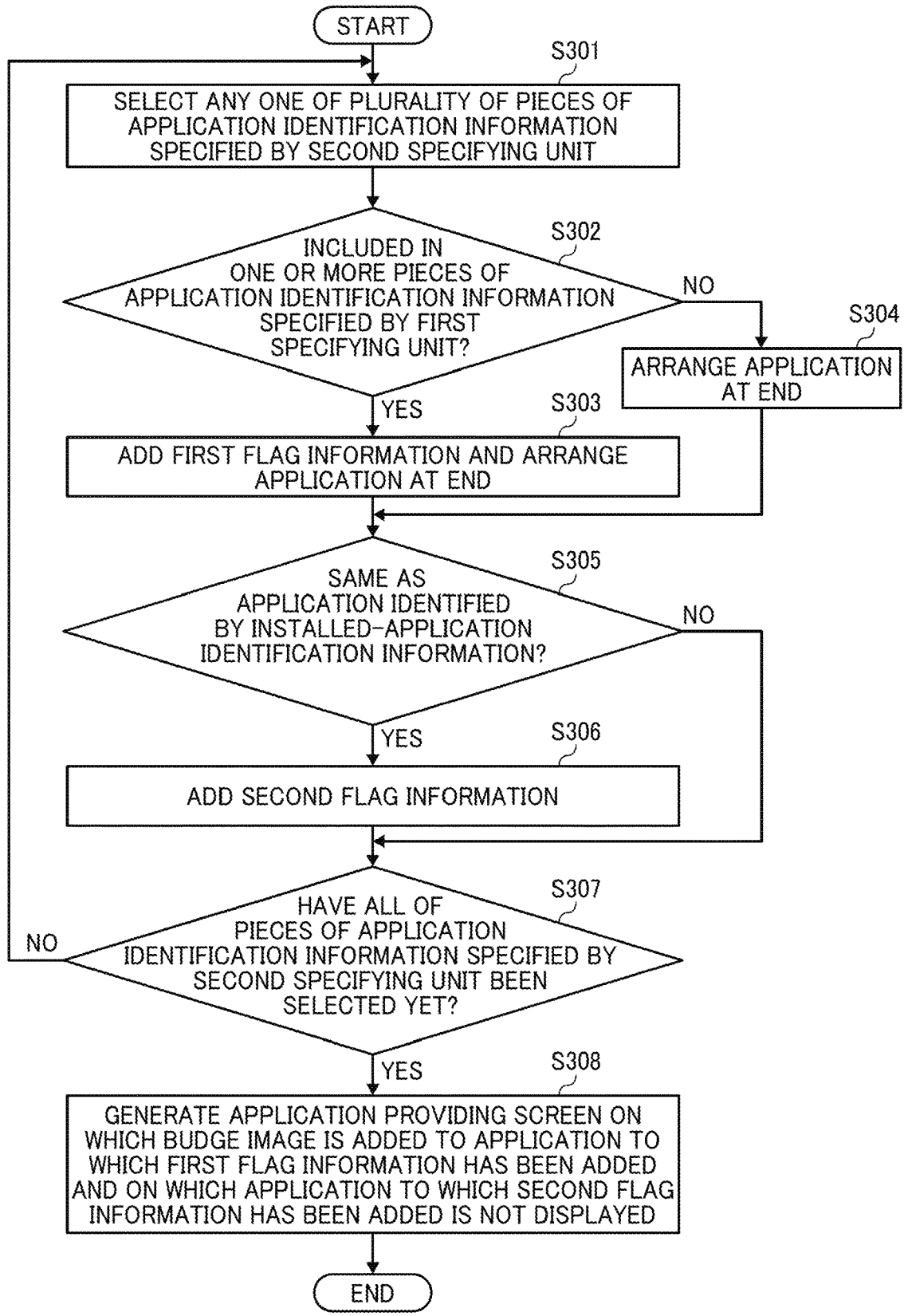
FIG. 38 is a flowchart illustrating an example operation of generating an application providing screen according to a fourth modification example of the first embodiment.

FIG. 38 is a flowchart illustrating an operation example of the application providing screen generating unit 325 according to this modification example. Here, it is assumed that the application providing screen generating unit 325 has already acquired a group of pieces of the application identification information specified by the second specifying unit 323, a group of pieces of the application identification information specified by the first specifying unit 324, and a group of pieces of the installed-application identification information included in the screen request received by the screen request receiving unit 322.

Processing in steps S301 to S304 illustrated in FIG. 38 is the same as the processing in steps S201 to S204 illustrated in FIG. 37, and therefore detailed description thereof is omitted. After step S303 or S304 illustrated in FIG. 38, the application providing screen generating unit 325 determines whether the piece of the application identification information selected in step S301 is the same as any piece of the installed-application identification information included in the screen request (step S305). If the result in step S305 is positive (step S305: YES), the application providing screen generating unit 325 adds the second flag information to an application identified by the piece of the application identification information selected in step S301 (step S306), and the process proceeds to step S307. On the other hand, if the result in step S305 is negative (step S305: NO), the process proceeds to step S307. Processing in steps S307 and S308 is the same as the processing in steps S207 and S208 illustrated in FIG. 37, and therefore detailed description thereof is omitted.

Note that the configuration of this modification example is also applicable to an implementation such as the above-described first or second modification example of the first embodiment in which the application providing screen including the first screen that displays the "recommended app" and the second screen that displays the other application is generated.

For example, a case is considered in which this modification example is applied to the above-described first modification example of the first embodiment. In this case, after step S113 or S114 and before step S115 illustrated in FIG. 30, processing corresponding to steps S305 and S306 illustrated in FIG. 38 is performed. Then, in step S116 illustrated in FIG. 30, the first screen and the second screen are generated so as not to display the application to which the second flag information has been added. A case in which this modification example is applied to the above-described second modification example of the first embodiment can be considered in the same manner.

Second Embodiment

Next, a second embodiment will be described. Description of the same parts as those in the above-described first embodiment will be omitted.

Figure 39:
FIG. 39 is an illustration of an example of an input screen according to a second embodiment.

In this embodiment, a screen request is different from the above-described screen request in the first embodiment in further including type-of-business identification information for identifying the type of business. In accordance with an input for specifying the type of business of a user who uses the MFP 1, the setting unit 112 of the MFP 1 sets the type-of-business identification information. For example, upon pressing of a display component (UI) representing an arrow right above "NEXT" on an initial screen such as the screen illustrated in FIG. 6, an input screen may be displayed on the operation panel 27 for inputting the type of business of the user in addition to the region information and the shop information as illustrated in FIG. 39. In accordance with inputs on this input screen, the setting unit 112 can set the shop information, the region information, and the type-of-business identification information.

Figure 40:
FIG. 40 is an illustration of an example of management information representing the correspondence relationship between the types of business and type-of-business identification information.

On the input screen illustrated in FIG. 39, checkboxes for selecting the types of business are displayed according to the type of business, such as education, administration, medical service, or architecture. As illustrated in FIG. 40, the MFP 1 holds, in advance, management information representing the correspondence relationship between the type of business and the type-of-business identification information, and the setting unit 112 can set the type-of-business identification information corresponding to the type of business (or types of business) selected on the input screen. Then, the storage control unit 113 of the MFP 1 can perform control in such a manner that the setting information memory 114 stores the type-of-business identification information that has been set by the setting unit 112.

In this example, the screen request transmitting unit 117 of the MFP 1 transmits the screen request including the shop information, the device identification information, and the type-of-business identification information to the application market server 3. Note that the screen request may include a plurality of pieces of the type-of-business identification information.

Figures 41, 42:
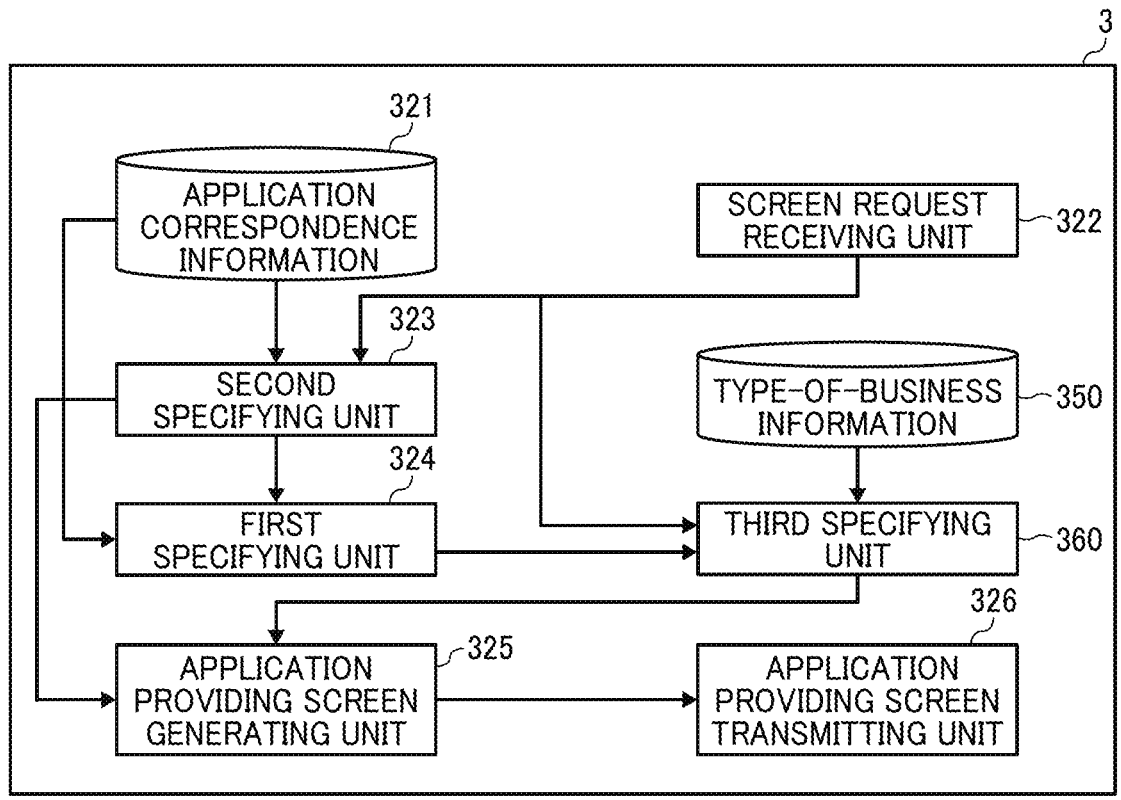
FIG. 41 is a schematic diagram illustrating an example functional configuration of an application market server according to the second embodiment.
FIG. 42 is an illustration of an example of type-of-business information.

FIG. 41 illustrates examples of functions of the application market server 3 according to this embodiment. As illustrated in FIG. 41, the application market server 3 is different from the application market server 3 according to the above-described first embodiment in further including a type-of-business information memory 350 and a third specifying unit 360. Note that FIG. 41 illustrates only the functions related to this embodiment for ease of description. However, the functions of the application market server 3 are not limited to these.

The type-of-business information memory 350 stores type-of-business information indicating the correspondence relationship between the application identification information and the type-of-business identification information. FIG. 42 illustrates an example of the type-of-business information. Note that in this example, the application correspondence information and the type-of-business information are independently provided. However, the application correspondence information and the type-of-business information are not limited to these. For example, one piece of information (i.e., information representing the correspondence relationship between the shop information, the application identification information, the use promotion information, and the type-of-business identification information) obtained by integrating the application correspondence information and the type-of-business information may be stored in the MFP 1.

On the basis of the above-described type-of-business information, from among pieces of the application identification information specified by the first specifying unit 324, the third specifying unit 360 specifies a piece of the application identification information that is associated with the type-of-business identification information included in the screen request. For example, a case is assumed in which the type-of-business information is as illustrated in FIG. 42, a piece of the application identification information indicating "App0001", a piece of the application identification information indicating "App0002", and a piece of the application identification information indicating "App0003" are specified by the first specifying unit 324, and the type-of-business identification information indicating "G0001" is included in the screen request. In this case, referring to the type-of-business information illustrated in FIG. 42, from among the three pieces of the application identification information (the piece of the application identification information indicating "App0001", the piece of the application identification information indicating "App0002", and the piece of the application identification information indicating "App0003") specified by the first specifying unit 324, the third specifying unit 360 specifies two pieces of the application identification information (the piece of the application identification information indicating "App0001" and the piece of the application identification information indicating "App0003") that are associated with the type-of-business identification information indicating "G0001".

The application providing screen generating unit 325 generates the application providing screen for providing an application identified by the piece of the application identification information specified by the third specifying unit 360 as the use-recommended application ("recommended app") whose use is recommended to the MFP 1. The application providing screen generating unit 325 according to this embodiment generates the application providing screen for providing the use-recommended application identified by the piece of the application identification information specified by the third specifying unit 360 and an application other than the use-recommended application among applications identified by pieces of the application identification information specified by the second specifying unit 323.

As in the above-described first embodiment, the application providing screen generating unit 325 according to this embodiment generates the application providing screen on which the use-recommended application is displayed to be more remarkable than the other application.

Now, a method for generating the application providing screen according to this embodiment will be specifically described. Each time one of the plurality of pieces of the application identification information specified by the second specifying unit 323 is selected, the application providing screen generating unit 325 according to this embodiment determines whether the selected piece of the application identification information is included in one or more pieces of the application identification information specified by the third specifying unit 360. If the determination result is positive, the application providing screen generating unit 325 according to this embodiment adds, to an application identified by the selected piece of the application identification information, the first flag information indicating that the application is the "recommended app" and arranges the application at the end. If the determination result is negative, the application providing screen generating unit 325 according to this embodiment does not add the first flag information to the application identified by the selected piece of the application identification information and arranges the application at the end. Then, the application providing screen generating unit 325 adds the budge image indicating that the application is the "recommended app" to the application to which the first flag information has been added and generates the application providing screen.

Figure 43:
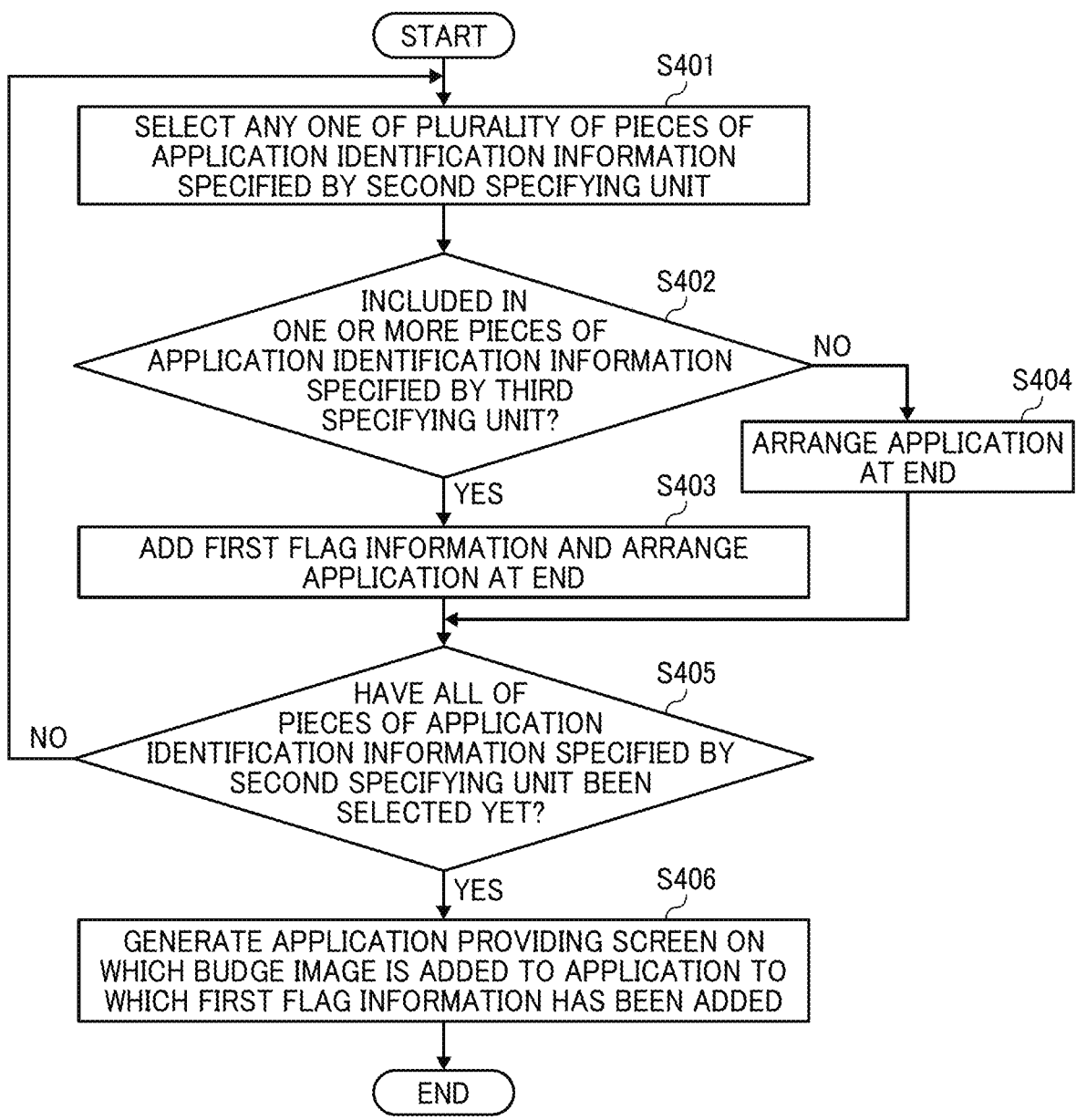
FIG. 43 is a flowchart illustrating an example operation of generating an application providing screen according to the second embodiment.

FIG. 43 is a flowchart illustrating an operation example of the application providing screen generating unit 325. Here, it is assumed that the application providing screen generating unit 325 has already acquired a group of pieces of the application identification information specified by the third specifying unit 360 and a group of pieces of the application identification information specified by the first specifying unit 324.

As illustrated in FIG. 43, the application providing screen generating unit 325 selects any (unselected) one of the plurality of pieces of the application identification information specified by the second specifying unit 323 (step S401). Then, the application providing screen generating unit 325 determines whether the piece of the application identification information selected in step S401 is included in the one or more pieces of the application identification information specified by the third specifying unit 360 (step S402).

If the result in step S402 is positive (step S402: YES), the application providing screen generating unit 325 adds the first flag information to an application identified by the piece of the application identification information selected in step S401 and arranges the application at the end (the end in the arrangement direction) (step S403). On the other hand, if the result in step S402 is negative (step S402: NO), the application providing screen generating unit 325 does not add the first flag information to the application identified by the piece of the application identification information selected in step S401 and arranges the application at the end (step S404).

After the above-described step S403 or S404, the application providing screen generating unit 325 determines whether all of the pieces of the application identification information specified by the second specifying unit 323 have already been selected (step S405). If the result in step S405 is negative (step S405: NO), the above-described processing in and after step S401 is repeated. On the other hand, if the result in step S405 is positive (step S405: YES), the application providing screen generating unit 325 generates the application providing screen, such as the screen illustrated in FIG. 14, on which the above-described budge image is added to the application to which the first flag information has been added among a plurality of applications that are sequentially arranged in the above manner (step S406).

An operation procedure of the information processing system 100 according to this embodiment is the same as the operation procedure (FIG. 27) described in the above first embodiment.

As described above, in this embodiment, the MFP 1 transmits the screen request including the shop information and the type-of-business identification information to the application market server 3. Then, on the basis of the application correspondence information indicating the correspondence relationship between the shop information, the application identification information, and the use promotion information, from among the pieces of the application identification information that are associated with the shop information included in the screen request received from the MFP 1, the application market server 3 specifies pieces of the application identification information that are associated with the use promotion information indicating a use-promoted application. Then, on the basis of the type-of-business information indicating the correspondence relationship between the application identification information and the type-of-business identification information, from among the pieces of the application identification information specified in the above manner, the application market server 3 transmits, to the MFP 1, the application providing screen for providing, as the "recommended app", an application identified by the piece of the application identification information that is associated with the type-of-business identification information included in the screen request. Thus, according to this embodiment, even if applications to be used by the MFP 1 differ according to the shop that sells the MFP 1, only an application that is appropriately usable by the MFP 1 can be displayed on the application providing screen on the operation panel 27 of the MFP 1. Accordingly, only an application that is appropriately usable by the MFP 1 can be introduced. Furthermore, among applications that are appropriately usable by the MFP 1, an application whose use is recommended to the MFP 1 and that is suitable for the type of business of a user of the MFP 1 can be introduced as the "recommended app". Thus, the user less tends to miss the "recommended app" that is suitable for the type of business of the user.

First Modification Example of Second Embodiment

For example, on the basis of the download information in which the number of application downloads is associated with each combination of the shop information and the application identification information, for each of one or more pieces of the application identification information specified by the third specifying unit 360, the application providing screen generating unit 325 can specify the associated number of downloads and can generate an application providing screen on which one or more "recommended apps" are arranged in descending order of the number of downloads, the "recommended apps" corresponding to the pieces of the application identification information specified by the third specifying unit 360, in a one-to-one relationship.

Figure 44:
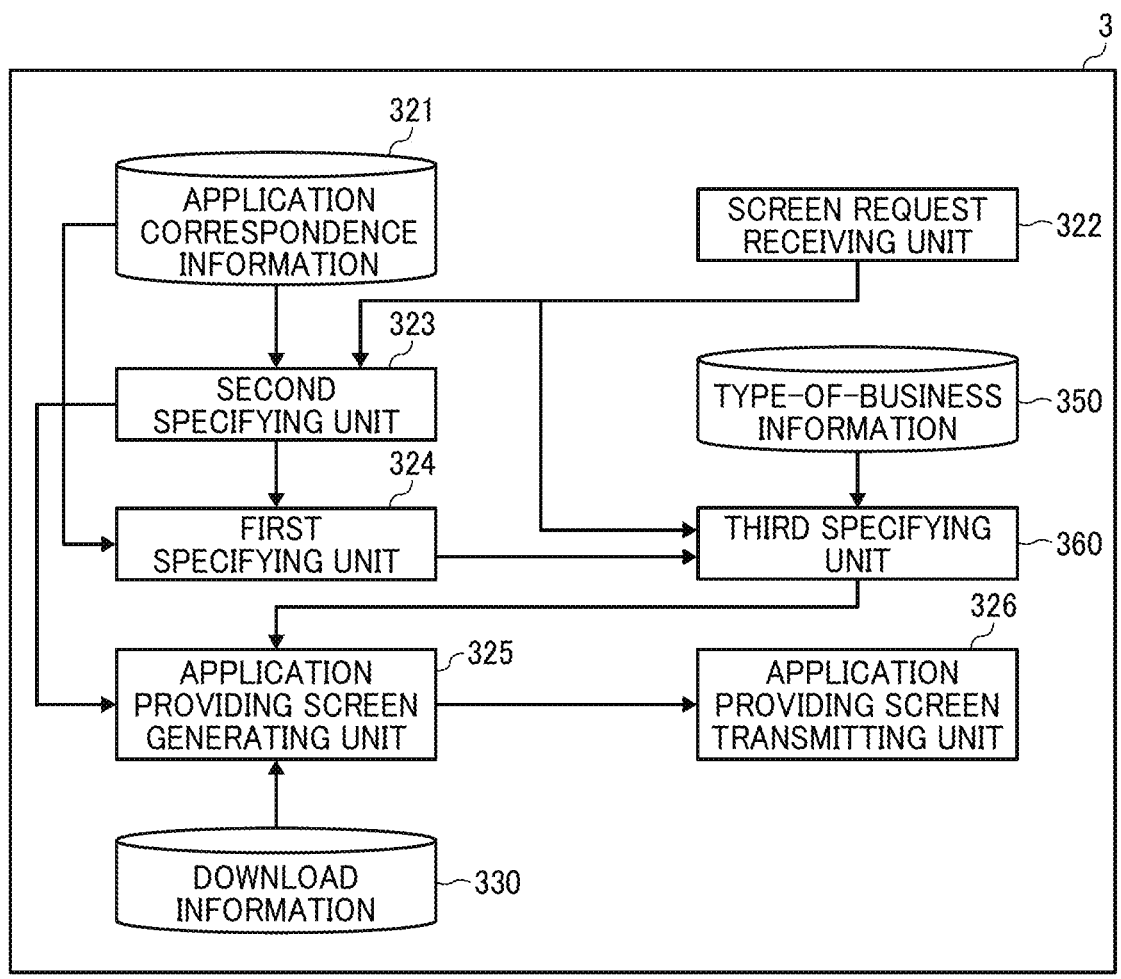
FIG. 44 is a schematic diagram illustrating an example functional configuration of an application market server according to a first modification example of the second embodiment.

FIG. 44 illustrates examples of functions of the application market server 3 according to this modification example. As illustrated in FIG. 44, the application market server 3 further includes the download information memory 330 that stores the above-described download information.

In this modification example, the application providing screen generating unit 325 generates an application providing screen including a first screen that displays a "recommended app" and a second screen that displays the other application. A method for generating the application providing screen in this modification example will be specifically described below. Each time one of a plurality of pieces of the application identification information specified by the second specifying unit 323 is selected, the application providing screen generating unit 325 according to this modification example determines whether the selected piece of the application identification information is included in the one or more pieces of the application identification information specified by the third specifying unit 360. If the determination result is positive, the application providing screen generating unit 325 arranges an application ("recommended app") identified by the selected piece of the application identification information at the end of the arrangement direction on the first screen. If the determination result is negative, the application providing screen generating unit 325 arranges the application (other application) identified by the selected piece of the application identification information at the end of the arrangement direction on the second screen.

More specifically, each time it is determined that the selected piece of the application identification information is included in the one or more pieces of the application identification information specified by the third specifying unit 360, the application providing screen generating unit 325 associates display order information for determining a display order with an application identified by the selected piece of the application identification information. On the basis of the display order information associated with each application, the application providing screen generating unit 325 rearranges one or more applications corresponding to the one or more pieces of the application identification information specified by the third specifying unit 360, in a one-to-one relationship, and generates the first screen.

Furthermore, if the selected piece of the application identification information is included in the one or more pieces of the application identification information specified by the third specifying unit 360, referring to the above-described download information, the application providing screen generating unit 325 specifies the number of downloads associated with the selected piece of the application identification information, and on the basis of the specified number of downloads as the display order information, the application providing screen generating unit 325 associates the specified number of downloads with an application identified by the selected piece of the application identification information.

Figure 45:
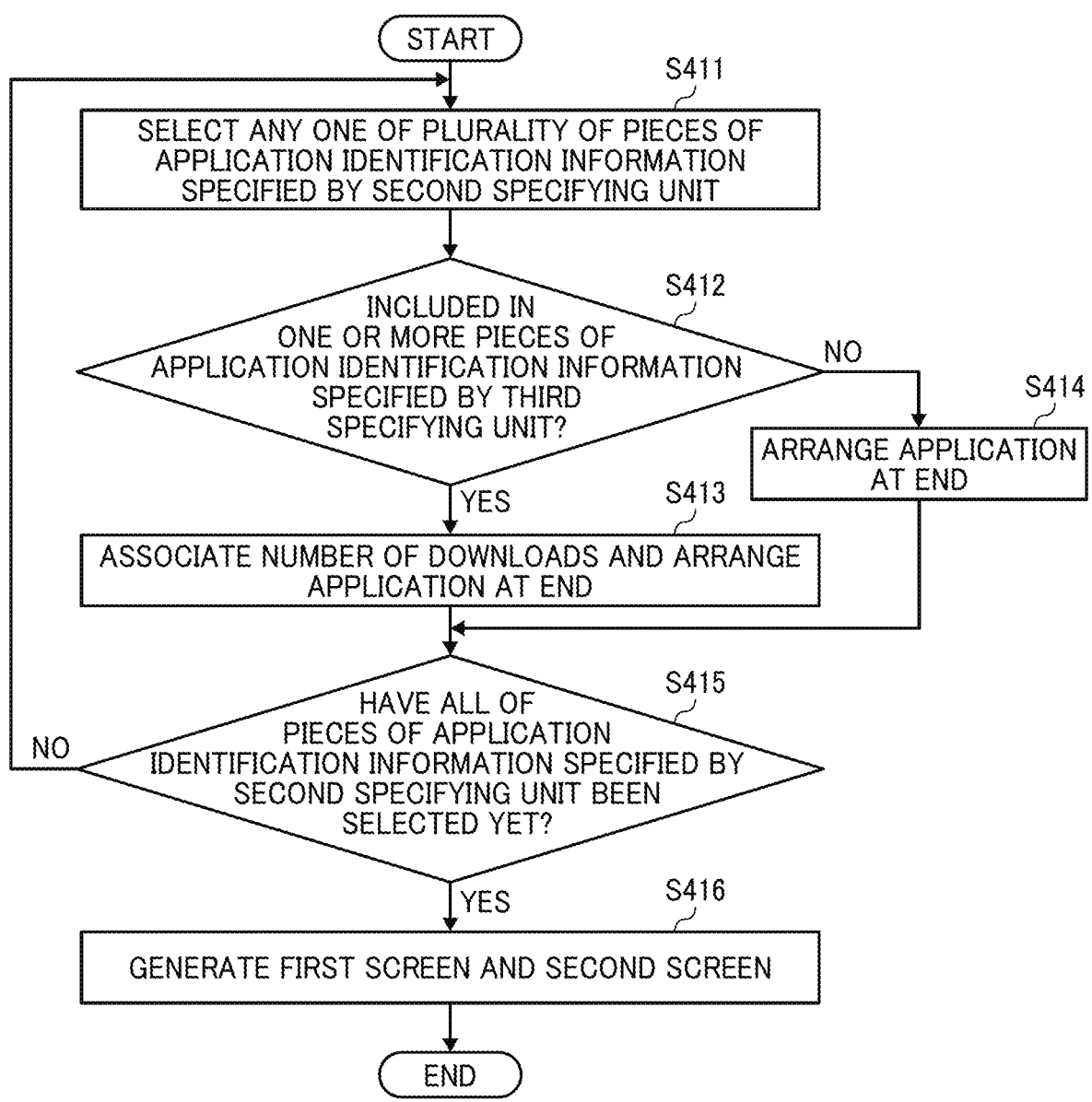
FIG. 45 is a flowchart illustrating an example operation of generating an application providing screen according to the first modification example of the second embodiment.

FIG. 45 is a flowchart illustrating an operation example of the application providing screen generating unit 325 according to this modification example. Here, it is assumed that the application providing screen generating unit 325 has already acquired a group of pieces of the application identification information specified by the second specifying unit 323 and a group of pieces of the application identification information specified by the third specifying unit 360.

As illustrated in FIG. 45, the application providing screen generating unit 325 selects any (unselected) one of the plurality of pieces of the application identification information specified by the second specifying unit 323 (step S411). Then, the application providing screen generating unit 325 determines whether the piece of the application identification information selected in step S411 is included in the one or more pieces of the application identification information specified by the third specifying unit 360 (step S412).

If the result in step S412 is positive (step S412: YES), referring to the above-described download information, the application providing screen generating unit 325 specifies the number of downloads associated with the combination of the piece of the application identification information selected in step S411 and the shop information included in the screen request received by the screen request receiving unit 322. Then, the application providing screen generating unit 325 associates an application identified by the piece of the application identification information selected in step S411 with the specified number of downloads and arranges the application at the end of the arrangement direction on the first screen (step S413). On the other hand, if the result in step S412 is negative (step S412: NO), the application providing screen generating unit 325 arranges the application identified by the piece of the application identification information selected in step S411 at the end of the arrangement direction on the second screen (step S414).

After the above-described step S413 or S414, the application providing screen generating unit 325 determines whether all of the pieces of the application identification information specified by the second specifying unit 323 have already been selected (step S415). If the result in step S415 is negative (step S415: NO), the above-described processing in and after step S411 is repeated. On the other hand, if the result in step S415 is positive (step S415: YES), the application providing screen generating unit 325 generates the first screen and the second screen (step S416). More specifically, the application providing screen generating unit 325 rearranges one or more applications ("recommended apps") that are determined as positive in step S412 in descending order of the number of downloads associated with each application and generates the first screen, and arranges one or more applications (applications other than the "recommended apps") that are determined as negative in step S412 sequentially in the above manner and generates the second screen.

Second Modification Example of Second Embodiment

For example, on the basis of price information in which the price of an application is associated with each piece of the application identification information, for each of one or more pieces of the application identification information specified by the third specifying unit 360, the application providing screen generating unit 325 specifies the price associated with the piece of the application identification information and generates an application providing screen on which one or more use-recommended applications are arranged in descending order of the price, the "recommended apps" corresponding to the pieces of the application identification information specified by the third specifying unit 360, in a one-to-one relationship.

Figure 46:
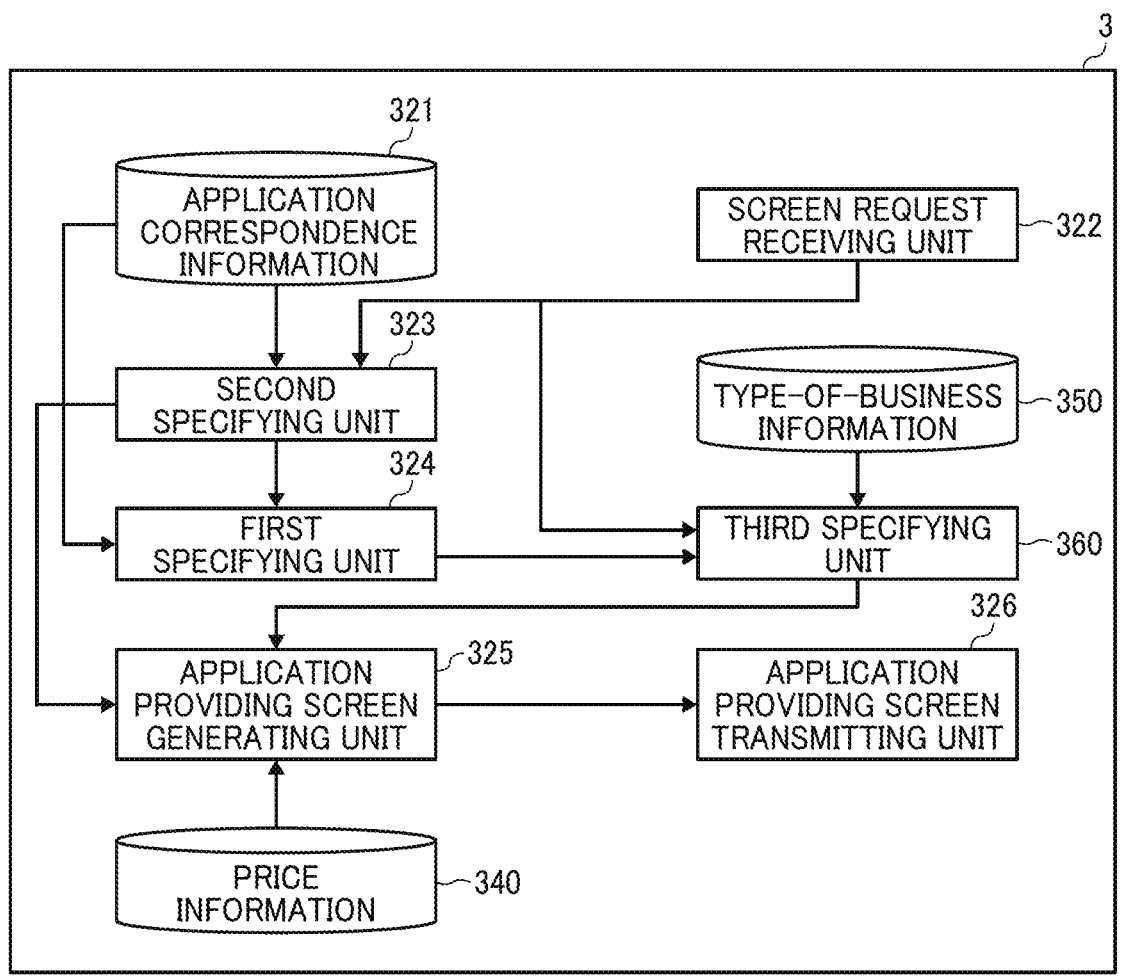
FIG. 46 is a schematic diagram illustrating an example functional configuration of an application market server according to a second modification example of the second embodiment.

FIG. 46 illustrates examples of functions of the application market server 3 according to this modification example. As illustrated in FIG. 46, the application market server 3 further includes the price information memory 340 that stores the above-described price information.

In this modification example, the application providing screen generating unit 325 generates an application providing screen including a first screen that displays a "recommended app" and a second screen that displays the other application. A method for generating the application providing screen in this modification example will be specifically described below. Each time one of a plurality of pieces of the application identification information specified by the second specifying unit 323 is selected, the application providing screen generating unit 325 according to this modification example determines whether the selected piece of the application identification information is included in the one or more pieces of the application identification information specified by the third specifying unit 360. If the determination result is positive, the application providing screen generating unit 325 arranges an application ("recommended app") identified by the selected piece of the application identification information at the end of the arrangement direction on the first screen. If the determination result is negative, the application providing screen generating unit 325 arranges the application (other application) identified by the selected piece of the application identification information at the end of the arrangement direction on the second screen.

More specifically, each time it is determined that the selected piece of the application identification information is included in the one or more pieces of the application identification information specified by the third specifying unit 360, the application providing screen generating unit 325 associates the display order information for determining a display order with an application identified by the selected piece of the application identification information. On the basis of the display order information associated with each application, the application providing screen generating unit 325 rearranges one or more applications corresponding to the one or more pieces of the application identification information specified by the third specifying unit 360, in a one-to-one relationship, and generates the first screen.

Furthermore, if the selected piece of the application identification information is included in the one or more pieces of the application identification information specified by the third specifying unit 360, referring to the above-described price information, the application providing screen generating unit 325 specifies the price associated with the selected piece of the application identification information, and on the basis of the specified price as the display order information, the application providing screen generating unit 325 associates the specified price with an application identified by the selected piece of the application identification information.

Figure 47:
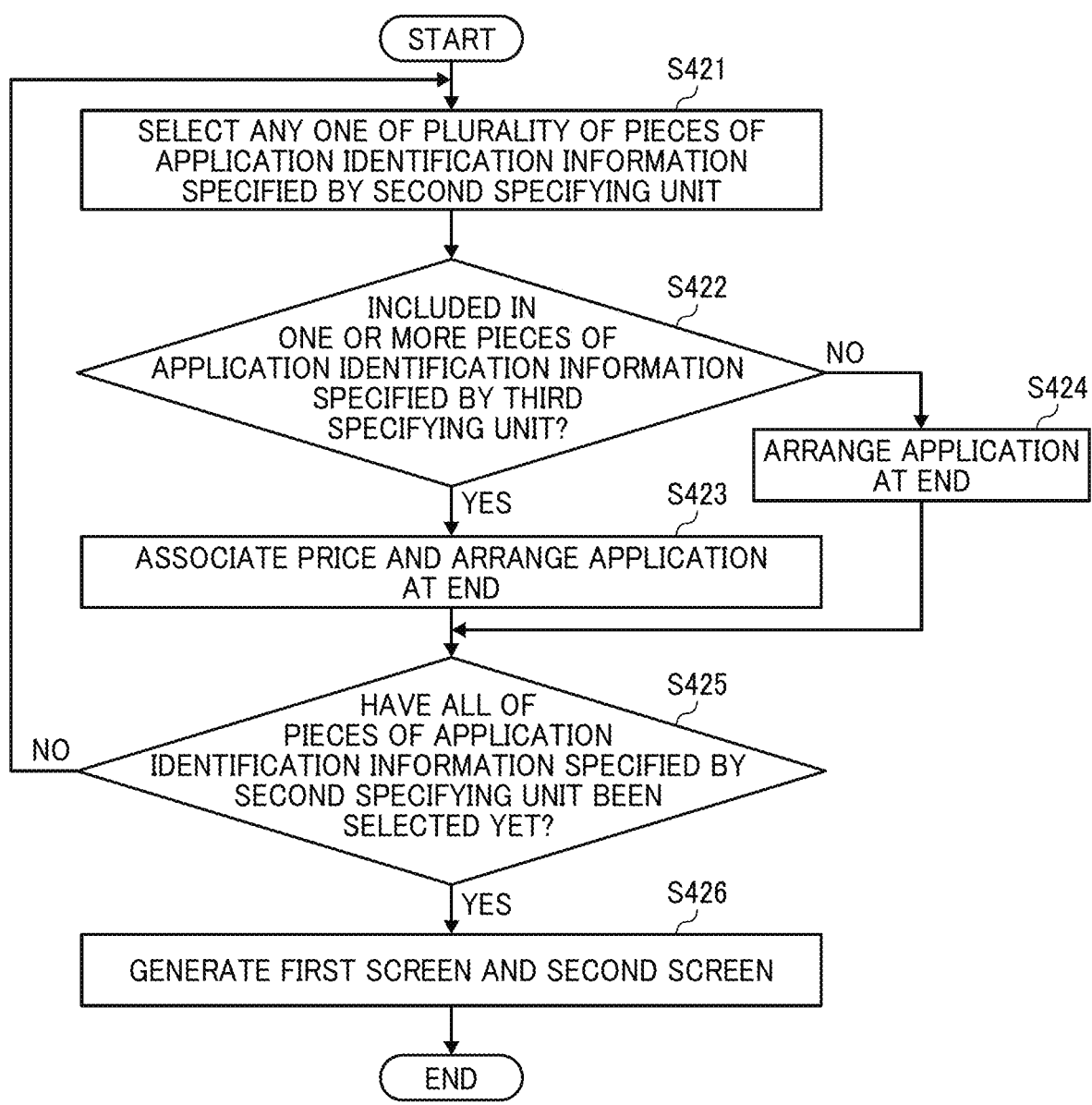
FIG. 47 is a flowchart illustrating an example operation of generating an application providing screen according to the second modification example of the second embodiment.

FIG. 47 is a flowchart illustrating an operation example of the application providing screen generating unit 325 according to this modification example. Here, it is assumed that the application providing screen generating unit 325 has already acquired a group of pieces of the application identification information specified by the second specifying unit 323 and a group of pieces of the application identification information specified by the third specifying unit 360.

As illustrated in FIG. 47, the application providing screen generating unit 325 selects any (unselected) one of the plurality of pieces of the application identification information specified by the second specifying unit 323 (step S421). Then, the application providing screen generating unit 325 determines whether the piece of the application identification information selected in step S421 is included in the one or more pieces of the application identification information specified by the third specifying unit 360 (step S422).

If the result in step S422 is positive (step S422: YES), on the basis of the above-described price information, the application providing screen generating unit 325 specifies the price associated with the piece of the application identification information selected in step S421. Then, the application providing screen generating unit 325 associates an application identified by the piece of the application identification information selected in step S421 with the specified price and arranges the application at the end of the arrangement direction on the first screen (step S423). On the other hand, if the result in step S422 is negative (step S422: NO), the application providing screen generating unit 325 arranges the application identified by the piece of the application identification information selected in step S421 at the end of the arrangement direction on the second screen (step S424).

After the above-described step S423 or S424, the application providing screen generating unit 325 determines whether all of the pieces of the application identification information specified by the second specifying unit 323 have already been selected (step S425). If the result in step S425 is negative (step S425: NO), the above-described processing in and after step S421 is repeated. On the other hand, if the result in step S425 is positive (step S425: YES), the application providing screen generating unit 325 generates the first screen and the second screen (step S426). More specifically, the application providing screen generating unit 325 rearranges one or more applications ("recommended apps") that are determined as positive in step S422 in descending order of the price associated with each application and generates the first screen, and arranges one or more applications (applications other than the "recommended apps") that are determined as negative in step S422 sequentially in the above manner and generates the second screen.

Third Modification Example of Second Embodiment

As in the above-described third modification example of the first embodiment, the application correspondence information may be information indicating the correspondence relationship between the shop information, the application identification information, the use promotion information, and the competitive application identification information for identifying an application that competes with the application identified by the application identification information (see FIG. 36).

In this modification example, if a piece of the application identification information specified by the third specifying unit 360 is associated with the competitive application identification information, the application providing screen generating unit 325 generates an application providing screen on which an application identified by the competitive application identification information is not displayed. Note that in this example, from among pieces of the application identification information specified by the second specifying unit 323, at the time of specifying a piece of the application identification information that is associated with the use promotion information (use promotion information indicating "True") indicating a use-promoted application, the first specifying unit 324 can also specify the competitive application identification information that is associated with the specified piece of the application identification information.

In this modification example, as in the above-described second embodiment, the application providing screen generating unit 325 selects each one of the plurality of pieces of the application identification information specified by the second specifying unit 323 and determines whether the selected piece of the application identification information is included in one or more pieces of the application identification information specified by the third specifying unit 360. Then, if the selected piece of the application identification information is a non-display target, the application providing screen generating unit 325 adds the second flag information indicating non-display to an application identified by the selected piece of the application identification information. In this example, if the selected piece of the application identification information is the same as the competitive application identification information that is associated with any one of the pieces of the application identification information specified by the third specifying unit 360, the application providing screen generating unit 325 determines that the selected piece of the application identification information is a non-display target. Then, the application providing screen generating unit 325 generates the application providing screen on which the application to which the second flag information has been added is not displayed.

Figure 48:
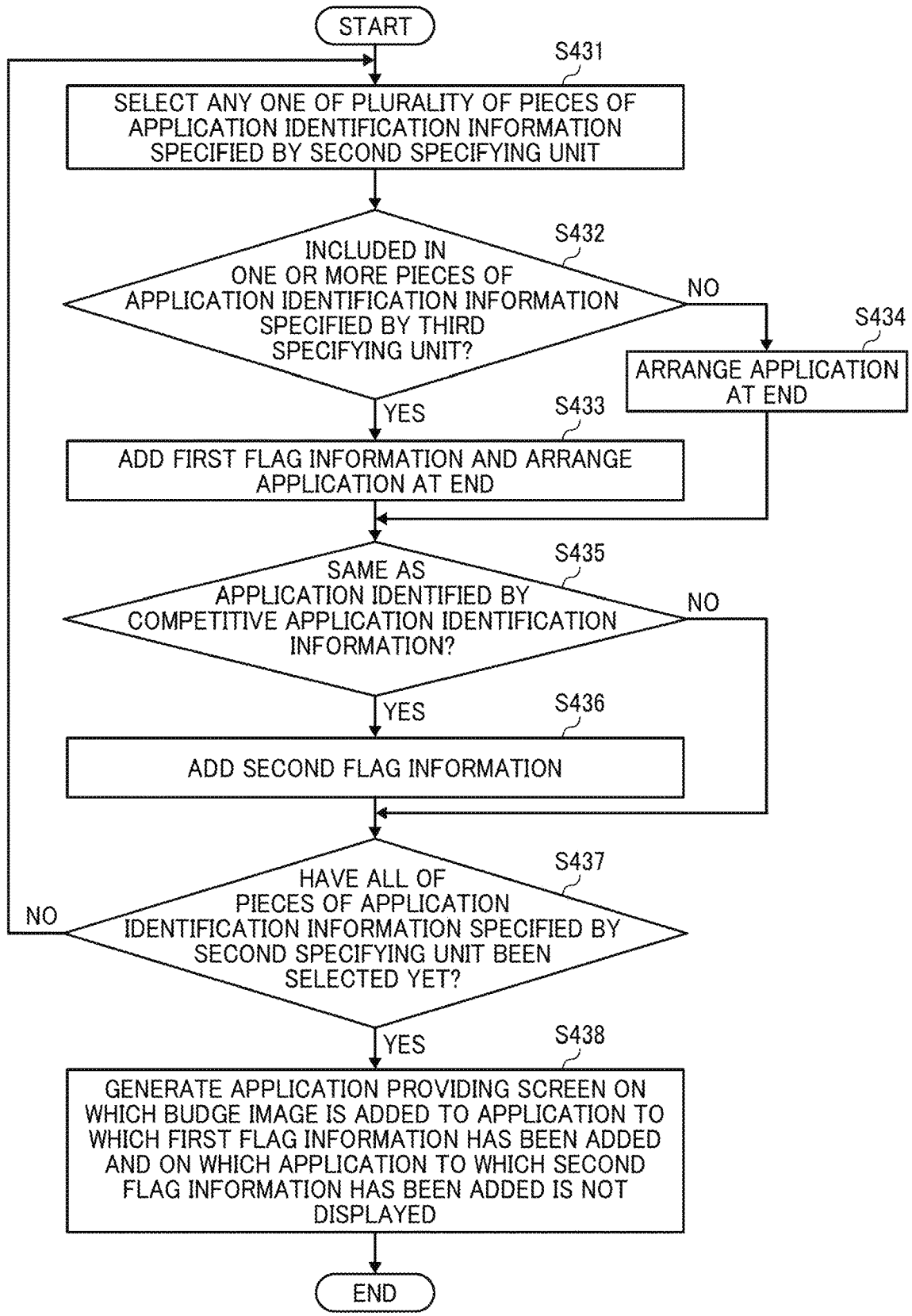
FIG. 48 is a flowchart illustrating an example operation of generating an application providing screen according to a third modification example of the second embodiment.

FIG. 48 is a flowchart illustrating an operation example of the application providing screen generating unit 325 according to this modification example. Here, it is assumed that the application providing screen generating unit 325 has already acquired a group of pieces of the application identification information specified by the second specifying unit 323, a group of pieces of the application identification information specified by the third specifying unit 360, and a group of competitive applications specified by the first specifying unit 324.

As illustrated in FIG. 48, the application providing screen generating unit 325 selects any (unselected) one of the plurality of pieces of the application identification information specified by the second specifying unit 323 (step S431). Then, the application providing screen generating unit 325 determines whether the piece of the application identification information selected in step S431 is included in the one or more pieces of the application identification information specified by the third specifying unit 360 (step S432).

If the result in step S432 is positive (step S432: YES), the application providing screen generating unit 325 adds the first flag information to an application identified by the piece of the application identification information selected in step S431 and arranges the application at the end (the end in the arrangement direction) (step S433). On the other hand, if the result in step S432 is negative (step S432: NO), the application providing screen generating unit 325 does not add the first flag information to the application identified by the piece of the application identification information selected in step S403 and arranges the application at the end (step S434).

After the above-described step S433 or S434, the application providing screen generating unit 325 determines whether the piece of the application identification information selected in step S431 is the same as the competitive application identification information that is associated with any one of the pieces of the application identification information specified by the third specifying unit 360 (step S435). If the result in step S435 is positive (step S435: YES), the application providing screen generating unit 325 adds the second flag information to an application identified by the piece of the application identification information selected in step S431 (step S436), and the process proceeds to step S437. On the other hand, if the result in step S435 is negative (step S435: NO), the process proceeds to step S437.

In step S437, the application providing screen generating unit 325 determines whether all of the pieces of the application identification information specified by the second specifying unit 323 have already been selected (step S437). If the result in step S437 is negative (step S437: NO), the above-described processing in and after step S431 is repeated. On the other hand, if the result in step S437 is positive (step S437: YES), the application providing screen generating unit 325 generates the application providing screen on which the above-described budge image is added to the application to which the first flag information has been added and on which the application to which the second flag information has been added is not displayed among a plurality of applications that are sequentially arranged in the above manner (step S438).

Note that the configuration of this modification example is also applicable to an implementation such as the above-described first or second modification example of the second embodiment in which the application providing screen including the first screen that displays the "recommended app" and the second screen that displays the other application is generated.

For example, a case is considered in which this modification example is applied to the above-described second modification example of the second embodiment. In this case, after step S423 or S424 and before step S425 illustrated in FIG. 47, processing corresponding to steps S435 and S436 illustrated in FIG. 48 is performed. Then, in step S426 illustrated in FIG. 47, the first screen and the second screen are generated so as not to display the application to which the second flag information has been added. A case in which this modification example is applied to the above-described first modification example of the second embodiment can be considered in the same manner.

Fourth Modification Example of Second Embodiment

For example, the above-described screen request may further include the installed-application identification information for identifying an application that has already been installed in the MFP 1, and the application providing screen generating unit 325 may generate an application providing screen for providing, as the "recommended app", from among applications identified by pieces of the application identification information specified by the third specifying unit 360, an application except for an application identified by the installed-application identification information included in the screen request.

In this modification example, as in the above-described second embodiment, the application providing screen generating unit 325 selects each one of a plurality of pieces of the application identification information specified by the second specifying unit 323 and determines whether the selected piece of the application identification information is included in the one or more pieces of the application identification information specified by the third specifying unit 360. Then, if the selected piece of the application identification information is a non-display target, the application providing screen generating unit 325 adds the second flag information indicating non-display to an application identified by the selected piece of the application identification information. In this example, if the selected piece of the application identification information is the same as the installed-application identification information included in the screen request, the application providing screen generating unit 325 determines that the selected piece of the application identification information is a non-display target. Then, the application providing screen generating unit 325 generates the application providing screen on which the application to which the second flag information has been added is not displayed.

Figure 49:
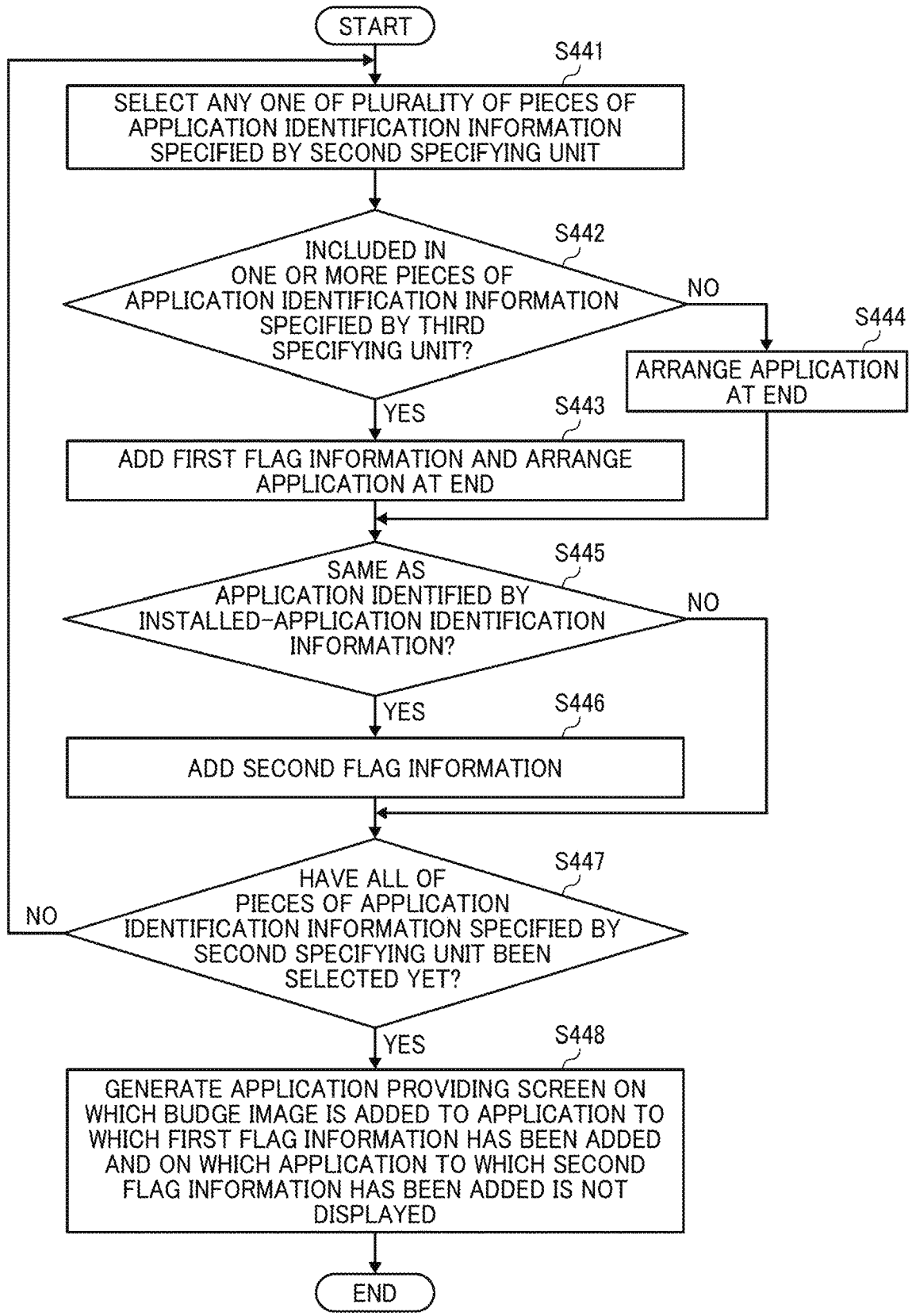
FIG. 49 is a flowchart illustrating an example operation of generating an application providing screen according to a fourth modification example of the second embodiment.

FIG. 49 is a flowchart illustrating an operation example of the application providing screen generating unit 325 according to this modification example. Here, it is assumed that the application providing screen generating unit 325 has already acquired a group of pieces of the application identification information specified by the second specifying unit 323, a group of pieces of the application identification information specified by the third specifying unit 360, and a group of pieces of the installed-application identification information included in the screen request received by the screen request receiving unit 322.

Processing in steps S441 to S444 illustrated in FIG. 49 is the same as the processing in steps S301 to S304 illustrated in FIG. 38, and therefore detailed description thereof is omitted. After step S443 or S444 illustrated in FIG. 49, the application providing screen generating unit 325 determines whether the piece of the application identification information selected in step S441 is the same as any piece of the installed-application identification information included in the screen request (step S445). If the result in step S445 is positive (step S445: YES), the application providing screen generating unit 325 adds the second flag information to an application identified by the piece of the application identification information selected in step S441 (step S446), and the process proceeds to step S447. On the other hand, if the result in step S445 is negative (step S445: NO), the process proceeds to step S447. Processing in steps S447 and S448 is the same as the processing in steps S307 and S308 illustrated in FIG. 38, and therefore detailed description thereof is omitted.

Note that the configuration of this modification example is also applicable to an implementation such as the above-described first or second modification example of the second embodiment in which the application providing screen including the first screen that displays the "recommended app" and the second screen that displays the other application is generated.

For example, a case is considered in which this modification example is applied to the above-described second modification example of the first embodiment. In this case, after step S413 or S414 and before step S415 illustrated in FIG. 45, processing corresponding to steps S445 and S446 illustrated in FIG. 49 is performed. Then, in step S416 illustrated in FIG. 45, the first screen and the second screen are generated so as not to display the application to which the second flag information has been added. A case in which this modification example is applied to the above-described second modification example of the second embodiment can be considered in the same manner.

Third Embodiment

Next, a third embodiment will be described. Description of the same parts as those in the above-described embodiments will be omitted.

Figure 50:
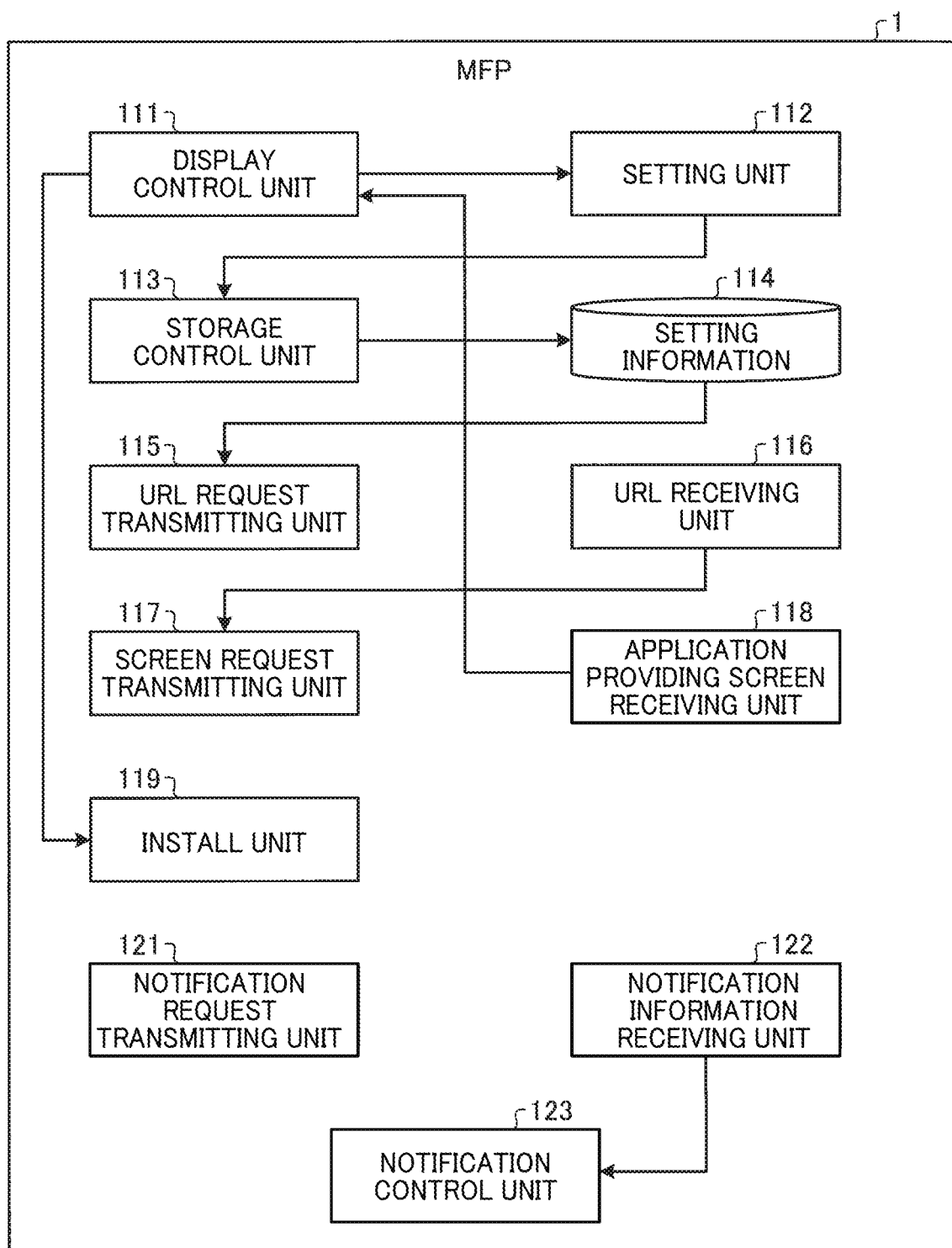
FIG. 50 is a schematic diagram illustrating an example functional configuration of an MFP according to a third embodiment.

FIG. 50 illustrates examples of functions of the MFP 1 according to this embodiment. As illustrated in FIG. 50, the MFP 1 further includes a notification request transmitting unit 121, a notification information receiving unit 122, and a notification control unit 123. These functions may be provided by, for example, the above-described application market app.

The notification request transmitting unit 121 transmits a first notification request to the application market server 3 on a regular basis (e.g., once a day). The first notification request is a notification request including at least the shop information, the type-of-business identification information for identifying the type of business, category (type) identification information for identifying the category (type) of an application, and date and time information indicating the latest date and time (latest access date and time) when the MFP 1 accessed the application market server 3 and requests a notification of an application that has been newly registered.

In this embodiment, in accordance with an input for specifying the type of business of a user who uses the MFP 1 and an input for specifying the category of an application for which a notification of new registration is requested, the setting unit 112 sets the type-of-business identification information and the category identification information. In addition, in accordance with an input for specifying a notification destination of first notification information, which will be described later, and an input for specifying the interval for transmitting the first notification request, the setting unit 112 sets the notification destination of the first notification information and the transmission interval of the first notification request (this interval may be considered as the interval for checking (application check) the presence and absence of a newly registered application).

For example, upon pressing of a display component (UI) representing an arrow right above "NEXT" on an initial screen such as the screen illustrated in FIG. 6, an input screen may be displayed on the operation panel 27 for inputting the type of business, the category of an application, an email address indicating the notification destination of the first notification information, which will be described later, and the transmission interval (application check interval) of the first notification request in addition to the region information and the shop information as illustrated in FIG. 51. In accordance with inputs on this input screen, the setting unit 112 can set the shop information, the region information, the type-of-business identification information, the category identification information, the email address indicating the notification destination of the first notification information, which will be described later, and the transmission interval of the first notification request. In this example, referring to type-of-business management information, such as information illustrated in FIG. 52, in which the type-of-business identification information is associated with each type of business (each checkbox item) displayed on the input screen, the setting unit 112 can set the type-of-business identification information associated with a checkbox (that is checked) selected on the input screen. In addition, referring to category management information, such as information illustrated in FIG. 53, in which the category identification information is associated with each application category (each checkbox item) displayed on the input screen, the setting unit 112 can set the category identification information associated with a checkbox (that is checked) selected on the input screen. A single item or a plurality of items may be set by the setting unit 112 as each of the type-of-business identification information and the category identification information. The storage control unit 113 performs control in such a manner that various kinds of information that has been set by the setting unit 112 are stored in the setting information memory 114. In this example, the setting information memory 114 stores the setting information including the device identification information, the shop information, the region information, one or more pieces of the type-of-business identification information, one or more pieces of the category identification information, the email address indicating the notification destination of the first notification information, which will be described later, and the application check interval. In addition, in this example, the setting information also includes the date and time information indicating the latest date and time (latest access date and time) when the MFP 1 accessed the application market server 3.

Each time the application check timing included in the setting information stored in the setting information memory 114 arrives, the notification request transmitting unit 121 transmits, to the application market server 3, the above-described first notification request including the device identification information, the shop information, the one or more pieces of the type-of-business identification information, the one or more pieces of the category identification information, and the date and time information that are included in the setting information.

In response to the above-described first notification request, the notification information receiving unit 122 receives the first notification information indicating a notification of the newly registered application from the application market server 3. FIG. 54 illustrates an example of the first notification information. Note that in this example, if the notification information receiving unit 122 receives the first notification information from the application market server 3, the notification information receiving unit 122 notifies the setting unit 112 of the reception. Upon reception of this notification, the setting unit 112 sets (updates) the date and time information indicating the latest date and time (latest access date and time) when the MFP 1 accessed the application market server 3 to the date and time information indicating the current date and time. Then, the storage control unit 113 performs control to store (update the date and time information in the setting information and store) the date and time information that has been set by the setting unit 112.

The notification control unit 123 performs control to notify the user of the first notification information received by the notification information receiving unit 122. In this example, the notification control unit 123 performs control to transmit the first notification information received by the notification information receiving unit 122 to the email address (the email address included in the above-described setting information) that is set in advance as the notification destination of the first notification information.

Figure 55:
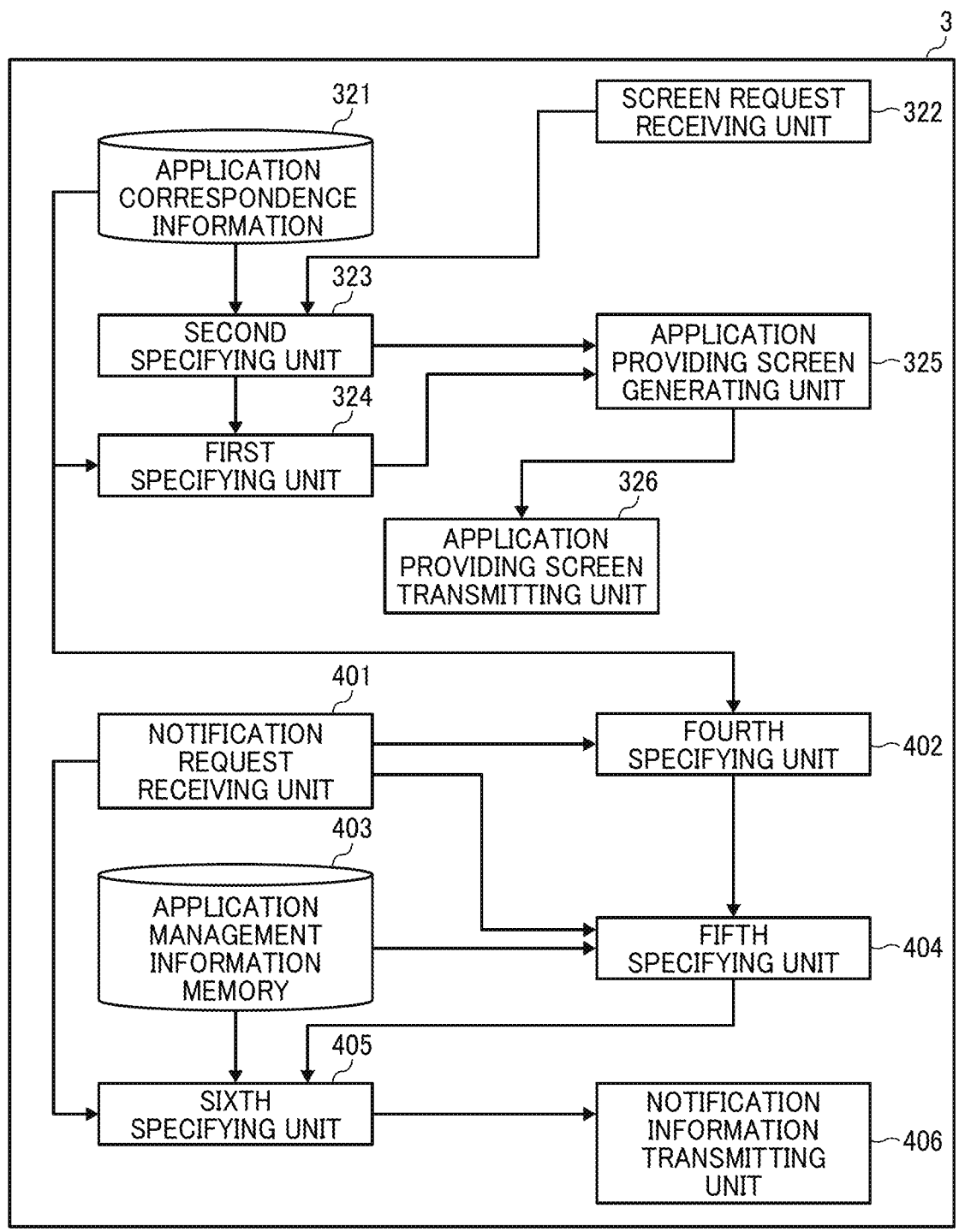
FIG. 55 is a schematic diagram illustrating an example functional configuration of an application market server according to the third embodiment.

FIG. 55 illustrates examples of functions of the application market server 3 according to this embodiment. As illustrated in FIG. 55, the application market server 3 further includes a notification request receiving unit 401, a fourth specifying unit 402, an application management information memory 403, a fifth specifying unit 404, a sixth specifying unit 405, and a notification information transmitting unit 406.

The notification request receiving unit 401 receives the above-described first notification request from the MFP 1 on a regular basis. Referring to the above-described application correspondence information, from among pieces of the application identification information associated with the shop information included in the first notification request received by the notification request receiving unit 401, the fourth specifying unit 402 specifies pieces of the application identification information that are associated with the use promotion information (in this example, the use promotion information indicating "True") indicating a use-promoted application. Note that the above-described first specifying unit 324 and the above-described second specifying unit 323 may implement the function of the fourth specifying unit 402.

The application management information memory 403 stores the application management information in which the application identification information, the category identification information, the type-of-business identification information, and registration date and time information indicating the date and time when an application identified by the application identification information was registered are associated with one another. In this example, the application management information is implemented by first application management information illustrated in FIG. 56 and second application management information illustrated in FIG. 57, which are separated from each other. However, for example, the first application management information and the second application management information may be integrated.

As illustrated in FIG. 56, the first application management information is information in which the application identification information, the application name, the category identification information, the type-of-business identification information, the price information indicating the price of an application, and the application description information are associated with one another. In addition, as illustrated in FIG. 57, the second application management information is information in which the application identification information, the registration date and time information, version up date and time information indicating the date and time when an application was subjected to version up, and the above-described download information indicating the number of downloads according to the shop information are associated with one another. Note that the version up date and time information and the download information, for example, might not be associated.

Referring to the above-described application management information, from among the pieces of the application identification information specified by the fourth specifying unit 402, the fifth specifying unit 404 specifies pieces of the application identification information that are associated with the type-of-business identification information and the category identification information included in the first notification request. In this example, referring to the first application management information, from among the pieces of the application identification information (pieces of the application identification information included in the first application management information) that are the same as the pieces of the application identification information specified by the fourth specifying unit 402, the fifth specifying unit 404 specifies one or more pieces of the application identification information associated with a combination of the type-of-business identification information and the category identification information included in the first notification request.

Referring to the above-described application management information, from among the pieces of the application identification information specified by the fifth specifying unit 404, the sixth specifying unit 405 specifies a piece of the application identification information that is associated with the registration date and time information indicating a date and time that is later than the date and time indicated by the date and time information included in the first notification request. In this example, referring to the second application management information, from among pieces of the application identification information (pieces of the application identification information included in the second application management information) that are the same as the pieces of the application identification information specified by the fifth specifying unit 404, the sixth specifying unit 405 specifies a piece of the application identification information that is associated with the registration date and time information indicating a date and time that is later than the date and time indicated by the date and time information included in the first notification request. Note that the above-described functions of the fourth specifying unit 402, the fifth specifying unit 404, and the sixth specifying unit 405 may be implemented by a single functional unit. That is, a single specifying unit that implements the function of the fourth specifying unit 402, the function of the fifth specifying unit 404, and the function of the sixth specifying unit 405 may be provided.

In response to the first notification request, the notification information transmitting unit 406 transmits the first notification information to the MFP 1 for notifying the MFP 1, as the newly registered application, the application identified by the application identification information specified by the sixth specifying unit 405.

Figure 58:
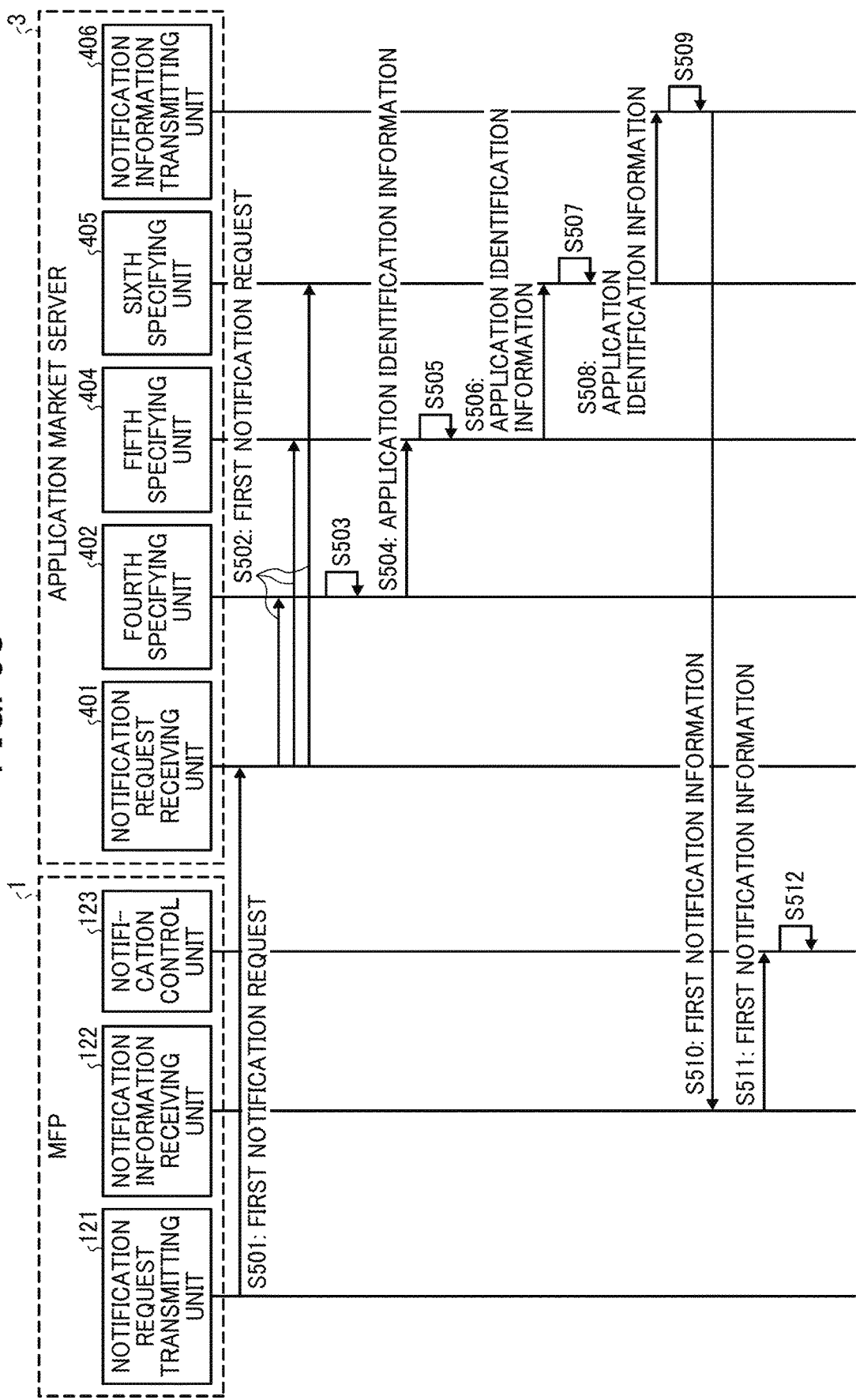
FIG. 58 is a sequence diagram illustrating an example of an operation procedure of an information processing system according to the third embodiment.

FIG. 58 is a sequence diagram illustrating an example of an operation procedure of the information processing system 100 if a given application check timing arrives. As illustrated in FIG. 58, first, the notification request transmitting unit 121 transmits the above-described first notification request to the application market server 3 (step S501). The notification request receiving unit 401 of the application market server 3 transfers the first notification request received from the MFP 1 to each of the fourth specifying unit 402, the fifth specifying unit 404, and the sixth specifying unit 405 (step S502).

Then, referring to the above-described application correspondence information, from among pieces of the application identification information that are associated with the shop information included in the first notification request, the fourth specifying unit 402 specifies pieces of the application identification information that are associated with the use promotion information indicating a use-promoted application (step S503). Then, the fourth specifying unit 402 transfers the pieces of the application identification information specified in step S503 to the fifth specifying unit 404 (step S504). Then, referring to the above-described first application management information, from among the pieces of the application identification information received from the fourth specifying unit 402 in step S504, the fifth specifying unit 404 specifies pieces of the application identification information that are associated with the type-of-business identification information and the category identification information included in the first notification request received from the notification request receiving unit 401 in step S502 (step S505). Then, the fifth specifying unit 404 transfers the pieces of the application identification information specified in step S505 to the sixth specifying unit 405 (step S506). Then, referring to the above-described second application management information, from among the pieces of the application identification information received from the fifth specifying unit 404 in step S506, the sixth specifying unit 405 specifies a piece of the application identification information that is associated with the registration date and time information indicating a date and time that is later than the date and time indicated by the date and time information included in the first notification request received from the notification request receiving unit 401 in step S502 (step S507). Then, the sixth specifying unit 405 transfers the application identification information specified in step S507 to the notification information transmitting unit 406 (step S508).

The notification information transmitting unit 406 generates the first notification information indicating a notification of an application identified by the application identification information transferred from the sixth specifying unit 405 in step S508 as the newly registered application (step S509). Then, the notification information transmitting unit 406 transmits the first notification information generated in step S509 to the MFP 1 (step S510).

The notification information receiving unit 122 transfers the first notification information received in step S510 to the notification control unit 123 (step S511). In addition, at this time, the notification information receiving unit 122 notifies the setting unit 112 of the reception of the first notification information. Upon reception of this notification, the setting unit 112 sets (updates) the date and time information indicating the latest date and time (latest access date and time) when the MFP 1 accessed the application market server 3 to the date and time information indicating the current date and time. Then, the storage control unit 113 performs control to store (update the date and time information in the setting information and store) the date and time information that has been set by the setting unit 112.

Then, the notification control unit 123 performs control to transmit the first notification information received from the notification information receiving unit 122 in step S511 to an email address that is set in advance (step S512).

Modification Example of Third Embodiment

For example, the MFP 1 may transmit a second notification request to the application market server 3 on a regular basis (e.g., once a day), may receive, from the application market server 3 in response to the second notification request, second notification information indicating a notification of an application that has been subjected to version up, and may transmit the received second notification information to an email address that is set in advance. The second notification request is a notification request including at least the shop information, the type-of-business identification information, the category identification information, and the date and time information indicating the latest date and time when the—MFP 1 accessed the application market server 3 and requests a notification of an application that has been subjected to version up.

Among functions of the MFP 1 according to this modification example, different functions from those in the above-described third embodiment will be described. The notification request transmitting unit 121 transmits the above-described second notification request to the application market server 3 on a regular basis. In addition, in response to the second notification request, the notification information receiving unit 122 receives the above-described second notification information from the application market server 3. Furthermore, the notification control unit 123 performs control to notify a user of the second notification information received by the notification information receiving unit 122.

Next, among functions of the application market server 3 according to this modification example, different functions from those in the above-described third embodiment will be described. The notification request receiving unit 401 receives the above-described second notification request from the MFP 1 on a regular basis. Referring to the above-described application correspondence information, from among pieces of the application identification information associated with the shop information included in the second notification request received by the notification request receiving unit 401, the fourth specifying unit 402 specifies pieces of the application identification information associated with the use promotion information indicating a use-promoted application.

The application management information memory 403 stores the application management information in which the application identification information, the category identification information, the type-of-business identification information, and the version up date and time information indicating the date and time when an application identified by the application identification information was subjected to version up are associated with one another. In this example, the application management information is implemented by the first application management information illustrated in FIG. 56 and the second application management information illustrated in FIG. 57, which are separated from each other. Note that the registration date and time information and the download information, for example, illustrated in FIG. 57 might not be associated.

Referring to the above-described application management information, from among the pieces of the application identification information specified by the fourth specifying unit 402, the fifth specifying unit 404 specifies pieces of the application identification information that are associated with the type-of-business identification information and the category identification information included in the second notification request. In this example, referring to the first application management information, from among the pieces of the application identification information that are the same as the pieces of the application identification information specified by the fourth specifying unit 402, the fifth specifying unit 404 specifies one or more pieces of the application identification information associated with a combination of the type-of-business identification information and the category identification information included in the second notification request.

Referring to the above-described application management information, from among the pieces of the application identification information specified by the fifth specifying unit 404, the sixth specifying unit 405 specifies a piece of the application identification information that is associated with the version up date and time information indicating a date and time that is later than the date and time indicated by the date and time information included in the second notification request. In this example, referring to the second application management information, from among pieces of the application identification information that are the same as the pieces of the application identification information specified by the fifth specifying unit 404, the sixth specifying unit 405 specifies a piece of the application identification information that is associated with the version up date and time information indicating a date and time that is later than the date and time indicated by the date and time information included in the second notification request.

In response to the second notification request, the notification information transmitting unit 406 transmits the second notification information to the MFP 1 for notifying the MFP 1, as an application subjected to version up, an application identified by the application identification information specified by the sixth specifying unit 405.

Figure 59:
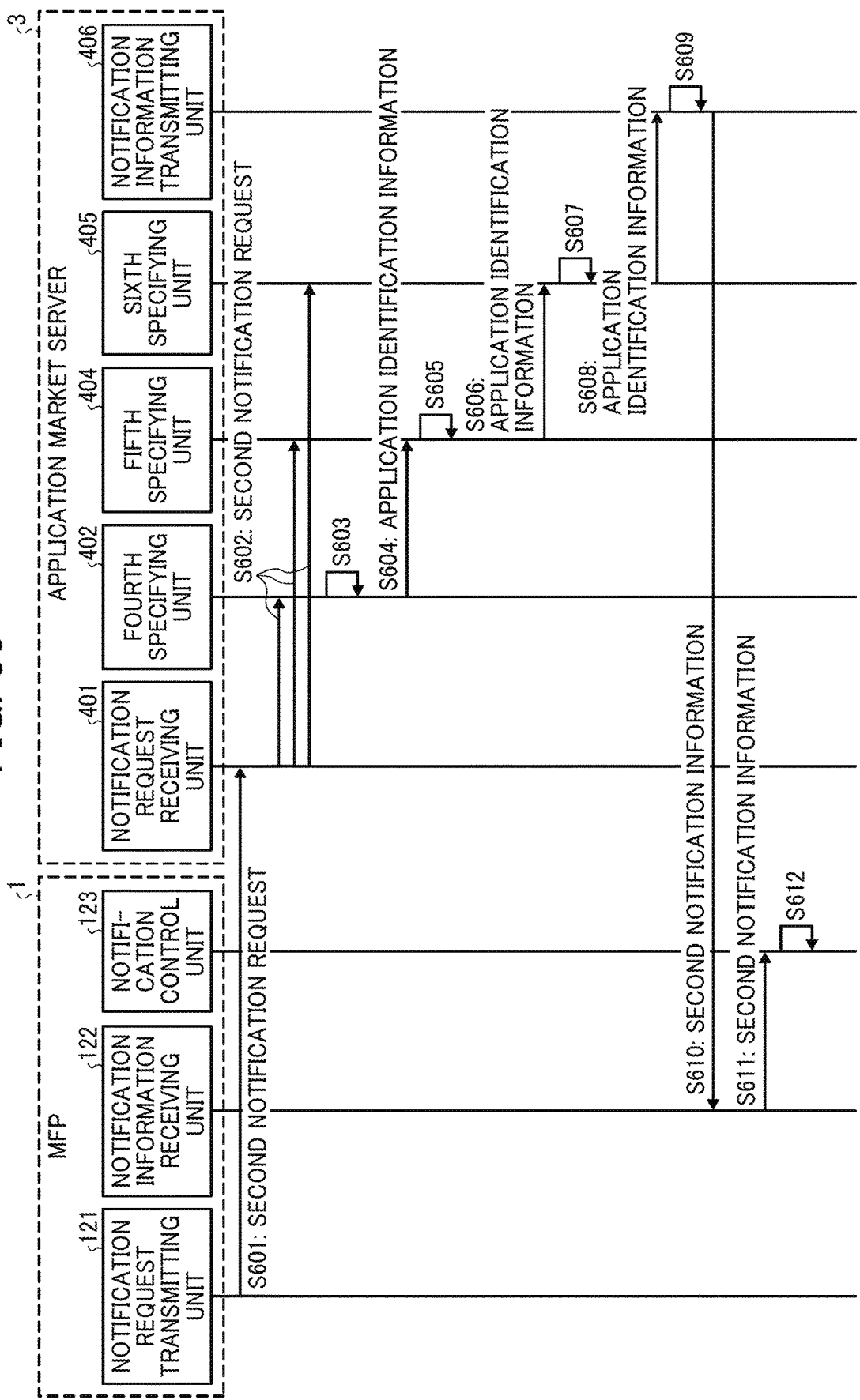
FIG. 59 is a sequence diagram illustrating an example of an operation procedure of an information processing system according to a modification example of the third embodiment.

FIG. 59 is a sequence diagram illustrating an example of an operation procedure of the information processing system 100 if a given application check timing arrives. As illustrated in FIG. 59, first, the notification request transmitting unit 121 transmits the above-described second notification request to the application market server 3 (step S601). The notification request receiving unit 401 of the application market server 3 transfers the second notification request received from the MFP 1 to each of the fourth specifying unit 402, the fifth specifying unit 404, and the sixth specifying unit 405 (step S602).

Then, referring to the above-described application correspondence information, from among pieces of the application identification information that are associated with the shop information included in the second notification request, the fourth specifying unit 402 specifies pieces of the application identification information that are associated with the use promotion information indicating a use-promoted application (step S603). Then, the fourth specifying unit 402 transfers the pieces of the application identification information specified in step S603 to the fifth specifying unit 404 (step S604). Then, referring to the above-described first application management information, from among the pieces of the application identification information received from the fourth specifying unit 402 in step S604, the fifth specifying unit 404 specifies pieces of the application identification information that are associated with the type-of-business identification information and the category identification information included in the second notification request received from the notification request receiving unit 401 in step S602 (step S605). Then, the fifth specifying unit 404 transfers the pieces of the application identification information specified in step S605 to the sixth specifying unit 405 (step S606). Then, referring to the above-described second application management information, from among the pieces of the application identification information received from the fifth specifying unit 404 in step S606, the sixth specifying unit 405 specifies a piece of the application identification information that is associated with the version up date and time information indicating a date and time that is later than the date and time indicated by the date and time information included in the second notification request received from the notification request receiving unit 401 in step S602 (step S607). Then, the sixth specifying unit 405 transfers the application identification information specified in step S607 to the notification information transmitting unit 406 (step S608).

The notification information transmitting unit 406 generates the second notification information indicating a notification of an application identified by the application identification information transferred from the sixth specifying unit 405 in step S608 as an application subjected to version up (step S609). Then, the notification information transmitting unit 406 transmits the second notification information generated in step S609 to the MFP 1 (step S610).

The notification information receiving unit 122 transfers the second notification information received in step S610 to the notification control unit 123 (step S611). In addition, at this time, the notification information receiving unit 122 notifies the setting unit 112 of the reception of the second notification information. Upon reception of this notification, the setting unit 112 sets (updates) the date and time information indicating the latest date and time (latest access date and time) when the MFP 1 accessed the application market server 3 to the date and time information indicating the current date and time. Then, the storage control unit 113 performs control to store (update the date and time information in the setting information and store) the date and time information that has been set by the setting unit 112.

Then, the notification control unit 123 performs control to transmit the second notification information received from the notification information receiving unit 122 in step S611 to an email address that is set in advance (step S612).

The embodiments of the present invention have been described above. However, the present invention is not limited to the above-described embodiments. The present invention may be implemented by modifying a component without departing from the spirit of the present invention. In addition, an appropriate combination of a plurality of components disclosed in the above-described embodiments may produce a variety of inventions. For example, some of the components described in the embodiments may be omitted. In addition, components in different embodiments and modification examples may be combined as appropriate.

In addition, in the above-described embodiments, the main body 10 and the operation unit 20 independently operate on different operating systems. However, the operations of the main body 10 and the operation unit 20 are not limited to this example. For example, the main body 10 and the operation unit 20 may operate on the same operating system. That is, the main body 10 and the operation unit 20 may be integrated.

In addition, programs executed by the information processing system 100 (the MFP 1, the management server 2, the application market server 3, and the application server 7) according to the above-described embodiments may be recorded on a computer-readable recording medium such as a Compact Disc-Read Only Memory (CD-ROM), a flexible disk (FD), a Compact Disc-Recordable (CD-R), a Digital Versatile Disk (DVD), or a Universal Serial Bus (USB) in an installable or executable file to be provided. Alternatively, the programs may be provided or distributed via a network such as the Internet. Further alternatively, the programs may be stored in a ROM or the like in advance to be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing system including an information processing apparatus capable of communicating with one or more image forming apparatuses via a network,
the information processing apparatus comprising:
a receiver configured to receive, from a first image forming apparatus of the image forming apparatuses, a screen request that requests an application providing screen for installing an application in the first image forming apparatus, the screen request including shop information indicating a first shop that sells the first image forming apparatus; and
first circuitry configured to:
obtain application correspondence information that associates shop information indicating the first shop, application identification information for identifying one or more applications sold by the first shop, and use promotion information indicating whether each application is a use-promoted application,
specify, from among one or more applications associated with the shop information indicating the first shop, a first application having first identification information that is associated with the use promotion information indicating the use-promoted application, using the application correspondence information, and
generate the application providing screen for display at the first image forming apparatus, the application providing screen including information regarding the first application identified with a first application identification information as a recommended application for the first image forming apparatus; and
a transmitter to transmit, to the first image forming apparatus, the application providing screen,
wherein the first image forming apparatus further comprises a main body and an operation panel,
the main body includes a second circuitry and one of a printer and scanner, the operation panel includes a third circuitry and a user interface configured to instruct one of the printer and scanner to form an image, wherein the third circuitry controls the operation panel to display the application providing screen including the recommended application information based on the shop information, and
the first image forming apparatus is configured to download an application selected on the displayed application providing screen and install the application for using the one of a printer and scanner,
wherein the first circuitry further
assigns, to the first application, a first flag indicating that the first application is the use-promoted application,
determines whether any one of the first application and a second application is a non-display target,
assigns a second flag indicating non-display to the application that is determined to be the non-display target, and
generates the application providing screen to further include a budge image indicating that the first application is the recommended application according to the first flag and on which application to which the second flag is assigned is to be the non-display target.

2. The information processing system according to claim 1,
wherein the first circuitry further specifies, from among the one or more applications associated with the shop information indicating the first shop, the second application other than the first application, and
the first circuitry generates the application providing screen so as to further include information regarding the second application, the information regarding the first application being displayed to be more remarkable than the information regarding the second application on the application providing screen.

3. The information processing system according to claim 2, wherein the application correspondence information further associates, for at least one of the one or more applications associated with the shop information, competitive application identification information for identifying an application that competes with the application associated with the shop information, and
wherein, when the competitive application identification information is associated with the first application identification information, the first circuitry generates the application providing screen from which the information regarding the competitive application identified with the competitive application identification information associated with the first application identification information is excluded.

4. The information processing system according to claim 2, wherein the screen request further includes installed-application identification information for identifying at least one application that has already been installed in the first image forming apparatus, and wherein the first circuitry generates the application providing screen from which the information regarding the at least one installed application is excluded.

5. The information processing system according to claim 2, wherein the application providing screen includes a first screen that displays the first application and a second screen that displays the second application.

6. The information processing system according to claim 1, wherein the first circuitry rearranges one or more first applications of the first application in a display order defined by display order information, the display order information being associated with each one of the one or more first applications.

7. The information processing system according to claim 6, wherein the first circuitry obtains a number of application downloads that the application has been downloaded, for each one of the one or more first applications, using download information associating the number of application downloads with each combination of the shop information and the application identification information, and
determines the display order information defining the display order for each one of the one or more first applications, based on the obtained number of application downloads.

8. The information processing system according to claim 6, wherein the first circuitry obtains a price of the application, for each one of the one or more first applications, using price information associating the price with each combination of the shop information and the application identification information, and determines the display order information defining the display order for each one of the one or more first applications, based on the obtained price of the application.

9. The information processing system according to claim 1, wherein the first circuitry obtains at least one of a number of downloads that the application has been downloaded and a price of the application, for the first application, using the shop information indicating the first shop and the first application identification information identifying the first application, and
generates the application providing screen such that the information regarding one or more first applications of the first application are arranged in descending order of at least one of the number of downloads and the price.

10. The information processing system according to claim 1, wherein the non-display target includes at least one of: a competitive application that competes with the first application; and an installed-application that has been installed in the first image forming apparatus.

11. The information processing system according to claim 1, wherein the screen request further includes type-of-business identification information for identifying a type of business of the first shop,
wherein the first circuitry further specifies, from the one or more first applications, at least one first application having the first identification information that is associated with the type-of-business identification information included in the screen request, using type-of-business information that associates, for each one of the one or more applications, the application identification information and type-of-business identification information, and
wherein the application providing screen for display at the first image forming apparatus, includes information regarding the at least one first application having the first identification information that is associated with the type-of-business identification information included in the screen request.

12. The information processing system according to claim 1, wherein the receiver further receives, from the first image forming apparatus, a first notification request requesting a notification of an application that has been newly registered, the first notification request including the shop information indicating the first shop, type-of-business identification information for identifying a type of business, category identification information for identifying a type of an application, and date and time information indicating the latest date and time when the first image forming apparatus accessed the information processing apparatus,
wherein the first circuitry further: specifies, from among one or more first applications of the first application, one or more first applications associated with the type-of-business identification information and the category identification information included in the first notification request; obtains application management information associating, for each one of one or more applications being registered, application identification information, category identification information, type-of-business identification information, and registration date and time information indicating the date and time when the application was registered; and using the application management information, specifies, from the one or more first applications associated with the type-of-business identification information and the category identification information, at least one first application as a newly registered application, the at least one first application having the first application identification information that is associated with the registration date and time information indicating a date and time that is later than the date and time indicated by the date and time information included in the first notification request, and
wherein the transmitter transmits, in response to the first notification request, a first notification for notifying the first image forming apparatus of a newly registered application, the first notification including information regarding the newly registered application.

13. The information processing system according to claim 1,
wherein the receiver receives, from the first image forming apparatus, a second notification request requesting a notification of an application to be updated,
the second notification request including the shop information indicting the first shop, type-of-business identification information for identifying a type of business, category identification information for identifying a type of an application, and date and time information indicating the latest date and time when the first image forming apparatus accessed the information processing apparatus,
wherein the circuitry further:
specifies, from among one or more first applications of the first application, one or more first applications associated with the type-of-business identification information and the category identification information included in the second notification request;
obtains application management information associating, for each one of one or more applications being registered, application identification information, category identification information, type-of-business identification information, and updated date and time information indicating the date and time when the application is to be updated; and
using the application management information, specifies, from the one or more first applications associated with the type-of-business identification information and the category identification information, at least one first application as an application to be updated, the at least one first application having the first application identification information that is associated with the updated date and time information indicating a date and time that is later than the date and time indicated by the date and time information included in the first notification request, and
wherein the transmitter transmits, in response to the second notification request, a second notification for notifying the first image forming apparatus of an application to be updated, the second notification including information regarding the application to be updated.

14. An information processing system comprising:
the information processing apparatus of claim 1; and
an image processing apparatus operating as the first image forming apparatus.

15. An information processing method, performed by an information processing apparatus communicable with one or more image forming apparatuses via a network, the information processing method comprising:
by the information processing apparatus,
receiving, from a first image forming apparatus of the one or more image forming apparatuses, a screen request that requests an application providing screen for installing an application in the first image forming apparatus, the screen request including shop information indicating a first shop that sells the first image forming apparatus;
obtaining application correspondence information that associates shop information indicating the first shop, application identification information for identifying one or more applications sold by the first shop, and use promotion information indicating whether each application is a use-promoted application;
specifying, from among one or more applications associated with the shop information indicating the first shop, a first application having first identification information that is associated with the use promotion information indicating the use-promoted application, using the application correspondence information;
generating the application providing screen for display at the first image forming apparatus, the application providing screen including information regarding the first application identified with a first application identification information as a recommended application for the first image forming apparatus; and
transmitting, to the first image forming apparatus, the application providing screen, and
by the first image forming apparatus, in which comprises a main body and an operation panel, the main body includes at least one of a printer and a scanner,
receiving the application providing screen from the information processing apparatus;
controlling the operation panel to display the application providing screen including the recommended application information based on the shop information;
downloading an application selected on the displayed application providing screen; and
installing the application for using one of the printer and the scanner,
wherein the information processing method, by the information processing apparatus, further includes
assigning, to the first application, a first flag indicating that the first application is the use-promoted application,
determining whether any one of the first application and a second application is a non-display target,
assigning a second flag indicating non-display to the application that is determined to be the non-display target, and
generating the application providing screen to further include a budge image indicating that the first application is the recommended application according to the first flag and on which application to which the second flag is assigned is to be the non-display target.

16. A non-transitory recording medium which, when executed by one or more processors, cause the processors to perform an information processing method performed by an information processing apparatus communicable with one or more image forming apparatuses via a network, the information processing method comprising:

receiving, from a first image forming apparatus of the one or more image forming apparatuses, a screen request that requests an application providing screen for installing an application in the first image forming apparatus, the screen request including shop information indicating a first shop that sells the first image forming apparatus;
obtaining application correspondence information that associates shop information indicating the first shop, application identification information for identifying one or more applications sold by the first shop, and use promotion information indicating whether each application is a use-promoted application;
specifying, from among one or more applications associated with the shop information indicating the first shop, a first application having first identification information that is associated with the use promotion information indicating the use-promoted application, using the application correspondence information;
generating the application providing screen for display at the first image forming apparatus, the application providing screen including information regarding the first application identified with a first application identification information as a recommended application for the first image forming apparatus; and
transmitting, to the first image forming apparatus, the application providing screen, and
by the first image forming apparatus, in which comprises a main body and an operation panel, the main body includes at least one of a printer and a scanner,
receiving the application providing screen from the information processing apparatus;
controlling the operation panel to display the application providing screen including the recommended application information based on the shop information;
downloading an application selected on the displayed application providing screen; and
installing the application for using one of the printer and the scanner,
wherein the information processing method, by the information processing apparatus, further includes
assigning, to the first application, a first flag indicating that the first application is the use-promoted application,
determining whether any one of the first application and a second application is a non-display target,
assigning a second flag indicating non-display to the application that is determined to be the non-display target, and
generating the application providing screen to further include a budge image indicating that the first application is the recommended application according to the first flag and on which application to which the second flag is assigned is to be the non-display target.

* * * * *